United States Patent
Ide et al.

(10) Patent No.: US 6,865,325 B2
(45) Date of Patent: Mar. 8, 2005

(54) DISCRETE PATTERN, APPARATUS, METHOD, AND PROGRAM STORAGE DEVICE FOR GENERATING AND IMPLEMENTING THE DISCRETE PATTERN

(75) Inventors: Tsuyoshi Ide, Yokohama (JP); Hideyuki Mizuta, Yamato (JP); Yoichi Taira, Tokyo-to (JP); Akiko Nishikai, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 10/413,168

(22) Filed: Apr. 11, 2003

(65) Prior Publication Data

US 2003/0210210 A1 Nov. 13, 2003

Related U.S. Application Data

(63) Continuation-in-part of application No. 10/127,102, filed on Apr. 19, 2002, now Pat. No. 6,754,419.

(30) Foreign Application Priority Data

Apr. 19, 2001 (JP) .......................................... 2001-121785
Apr. 17, 2002 (JP) .......................................... 2002-114722

(51) Int. Cl.$^7$ ............................... G02B 6/04; G02B 6/00
(52) U.S. Cl. ........................... 385/120; 385/147; 345/30
(58) Field of Search .................................. 385/120–126, 385/141, 147; 257/14, 24, 321; 345/30

(56) References Cited

U.S. PATENT DOCUMENTS 5,923,046 A * 7/1999 Tezuka et al. ................. 257/24
2003/0210210 A1 * 11/2003 Ide et al. ....................... 345/30

* cited by examiner

*Primary Examiner*—Akm Enayet Ullah
(74) *Attorney, Agent, or Firm*—Derek S. Jennings; Anne V. Dougherty

(57) ABSTRACT

A discrete pattern, formed by dots discretely arranged in two dimensions, is provided wherein the dots are generated in a low discrepancy sequence. The dots are preferably generated in a discrete pattern wherein the square of discrepancy D satisfies the formula, $$D \leq 0.13 N^{-1.15} \qquad (1)$$

Further, the method provides for generation of, and the appartus provides implementation of, a discrete pattern even when the filling factor rapidly changes by automatically generating or deleting dots.

31 Claims, 49 Drawing Sheets

(a)             (b)             (c)

Fig. 21
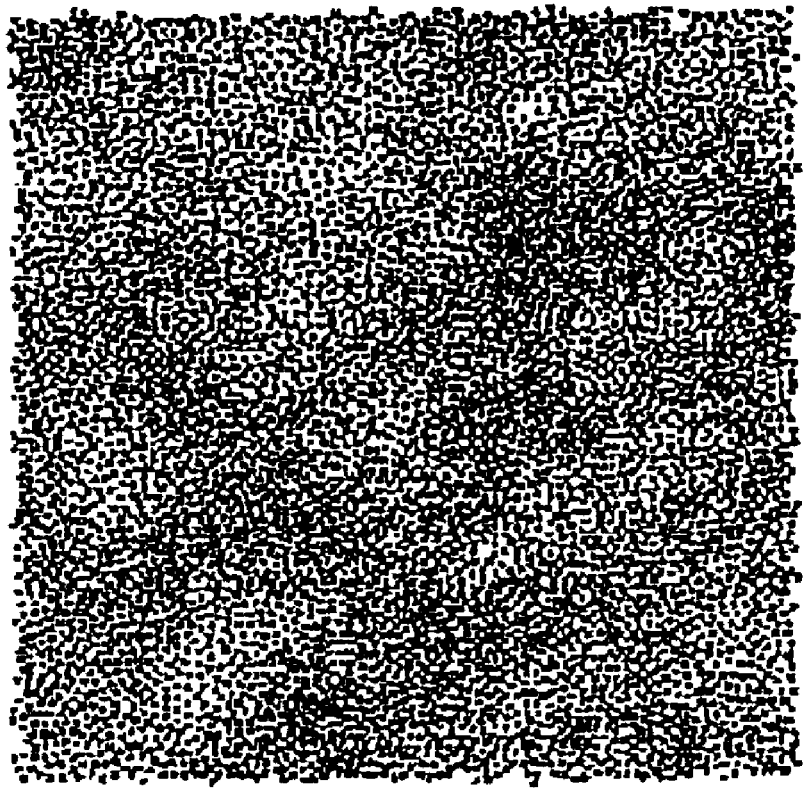
(b)
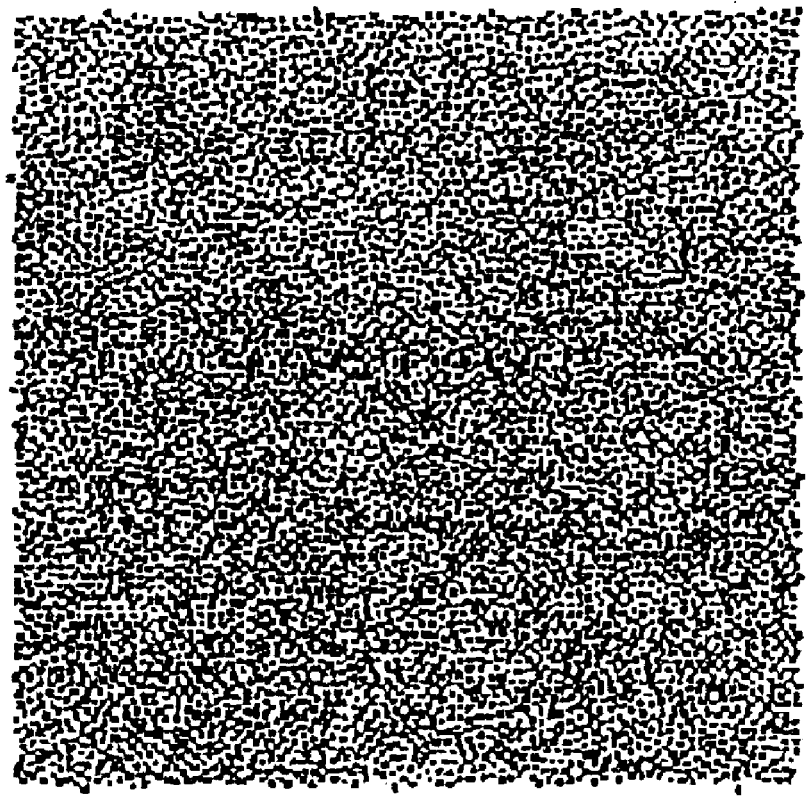
(a)

Fig. 32
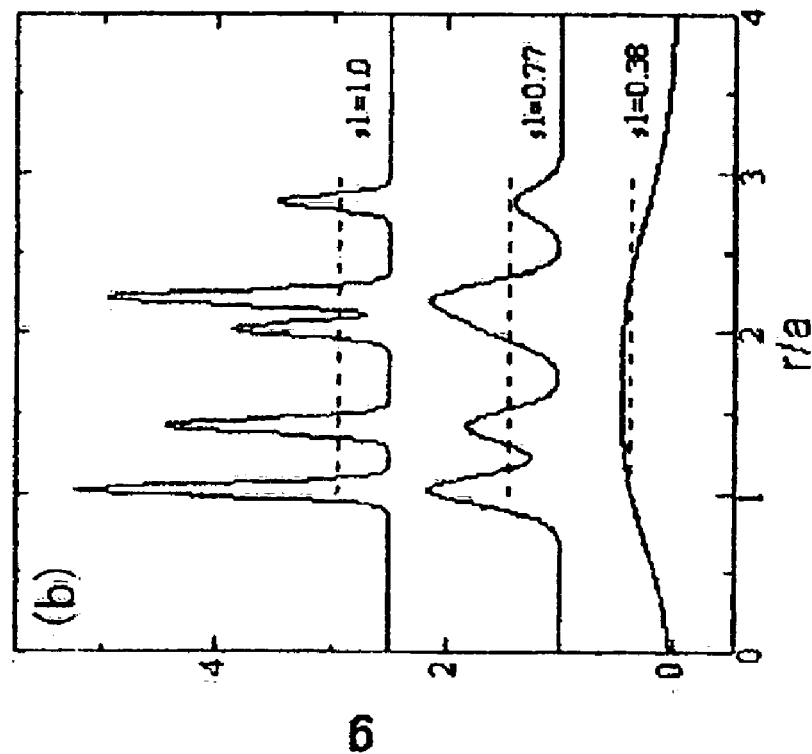
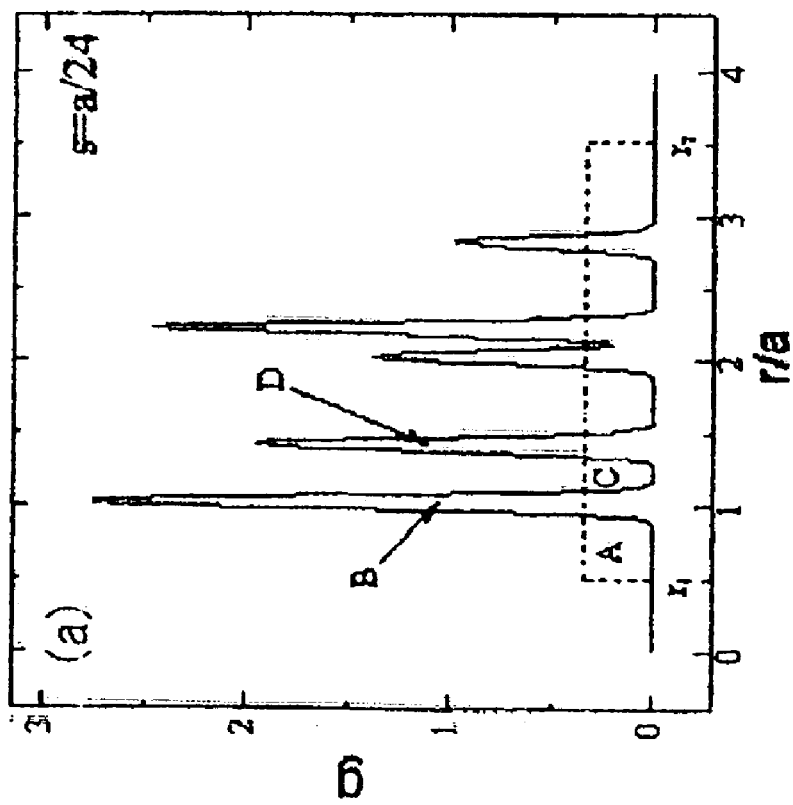

Fig. 33
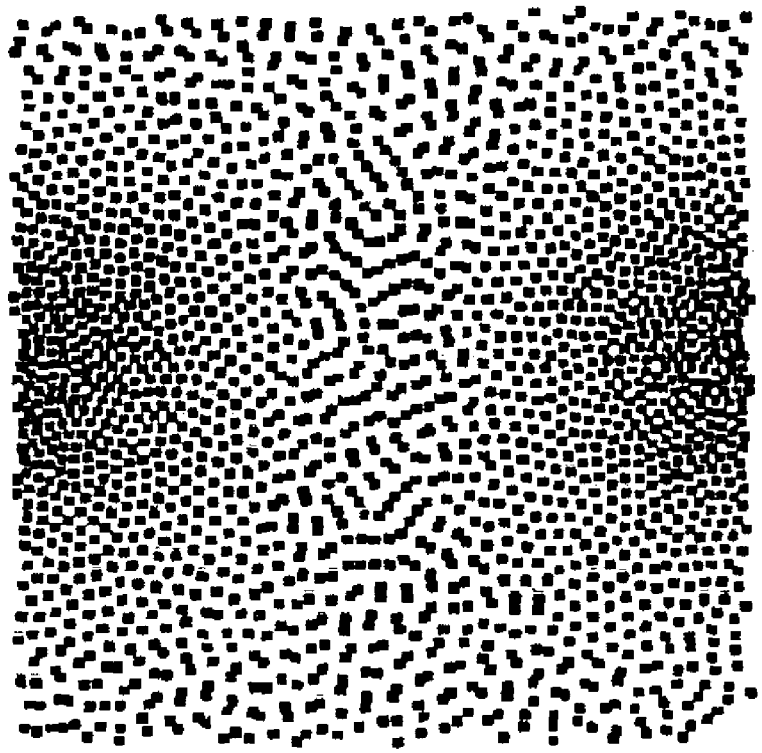
(b)
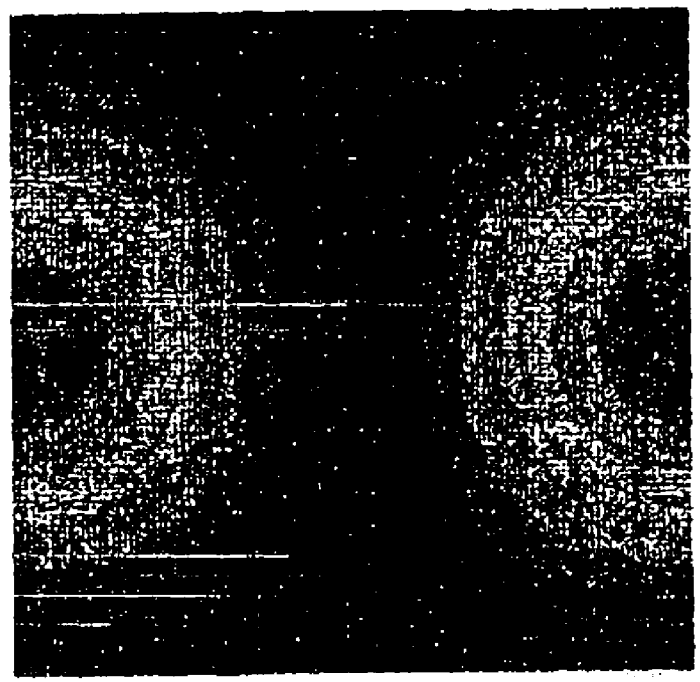
(a)

Fig. 34
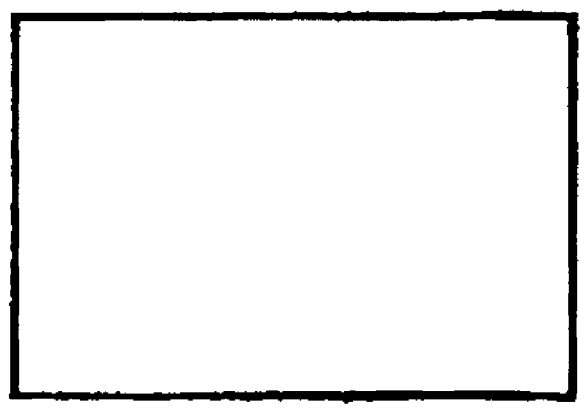
(a)
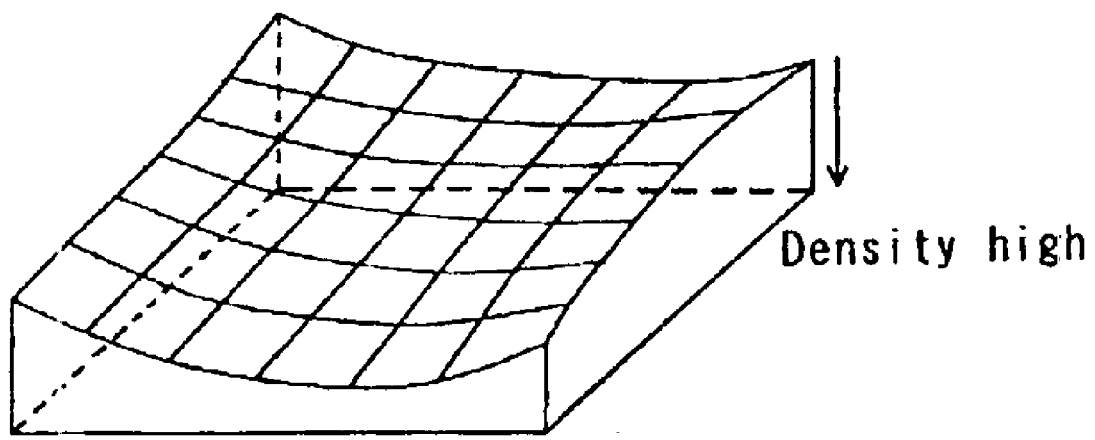
Density high
(b)

(a)　　　　　(b)　　　　　(c)

Fig. 39
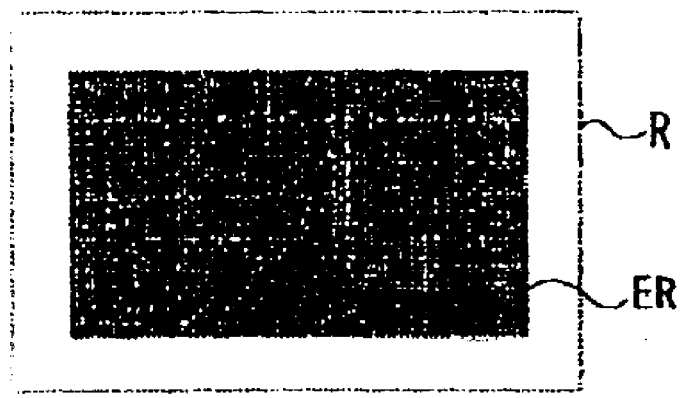
(a)
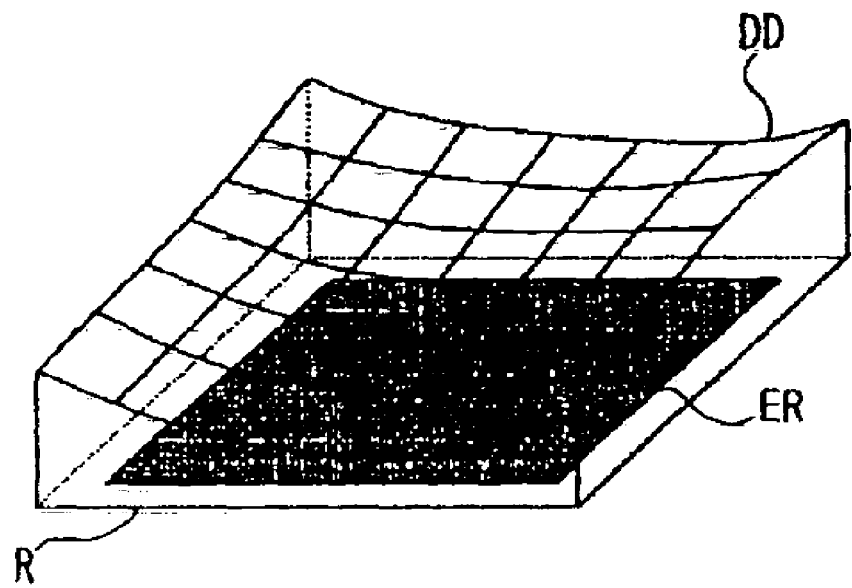
(b)

(a)  (b)  (c)

Fig. 52
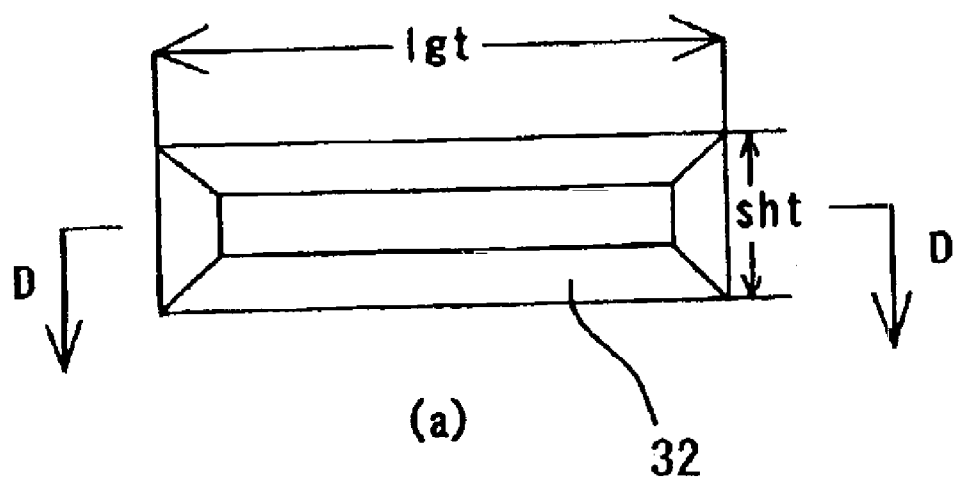
(a)
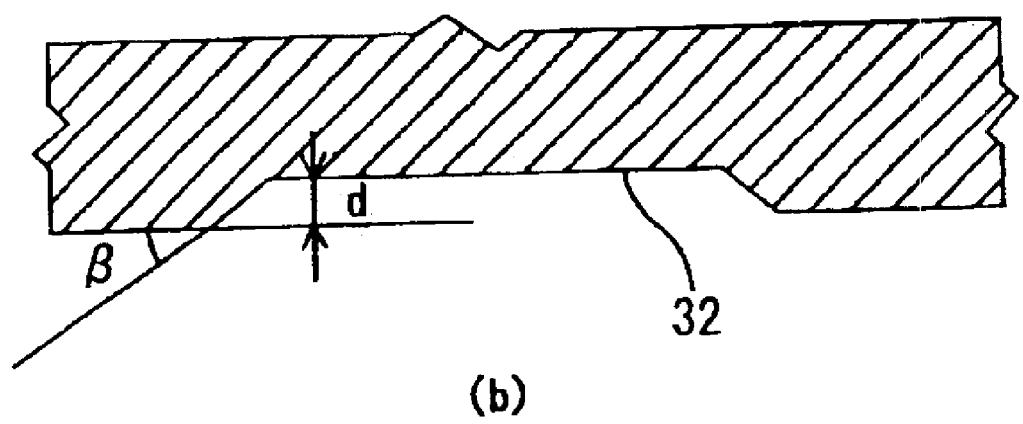
(b)

DISCRETE PATTERN, APPARATUS, METHOD, AND PROGRAM STORAGE DEVICE FOR GENERATING AND IMPLEMENTING THE DISCRETE PATTERN

This is a continuation division continuation-in-part of application Ser. No. 10/127,102, filed Apr. 19, 2000 now U.S. Pat. No. 6,754,419.

BACKGROUND OF THE INVENTION

1. Field of the Invention

The present invention relates to a discrete pattern. More particularly, the present invention relates to a discrete pattern having low discrepancy and including a pattern of dots arranged so there is no overlapping, an optical member, a light guide plate, a side light device and a light-transmitting liquid crystal display device that uses the discrete pattern, and to a method and a program for generating the discrete pattern, a computer-readable storage medium on which a computer-readable program is stored for generating the discrete pattern, and a discrete pattern generation system.

2. Background Art

Various techniques using discrete pattern are known. These techniques are used for a light guide plate, for example, of light-transmitting liquid crystal display device or a diffuser sheet, and the discrete pattern can be, for example, a dithering pattern, a lithography photomask pattern or a pattern for stopper. Recently, the application of a discrete pattern for a DNA arrangement on a DNA chip has also been discussed.

Conventionally, a discrete pattern is formed so that dots are arranged at random by using a so-called random-number generator, or the dots are arranged on a regular orthogonal lattice, such as plotting paper. However, with the conventional methods, the following problems have arisen for the random pattern that is generated merely by a common random-number generator. Specifically, even when dots are arranged at random, the overlapping of dots and uneven dot densities, which occur because each dot has a definite size, can adversely affect the appearance of a dot pattern, and an optical malfunction, such as uneven luminance, can occur. Further, when the dots are regularly arranged, an undesirable optical pattern, such as moire, can occur due to an interference between dots or with an external regular pattern.

To resolve the problem, a method is proposed in Japanese Unexamined Patent Publication No. Hei 10-153779 whereby an irregular pattern is generated without an excessive approach between the dots. According to this method, first, as an "absolute random number arrangement method", (1) the initial position (x, y) is provided for all the dots by a random-number generator; and (2) a random number is again generated for the overlapping dots and their positions are corrected. However, as for the calculation method disclosed in Japanese Unexamined Patent Publication No. Hei 10-153779, it is well known that the calculation performed to eliminate the overlapping of dots can not be convergent in an area having a dot filling rate of more than 50%. Specifically, when the method described in Japanese Unexamined Patent Publication No. Hei 10-153779 is used, it is quite difficult for an irregular pattern having no abnormal approach between dots to be generated, while maintaining randomness. Further, according to this method, which is based on the generation of multiple pseudo random numbers, it is also difficult to remove an uneven portion from a dot pattern, even if overlapping of dots can be removed from an area having a low dot filling rate.

FIG. 1 is a diagram showing an example dot pattern that is formed by the method described in Japanese Unexamined Patent Publication No. Hei 10-153779. The dot pattern in FIG. 1 is generated using a process whereby (1) dots are arranged at two-dimensional regular lattice points formed by linear lines or curves, and these positions are defined as initial positions; (2) the displacement of each initial position is provided by a random-number generator; and (3) a random number is again generated for the overlapping dots and their positions are corrected. As is shown in FIG. 1, according to this method, the dots can be arranged without overlapping, so long as only small displacements of the lattice points are maintained. However, according to a method for generating a random position as a perturbation from a lattice point, in an area having a comparatively high dot filling rate, such as a ratio exceeding 50%, it is difficult to generate a satisfactory irregular pattern while avoiding the occurrence of moire. Further, according to this method, which is based on the multiplex generation of pseudo random numbers, many aggregations of dots appear even if dot overlapping is removed, and it is difficult to generate a uniform random pattern.

The reasons for this will be explained. For the conventional example using random dots, assume that the size of the dots being arranged is about 100 $\mu$m and that the filling rate is 70%. As is shown in FIG. 1, the shape of a dot is assumed to be a square. With this dot size and the filling rate described above, an interval of merely 20 $\mu$m is generated between the dots. In FIG. 1, dots 100 and intervals 102 between the dots 100 are shown at an exact reduced scale. When random perturbation is provided for the regular lattice, dots 104, indicated by broken lines in FIG. 1, are obtained. It is understood that these dots 104 can only generate a pattern having an extremely limited irregularity (hereinafter referred to as randomness in this invention), as is shown in FIG. 1. Because the adjacent dots do not jump over each other, and because the filling rate is high, the positions of these dots are corrected only within a limited range.

A square lattice is employed in the conventional art in FIG. 1. However, under a condition wherein dots should not be arranged too closely together, the randomness of the dot pattern is more or less limited, even for other types of regular lattices. That is, according to the method whereby a predetermined dot is provided at an initial position and perturbation is employed to generate a random arrangement, in principle, as the filling rate increases, the possibility that a random dot pattern will be obtained that closely resembles a truly random arrangement decreases. Therefore, regardless of the filling rate, this method is not satisfactory for the generation of random patterns.

In addition, relative to the optical characteristic of a dot pattern generated by the above method, another problem has arisen in that a moire pattern will occur when a light beam is transmitted through or reflected from a dot pattern. Conventionally, in the printing field, many studies and proposals have been made to devise methods for removing moire. For example, in Japanese Unexamined Patent Publication No. 2000-94756, for a halftone process performed by a printer, a printing technique is disclosed for avoiding the occurrence of moire (so-called uneven feeding and uneven lines) caused by regular printing fluctuations, produced by the rotation of a paper feed drum, and printing dot patterns.

Therefore, in Japanese Unexamined Patent Publication No. 2000-94756, printing dots are arranged at random. That is, perturbation is provided at random for printing dots arranged on a regular lattice, an improvement that satisfactorily precludes the occurrence of the uneven dot densities that accompany the appearance of moire. However, for the above mentioned reasons, it is difficult for the randomness of this method to be directly applied for uniform discrete patterns.

The above problems, including the generation of random dot patterns and the occurrence and removal of moire, arise not only in the printing field, wherein printing techniques for printers are affected, but also in various other fields, such as the production of display devices that include rear lighting devices (hereinafter referred to as backlights).

As a specific example, since light, compact light-transmitting liquid crystal display devices can be made that consume little power, the production and use of these display devices have become ever more important as a core technique affecting the selection of hardware for use in the so-called IT revolution. However, since unlike conventional display devices, i.e., CRTs, liquid crystal devices do not emit light, backlight units must be provided that light all the liquid crystal cells in these devices. This is especially true today, since there is an increased demand for liquid crystal display devices having high resolution color displays, so that accordingly, a fervently desired characteristic of backlight units is that they uniformly, and brightly, illuminate large areas.

FIG. 2 is a diagram showing a light-transmitting liquid crystal display device, a typical display device that includes a backlight unit. An explanation will now be given, using the light-transmitting liquid crystal display device in FIG. 2, for a countermeasure for random dot patterns and moire. As is shown in FIG. 2, a conventional light-transmitting liquid crystal display device includes a backlight unit. The backlight unit includes: a light guide plate 108, on which a random dot pattern 106 is formed; a fluorescent tube CFL, which is arranged adjacent to the light guide plate 108; a reflector 112, which covers the fluorescent tube CFL to ensure efficient transmission, to the light guide plate 108, of light emitted by the fluorescent tube CFL; and a reflection sheet 114, which is used to efficiently reflect, to a liquid crystal panel (not shown), light scattered by the light guide plate 108.

Since, to the extent possible, the dot pattern 106 on the light guide plate 108 is formed at random, problems such as those presented by moire are resolved. As is shown in FIG. 2, a diffusion sheet 116 and prism sheets 118a and 118b, provided for the backlight unit, regulate the distribution of the light irradiating the liquid crystal panel.

The side light type backlight unit shown in FIG. 2 is frequently employed for small devices, such as notebook computers. In the backlight unit in FIG. 2, light emitted by a cold cathode fluorescence light (CFL), such as a fluorescent tube, is scattered by the dot pattern 106 formed on the bottom of the light guide plate 108, which is made of an acrylic resin, or the reflection sheet 114, which is arranged below the light guide plate 108. The thus scattered light is then transmitted to the liquid crystal panel (not shown), passing en route through the diffusion sheet 116 and the prism sheets 118a and 118b, which are arranged above the top face of the light guide plate 108. The thus distributed light can then be viewed by a user. That is, the backlight unit shown in FIG. 2 is a device for converting a line light source into a flat light source.

So long as the so-called side light device shown in FIG. 2 is employed, a mechanism for scattering light emitted by a light source and for reflecting the scattered light onto a liquid crystal panel is indispensable, and is an important device mechanism for improving the luminance produced by the backlight unit. Therefore, various studies have been initiated to examine manufacturing processes employed for the bottom of the light guide plate 108 or for the reflection sheet 114. For example, in Japanese Unexamined Patent Publication No. Hei 8-085001, the bottom of a light guide plate is processed by a cutting tool having a negative rake angle, so that the resultant irregular surface works as the light scattering plane. However, according to this method, it is difficult to quantitatively control the uniformity of the luminance provided by a backlight unit, and since scattered light is wasted due to its deflection in light scattering directions, the method is not appropriate for obtaining a high quality backlight unit that provides a high luminance.

Other methods have also been proposed: a method in Japanese Unexamined Patent Publication No. Hei 7-294745, whereby a groove having a recessed portion in cross section is formed in the bottom of a light guide plate and for scattering light on the top face of the light guide plate; and a method in Japanese Unexamined Patent Publication No. Hei 6-242320, whereby a pattern coated with a particle pigment, such as titanium dioxide, is formed on the bottom of a light guide plate. The above conventional methods include the same feature that provides for the formation of a light scattering structure having a specific geometrical, cyclic design, i.e., a dot pattern, is formed on a light guide plate. However, since generally an element including a small cyclic pattern, such as a color filter or a prism sheet, is indispensable for a liquid crystal display device, when the arrangement of a dot structure is cyclic, the dot structure and the light optically interfere with each other and generate a moire pattern. Since this moire pattern drastically deteriorates the value of a luminous object as a light source, it is preferable that, to the extent possible, the occurrence of moire be avoided.

Relative to the moire pattern described above that occurs as a result of a dot pattern formed on the light guide plate 108 of a display device, such as a light-transmitting liquid crystal display device using a backlight unit, the reduction of moire, as it is related to the various device techniques described above, has also been discussed.

For example, in Japanese Unexamined Patent Publication No. Hei 9-269489, a method for scattering light is disclosed whereby multiple, small light-scattering members, such as micro dots, are arranged at random on the bottom of a light guide plate. Further, an improved method is disclosed in Japanese Unexamined Patent Publication No. 2000-171797, and a method is disclosed in Japanese Unexamined Patent Publication No. Hei 11-250713 whereby dots are arranged at random on the top of a light guide plate in order to employ them for a reflection type liquid crystal display device. FIG. 3 is a diagram showing a conventional example for which a dot pattern generated at random is employed for a reflection type liquid crystal display device.

In the conventional case in FIG. 3, a light guide plate on which a random dot pattern is formed using a pseudo random number is used to constitute a backlight unit. In the backlight unit in FIG. 3, a fluorescent tube CFL and a reflector 124 are arranged adjacent to a light guide plate 122 on which multiple dots 120 are formed at random using a pseudo random number. The light guide plate 120, the fluorescent tube CFL and the reflector 124 in FIG. 3 are supported by a frame 126 and together constitute a backlight unit that reflects light in the direction indicated by an arrow A. As is explained while referring to FIG. 2, but not shown in FIG. 3, a reflection sheet, a diffusion sheet and a prism sheet are arranged on the backlight unit in FIG. 3.

Because of an optical need for the intensity of scattered light to be uniform across the entire light guide plate 122 that is used for the conventional backlight unit in FIG. 3, it may be necessary for the dot filling rate distribution, for example, to be continuously changed in the center area and in the four corner areas of the light guide plate 122. Therefore, a simple method has been studied that calls for the provision of an initial position to satisfy the obtained continuous distribution of the filling rate. For example, a method has been studied for forming a pattern wherein the filling rate is continuously changed by coupling areas having different lattice intervals. However, with this method, a defect encountered in many cases is that at the boundaries where filling rates are changed the seams are visible.

These seams can also be reduced by generating, across the entire plane on which dots are formed, a two-dimensional lattice whose shape is continuously changed to match the obtained filling rate distribution. However, excluding a case wherein the distribution is provided by a simple and easy analysis function, high level and extensive calculations are required for the generation of a lattice. That is, the conventional method used for calculating perturbations based on a lattice point is inadequate, not only for irregularities, but also for coping with the filling rate distribution.

For the above backlight unit, there is also a proposal according to which the structure is changed in order to improve the luminance or the angle of incidence of light. For example, a backlight unit wherein prisms are formed directly on the top of a light guide plate is proposed in "'99 latest liquid crystal process technique", Yoji Oki and Minoru Katsumata, Press Journal, Sep. 10th, 2000, page 441. In addition, it is also proposed that an optical sheet, such as a diffusion sheet or a prism sheet, is not provided.

However, since the above proposals require that precise control be provided for the scattering mechanism of the light guide plate, the probability of occurrence of moire or an interference stripe will be increased, and stricter discussion of a method to be used for the reduction of moire is required. Furthermore, a discrete pattern, including a dot pattern having a higher quality, must be provided because the abovementioned conventional pseudo random dot patterns are inappropriate for coping with a high filling rate distribution, the uniformity of dot patterns is inappropriate, and depending on the structure of a backlight unit, the occurrence of a specific type of interference stripe can not be avoided. To provide this discrete pattern, a method is required whereby, in addition to the randomness of the discrete pattern, an index for a uniformity must be introduced to generate a random discrete pattern that satisfies a stricter condition.

Recently, to solve a problem wherein sample points are irregularly and uniformly extracted from a predetermined area in multi-dimensional space, the use of the LDS method has been discussed, especially for a mathematical field, such as numerical integration. For example, in "IPSJ Magazine", Yoichi Ninomiya et al., Vol. 39, 1998, page 794, teaches that by using samples that are distributed irregularly and uniformly in an overall multi-dimensional space by using a determinative LDS, such as the Faure sequence or a Sobol sequence instead of pseudo random number, the price of a derivative can be quickly and accurately calculated by approximating a multi-dimensional integration solution as is done using the Monte Carlo method.

Further, as is explained in U.S. Pat. No. 5,872,725 and in Japanese Unexamined Patent Publication No. Hei 11-259452, the upper bound of discrepancy, which is a measure of a non-uniformity of point sets, is limited by an inequality in the above sequences. By using these sequences, the convergence of a multi-dimensional integration calculation, such as is used for the Monte Carlo method, can be quickly performed. Further, the use of numerical integration employing the LDS method is reported in order to increase the rendering speed attained by the ray tracing method.

As is described above, a pseudo random dot pattern that depends directly on randomness is inappropriate for an optical member that provides a preferable light guide plate, a backlight unit that uses the light guide plate, and a light-transmitting liquid crystal display device that uses this backlight unit. Therefore, a new method is required for controlling discrepancy and for generating an initial distribution. In this invention, a "discrepancy" is an index for the uniformity of the distribution of dispersed dots, as is described in "Discrepancy for points", for example, by Tezuka, in "Discrete structure and algorithm IV", edited by Kazuo Murota, Modern Science, Chapter 3.

Further, in halftoning which is a technique employed by printing or photocopying to express an image comprising a continuous tone such as a silver salt photograph film, that is to say, a continuous-tone image with a medium capable of only a binary expression, a discrete dot pattern also need be treated. In the fields of printing and photoengraving, the halftoning is also called "halftone printing". More generally, it can be said that said technique is a halftoning method to express a gradation of an image by densities of minute dots.

In recent years, since an industrial need for such halftoning method has become extremely large along with progress of printer and facsimile technologies, a variety of techniques have hitherto been proposed. The method to express a gradation by densities of minute dots having equal sizes is hereinafter called "FM (frequency modulated) screen method" although said method is expressed differently in different types of literacy. Said FM screen method is roughly classified into an error diffusion method and a mask method from a viewpoint of calculation method.

The error diffusion method tries to retain an image density by converting an input image into a binary image or a multiple-valued image by comparing said input image to a threshold value and then diffusing an error generated between an output value and input value at said conversion by weighting thereof to a predetermined nearby pixel group. In this case, pixels of the input image and the output image correspond to each other at the ratio of 1 to 1. An image output by said method is put into a practical use in a wide range since said image is assumed to have a relatively fine image quality and an excellent resolution. Said method however requires a somewhat complicated calculation for each pixel in comparison to the mask method which simply carries out the halftoning by comparing an input image to a given threshold value. Further, since dot strike positions differ depending on an input image, there is a difficulty in predicting a degree of a color mixture resulting in poor reproduction of colors. Further, the fact that a transient region appears in a boundary region whereto the error diffusion method is applied and the fact that a false image called "worm" or "serpentine raster" is often observed are assumed to be unresolved problems (P. 295 of Takashi Yahagi, "Multimedia and Digital Signal Processing" by Coronasha, 1997). In addition, electronic hardware has been progressed remarkably in recent years and so an amount of calculation that increases along with the error diffusion is not a fatal problem. Problems related to an image quality however are assumed to require improvement.

In order to reduce problems of the error diffusion method related to an image quality, many trials such as changing a distribution of error allocation to peripheral regions (there are a variety of distributions, e.g., the Floyd-Steinberg method and the like) and optimizing a scanning direction of the diffusion (refer to, e.g., T. Asano, "Digital halftoning algorithm based on random space-filling curve", Proc. International Conference on Image Processing, 1996, 545). In the method of distributing an error of one pixel to peripheral limited regions, a certain degree of problem arising related to an image quality is essentially inevitable. The reason why is that distinction of an error occurrence side and a side taking charge of an error is adopted to the error diffusion method depending on a scan direction and such distinction is merely artificial as long as dots constituting a binarized image are equal.

The same can be said regarding halftoning of an image. Essentially, the binarized image must be determined so that an entire original image is reproduced correctly. A method of adopting a relationship between pixels in consideration of either the binarized image or the original image is essentially a mere approximation. As apparent from the foregoing description, improvement of the error diffusion method has a long history. Any improvement made in said history however is like a symptomatic treatment on premise of existence of an error diffusion algorithm. The best halftoning algorithm is perhaps an algorithm based on mutual relationships between all pairs of dots. An algorithm also capable of reproducing a gradation gradient however has not been known.

Ulichney's standards related to a quality of a binarized image and the conventional technique of the mask method are further described hereinafter. Ulichney presents the two conditions given hereunder as visually preferable conditions for an FM screen pattern (R. A. Ulichney, Proceedings of the IEEE, 76 (1988) 56):

1. a radius Fourier component related to a dot distribution has a "blue noise" characteristic, and 2. a dot distribution is isotropic.

Said references are currently accepted in a wide range as standard indexes for evaluating an image quality.

The discovery by Ulichney has been proposed along with a directionality of improving the error diffusion algorithm. Thereafter, application of said knowledge to the mask method to construct the halftoning method partly supplementing a defect of the error diffusion method has been studied. That is to say, a way of producing a mask that gives a threshold value at halftoning so that said quantitative references presented by Ulichney are satisfied was worked out. This method is often called "blue noise mask method". Representative thesis thereof is Mitsa-Parker (T. Mitsa and K. J. Parker, J. Opt. Soc. Am. A, 9 (1992) 1920). Similarly, Japanese Patent No. 2622429 and U.S. Pat. No. 5,111,310 may be enumerated as theses that generally describe the conventional methods.

FIG. 4 is a schematic view showing processing of the mask method (systematic dither method). FIG. 4(a) shows a read image, FIG. 4(b) shows a dither matrix, and FIG. 4(c) shows a displayed image. In general, the mask method carries out the halftoning by comparing a read image to a given threshold value of a matrix. FIG. 4 shows the simplest mask method wherein original pixels of an original image and a binarized image correspond to each other at a ratio of 1 to 1. In FIG. 4, the method to determine black and white of a binarized image from a magnitude relationship between a value shown in a mathematical table called "dither matrix" and a brightness value of an original image after comparing thereof. The objective of the blue noise mask method is to make a resulting binarized image (shown in FIG. 4(c)) have an isotropic blue noise characteristic. Accordingly, it can be said that the halftoning issue of a continuous-tone image is essentially equal to the optimization issue of a dot pattern. The blue dot characteristic denotes a discrete pattern wherein dot distribution is centered at a principal wavelength related to a ratio between an area of each dot and a filling factor in a predetermined gradation level ideally.

The mask method further includes a method of corresponding a dot pattern comprising a large number of dots to one original pixel. Said method is called "one-to-multiple mask method" and the method shown in FIG. 4 is called "one-to-one mask method" for convenience.

As apparent from the foregoing description and as described in details in Japanese Patent Laid-Open No. 2000-59626, most current halftoning methods are designed based on said Ulichney's standards. As presented by Ulichney based on the error diffusion method, it has been known that a binarized image satisfying the Ulichney's standards actually becomes a smooth image having neither a roughness nor a geometrical pattern. The Ulichney's standards however have a defect of restrictions on a quantity of macros and said standards are therefore inappropriate as direct standards for real production of macros. More specifically, even if conditions for a preferable power spectrum (equal to Fourier transformation of an autocorrelation function related to dot position distribution according to the Wiener-Khinchin's theorem) are presented, it is not easy to create a dot pattern or a threshold value mask based on the dot pattern. Further, even if a restriction on an isotropy is given, the method to realize thereof is not self-evident. Such problems are also applicable to series of studies related to the "green noise mask" method by Lau, et al. (refer to, e.g., D. L. Lau, G. R. Arce, and N. C. Gallaghe, Proc. IEEE, 86 (1998) 2424).

Further, the Ulichney's conditions are unsatisfactory in that there is no effective index directly denoting an unevenness of a dot pattern. In fact, a dot pattern based on a white noise (specifically, a pattern wherein dot positions are sampled randomly with pseudo-random numbers) is given according to Ulichney (R. A. Ulichney, Proceedings of the IEEE, 76 (1988) 56). Said dot pattern however is judged to be "completely isotropic (−10 dB)" at a quantity corresponding to the Ulichney's anisotropy.

The present situation of the one-to-multiple blue mask method is further described hereinafter. U.S. Pat. No. 4,920,501 discloses a halftoning method to provide dot patterns having blue noise characteristics for individual brightness values and replace original pixels by said dot patterns according to the brightness values of the original pixels. Primarily, an overview of the one-to-multiple mask method is shown in figures. As shown in FIG. 5, an original image OP is divided into small blocks (FIG. 5(a)). Select a dot pattern of a spread-out type dot pattern corresponding to a representative brightness value (defined to J) of the original image OP divided into small blocks (FIG. 5(a)). Said spread-out type dot pattern becomes a binarized image of a small block (FIG. 5(c)). In FIG. 5, the number of gradations is specified to 256 gradations and 256 dot patterns thereof are assumed to be stored in a memory in advance. The method disclosed in U.S. Pat. No. 4,920,501 is listed below.

1. Determine a size of a mask and then determine the number of dots appropriate for a gradation.

2. Distribute dots randomly on a mask with pseudo-random numbers.

3. Calculate a visual cost function.

4. Select one pixel randomly from black (1) pixels of a mask, one from white (0) pixels and then exchange values thereof.

5. Calculate a visual cost function based on a new disposition and obtain a difference from a previous visual cost function $\Delta c$.

6. Obtain a Boltzmann statistic as against $\Delta c$ and a "temperature" T, compare the $\Delta c$ value and a random number value and determine whether or not to adopt a new disposition. When the new disposition is determined not adopted, return to 4.

Characteristics of the dot pattern generation method are that initial disposition is generated with random numbers and said initial disposition is relaxed by a simulated annealing method (refer to Section 9.4 of Hidenori Nishimori, "Spin glass theory and information statistical dynamics", published by Iwanami Shoten, 1999). Said conventional method presents that frequency characteristics of the initial disposition having a white noise characteristic may be improved by employing an optimization method. Said conventional method further presents that said algorithm may produce a blue mask fairly satisfying the Ulichney conditions. The initial disposition generated with pseudo-random numbers however has a defect of an apparently great unevenness and so it is impossible to binarize the initial disposition as is in high quality.

Improvement of said method is studied in Japanese Patent Laid-Open Publication Heisei No. 10-275228. According to a method disclosed in Japanese Patent Laid-Open Publication Heisei No. 10-275228, the simulated annealing method is employed to determine other patterns sequentially from a halftone pattern as an initial pattern so that Mitsa-Parker conditions described later. Said initial patterns are not determined with random numbers like "darts", but adoption of an appropriate pattern by the conventional technique is merely instructed. In either way, patterns are created in procedures of initial position generation and optimization in this order disclosed in Japanese Patent Laid-Open Publication Heisei No. 10-275228.

As disclosed in Japanese Patent Laid-Open Publication Heisei No. 10-275228 however, if halftone patterns are selected appropriately based on the Ulichney's standards, a multi-gradation pattern generated from said halftone patterns are always somewhat not being unoptimized inappropriately. For example, dot patterns are assumed to be optimized so that spaces between most adjacent dots are mostly concentrated to a specific value. Then, when one dot is added to said dot pattern, a field having unoptimized spaces between dots always appears in the vicinity of said dot. The reason why is because already-created dots are assumed to be fixed.

Specifically, said methods have principle defects from the viewpoint of optimizing a dot pattern. Further, no specific improvement of an optimization method for a start pattern is studied in Japanese Patent Laid-Open Publication Heisei No. 10-275228.

Furthermore, optimum halftoning by the one-to-one blue mask method is not yet satisfactory and so a variety of types of improvements are being studied. Mitsa and Parker explain that the conditions represented by the formula given hereunder must be satisfied when producing a one-to-one blue mask (T. Mitsa and K. J. Parker, J. Opt. Soc. Am. A, 9 (1992) 1920):

if $g_2 > g_1 \cap p(i, j; g_1) = 1 \Rightarrow p(i, j; g_2) = 1$ (wherein $p(i, j, g_2)$ denotes an output value (0 or 1) of an (i, j) block in a mask pattern of a $g_2$ gradation. Said condition describes that "when the (i, j) block in a $g_1$ gradation is black, the same block in the $g_2$ gradation higher than the $g_1$ gradation is also black". Said condition is hereinafter called "Mitsa-Parker condition" for convenience. As described in details in Japanese Patent Laid-Open Publication No. 2000-59626, when said Mitsa-Parker condition is satisfied, a threshold value mask (wherein 256 gradations are assumed) may be created from the relationship represented by the formula given hereunder.

$$m(i, j) = 256 - \sum_{g=1}^{256} p(i, j; g)$$

Specifically, the threshold value mask for the one-to-one mask method may be employed to produce a threshold value mask for a one-to-one mask under the Mitsa-Parker condition.

On premise of said fact, a production method of a threshold value mask having a blue noise characteristic is disclosed in Japanese Patent Laid-Open Publication No. 2001-298617. According to said method, high-gradation patterns are produced sequentially in procedures of giving repulsion potentials to dots in a gradation pattern of a previous stage (lower) and creating new dots on the lowest point of the potentials in this order starting from a low-gradation dot pattern (wherein a regular dither method based on a Bayer matrix is employed to create dots). Disclosed in Japanese Patent Laid-Open Publication No. 2001-298617 is that said principle may be employed to produce a homogeneous dot pattern having a blue noise characteristic. In addition, said publication's example is essentially equal to the method described in W. Purgathofer, R. F. Tobler, and M. Greler, Proceedings of the International Conference on Image Processing, 1032 (1994). The article also proposes the repulsion potential represented by the formula given hereunder:

$$V(r) = \exp\left(-\left(\frac{r}{s}\right)^p\right),$$

wherein r denotes a distance from a dot. The formula described above indicates that the potential decreases rapidly when the distance exceeds a values. Said method may be interpreted to a trial of changing an expression of the Ulichney standards to a micro expression. The reason why is that Ulichney states that a pattern having a blue noise characteristic may be created when spaces between most adjacent dots are concentrated properly around a "principal wavelength". A technique to obtain a preferable spectrum characteristic of a pattern from such a viewpoint has not yet been proposed.

The method proposed by W. Purgathofer, R. F. Tobler and M. Greler and the method disclosed in Japanese Patent Laid-Open Publication No.2001-298617 are not satisfactory as dynamic mitigation processes. Dot patterns are assumed to be optimized so that the spaces between most adjacent dots are mostly concentrated to the value s in the specific gradation as described above. Then, when one dot is added to said dot pattern, a field having unoptimized spaces between dots always appears in the vicinity of said dot. The reason why is because already-created dots are assumed to be fixed.

More recently, Hiller, et al. have proposed a strong mitigation algorithm (S. Hiller, O. Deussen, and A. Keller, "Tiled Blue Noise Samples", Proceedings of the 6th International Fall Workshop on Vision, Modeling, and Visualization 2001, in press). It is reported that the method proposed by Hiller, et al. is employed to generate a dot pattern with pseudo-random numbers and then a mitigation algorithm called "Lloyd method" is applied to generate a dot pattern having a blue noise characteristic in high-speed. The Lloyd's method is to level spaces between most adjacent dots by repeating an operation of moving dots to a gravity center of each Voronoi polygon based on so called Voronoi division. FIG. 6 shows said method. FIG. 6(a) shows randomly generated initial positions and Voronoi division thereof, FIG. 6(b) shows a process of Lloyd mitigation and FIG. 6(c) shows a dot pattern after the mitigation. Hiller, et al. further emphasizes that an even binarized image may be generated without a problem, e.g., a joint between blocks or the like, by also generating Voronoi diagrams on boundaries appropriately.

Said method improves problems peculiar to the mitigation process so-far described. Specifically, even patterns are generated by mitigating all dots without dividing dots into relaxed dots and mitigating dots. Moreover, the principle of mitigation is based on a method of directly optimizing spaces between most adjacent dots.

However, it is clear that the method of Hiller, et al. has two defects. The first defect is that it is difficult to create a dot pattern having a gradually changed gradation by said method based on the Voronoi division. The second defect is that use of pseudo-random numbers for generation of initial positions results in unevenness in a relaxed pattern.

As is apparent from the foregoing description, a method of enabling generation of a pattern having sequential filling factor distributions to an area of a high filling factor exceeding 50% without an optical defect that can be observed visually is not available. Further, imposing a strong upper limit to filling factors is a great hindrance in controlling a brightness, a transitivity and a reflection factor. Therefore, it has been desired that a filling factor distribution to be given satisfactory without causing moiré while giving a higher flexibility by generating a discrete pattern without being restricted by mutual influences of filling factors even when a filling factor distribution exists. Moreover, the method of employing the pseudo-random number generation method to generate a random dot pattern may not deal with a high filling factor and, in addition, said method has defects regarding computer resources of a large deviation in a dot distribution and a time of work required for correction thereof.

Specially, when an arbitrary filling factor distribution from a low filling factor to a high filling factor is given, proposal of an ideal generation method for a dot pattern has been required for existence of a sharp filling factor gradient wherein a change in a filling factor per dot diameter exceeds 1%. Further, manufacturing of optical components that do not cause errors, e.g., unevenness, coloring, moiré and the like, by employing said method to generate dots on a shading film, a photomask and the like. A dot pattern generating method that may retain a filling factor distribution appropriately by adding or deleting dots suitably when a filling factor gradient is specially sharp has also been required.

Further, the contents equivalent to the Ulichney standards described with macro languages may be described by employing only micro quantities that define dot positions and so an algorithm to specifically realize said description is required. Still further, if a generation method for a dot pattern that proposes a quantitative standard regarding unevenness insufficiently expressed by the Ulichney standards and then specifically satisfies said quantitative standard, said generation method for a dot pattern yields a considerable profit in practical use.

Still further, sizes after tile-like division are almost determined by a resolution of an output side and numbers of bits required to express a gradation and said sizes impose a restriction on a method of removing sensible artifacts. It is possible to remove said restriction by permitting gradation gradients in tiles wherein the halftoning method has been required.

Still further, proposal of an algorithm representing the Ulichney standards in a form of being directly related to micro quantities that define dot positions has been required.

Furthermore, proposal of an algorithm representing the Ulichney standards in a format of direct connection to a micro quantity for defining dot positions is desired.

That is to say, a generating method for discrete patterns disposed sufficiently randomly having low discrepancies and which do not overlap with each other has been required.

Further, a generation method for a discrete pattern enabling the above-described dot patterns to be disposed sufficiently randomly regardless of filling factors has been required.

Still further, a program for generating said discrete patterns and a storage medium wherein said program is stored have been required.

Furthermore, optical components comprising said patterns have been required.

Further, an optical waveguide comprising said discrete patterns and a back light unit comprising said optical waveguide have been required.

Still further, a transmissive liquid crystal display device comprising said back light unit comprising said discrete patterns has been required.

Still further, a discrete pattern generation system for generating said discrete patterns has been required.

SUMMARY OF THE INVENTION

To achieve the above objects, according to a first construction of the present invention, an arrangement whereby the discrepancy is sufficiently low in a predetermined area is employed as the initial position for forming discrete patterns having improved randomness. As a result, uniform randomness is maintained for the discrete patterns. Further, in this invention, starting from a dot pattern with a low discrepancy as the initial pattern, the position of each dot is displaced by a repulsive force between dots having a definite size, so that the overlapping of the dots is eliminated.

According to the second construction of the present invention, an excellent discrete pattern may be provided based on a predetermined filling factor by generating or deleting dots automatically. According to the second construction of the present invention, dots may be generated automatically from initial dots and said low discrepancy sequence method may be employed to generate initial dots and then the dots may be generated or deleted automatically regarding a filling factor after dot positions are relaxed.

According to the third construction of the present invention, a procedure of generating an initial position of a dot pattern and then easing said initial position to obtain a binarized pattern. The third construction of the present invention specially takes into consideration of a characteristic called "isotropy". One feature of the characteristic called isotropy is simply put into no unevenness in a dot pattern. To achieve the objective of no unevenness in a dot pattern, said low-discrepancy sequence (LDS) may be used.

The LDS is a matrix wherein an upper limit is imposed on a discrepancy as an index of unevenness and an irregularity may be adopted by an appropriate mathematical operation. Since a quantity discrepancy is adopted newly as a means for quantization, a variable-density image may be binarized effectively.

In this invention, a process for removing overlapping dots, while assuming that a repulsive force is exerted between them, is defined as the repulsive force relaxation method. Even when a filling rate is high, the overlapping of dots is removed, using the repulsive force relaxation method, from an initial position with a low discrepancy, and a discrete pattern can be generated for which discrepancy remains low. In addition, since the filling rate and the discrepancy can be reduced for each predetermined area, even when the filling rate is continuously changed, a discrete pattern can be provided wherein satisfactory randomness is maintained and the filling rate is continuously changed, without causing a problem due to a change in the uniformity of the randomness of a dot pattern, i.e., a problem generated at a boundary whereat there is a change in the filling rate.

An optical member including the discrete pattern provided by this invention can uniformly provide a high luminance, without generating moire patterns.

The above objects of the invention are especially achieved by providing a discrete pattern according to the invention, an optical member that uses the discrete pattern, a light guide plate, a side light device, a light-transmitting liquid crystal display device, a discrete pattern generation method and a program that employs the discrete pattern generation method to generate discrete patterns, a computer-readable storage medium on which the program for generating discrete patterns is recorded, and a discrete pattern generation system.

According to the present invention, a discrete pattern, formed by dots discretely arranged in two dimensions, is provided wherein the dots included in a rectangular area having a longitudinal length of Lx and a transverse length of Ly satisfy expression (1), $$D \leq 0.13N^{-1.15} \quad (1)$$

(in expression (1), N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x,y) is a diagonal line), $$D(L_x, L_y; N) = \int\int_{L_x \times L_y} \left[\frac{A(x, y)}{N} - \frac{xy}{L_x L_y}\right]^2 \frac{dxdy}{L_x L_y} \quad (2)$$

and wherein $S_1$ that is obtained by expression (3)

$$S_1(r_1, r_2) = \int_{r_1}^{r_2} dr |g_1(r; r_1, r_2) - g_{av}| \quad (3)$$

is equal to or smaller than 0.7. (In expression (3), $g_1$ is obtained by dividing the average radial distribution function g(r) of each dot in the area by an integration value of g(r) over a range of from $r_1$ to $r_2$, and $g_{av}$ is the average value of $g_1$ within the range of from $r_1$ to $r_2$. When the dots are arranged in a square lattice to satisfy a given filling rate, $r_1$ and $r_2$ are chosen as one and four times the value of the lattice constant Dr respectively. The dot filling rate is a value obtained by multiplying the square of the maximum diameter of a dot by the number of dots, and dividing the product by the size of the area.)

According to the invention, expression (1) is satisfied when the number of predetermined dots included in the area is equal to or smaller than 4000. D denotes the square of the discrepancy and for the dots included in the area, it is preferable that the exponent be smaller than −1.15 at a predetermined filling rate.

It is preferable that $S_1$ be equal to or smaller than 0.4, and that the discrete pattern be an arrangement wherein the average radial distribution function for the area is satisfactory smooth.

Each of the dots can have at least a two-dimensional or three-dimensional shape selected from a group including a polygon, a circle, a square, a rectangle, an ellipse, a circular conic and a polyhedron. The discrete pattern is so arranged that substantially adjacent dots are not overlapped. Further, the discrete pattern can be arranged without depending on the filling rate of the dots in the area. In addition, the discrete pattern can passively control a light beam. The control of the light beam is exercised by the scattering of light, the transmission of light or the absorption of light, and can be performed for a light guide plate, a light scattering plate, a dithering pattern, and a lithography photomask pattern.

According to the present invention, an optical member is provided on which a discrete pattern is formed by dots discretely arranged in two dimensions, wherein the dots included in a rectangular area having a longitudinal length of Lx and a transverse length of Ly satisfy expression (1), $$D \leq 0.13N^{-1.15} \quad (1)$$

(in expression (1), N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x,y) is a diagonal line), $$D(L_x, L_y; N) = \int\int_{L_x \times L_y} \left[\frac{A(x, y)}{N} - \frac{xy}{L_x L_y}\right]^2 \frac{dxdy}{L_x L_y} \quad (2)$$

and wherein $S_1$ that is obtained by expression (3)

$$S_1(r_1, r_2) = \int_{r_1}^{r_2} dr |g_1(r; r_1, r_2) - g_{av}| \quad (3)$$

is equal to or smaller than 0.7. (In expression (3), $g_1$ is obtained by dividing the average radial distribution function g(r) of each dot in the area by an integration value of g(r) over a range of from $r_1$ to $r_2$, and $g_{av}$ is the average value of $g_1$ within the range of from $r_1$ to $r_2$. When the dots are arranged in a square lattice to satisfy a given filling rate, $r_1$ and $r_2$ are chosen as one and four times the value of the lattice constant Dr respectively. The dot filling rate is a value obtained by multiplying the square of the maximum diameter of a dot by the number of dots, and dividing the product by the size of the area.)

According to the invention, it is preferable that expression (1) be satisfied when the number of predetermined dots included in the area is equal to or smaller than 4000. D is the square of the discrepancy, and for the dots included in the area, the exponent is smaller than −1.15 at a predetermined filling rate. $S_1$ is equal to or smaller than 0.4, and that the discrete pattern be an arrangement wherein the average radial distribution function for the area is satisfactory smooth. Each of the dots has at least a two-dimensional or three-dimensional shape selected from a group including a polygon, a circle, a square, a rectangle, an ellipse, a circular conic and a polyhedron. The discrete pattern is so arranged that substantially adjacent dots are not overlapped. Further, the discrete pattern is arranged without depending on the filling rate of the dots in the area. In addition, the discrete pattern passively controls a light beam. The control of the light beam is exercised by the scattering of light, the transmission of light or the absorption of light, and is performed for a light guide plate, a light scattering plate, and a photomask.

According to the present invention, a light guide plate, used for a light-transmitting liquid crystal display device, is provided on which a discrete pattern is formed by dots discretely arranged in two dimensions, wherein the dots included in a rectangular area having a longitudinal length of Lx and a transverse length of Ly satisfy expression (1), $$D \leq 0.13 N^{-1.15} \quad (1)$$

(in expression (1), N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x,y) is a diagonal line), $$D(L_x, L_y; N) = \int\int_{L_x \cdot L_y} \left[ \frac{A(x, y)}{N} - \frac{xy}{L_x L_y} \right]^2 \frac{dxdy}{L_x L_y} \quad (2)$$

and wherein $S_1$ that is obtained by expression (3)

$$S_1(r_1, r_2) = \int_{r_1}^{r_2} dr |g_1(r; r_1, r_2) - g_{av}| \quad (3)$$

is equal to or smaller than 0.7. (In expression (3), $g_1$ is obtained by dividing the average radial distribution function g(r) of each dot in the area by an integration value of g(r) over a range of from $r_1$ to $r_2$, and $g_{av}$ is the average value of $g_1$ within the range of from $r_1$ to $r_2$. When the dots are arranged in a square lattice to satisfy a given filling rate, $r_1$ and $r_2$ are chosen as one and four times the value of the lattice constant Dr respectively. The dot filling rate is a value obtained by multiplying the square of the maximum diameter of a dot by the number of dots, and dividing the product by the size of the area.)

According to the invention, expression (1) is satisfied when the number of predetermined dots included in the area is equal to or smaller than 4000. D is the square of the discrepancy, and for the dots included in the area, the exponent is smaller than −1.15 at a predetermined filling rate. $S_1$ is equal to or smaller than 0.4, and that the discrete pattern be an arrangement wherein the average radial distribution function for the area is satisfactory smooth. Each of the dots has at least a three-dimensional shape selected from a group including a polygon, a circle, a square, a rectangle, an ellipse, a circular conic and a polyhedron. The discrete pattern is so arranged that substantially adjacent dots are not overlapped. Further, the discrete pattern is arranged without depending on the filling rate of the dots in the area, and in corner areas of the light guide plate, the dots are arranged at a higher filling rate than that for the center area of the light guide plate. The light guide plate includes a display area wherein the discrete pattern is formed and a non-display area enclosing the display area.

According to the invention, a side light device comprises:

a light guide plate, on which a discrete pattern is formed by dots discretely arranged in two dimensions, wherein the dots included in a rectangular area having a longitudinal length of Lx and a transverse length of Ly satisfy expression (1), $$D \leq 0.13 N^{-1.15} \quad (1)$$

(in expression (1), N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x,y) is a diagonal line), $$D(L_x, L_y; N) = \int\int_{L_x \cdot L_y} \left[ \frac{A(x, y)}{N} - \frac{xy}{L_x L_y} \right]^2 \frac{dxdy}{L_x L_y} \quad (2)$$

and wherein $S_1$ that is obtained by expression (3)

$$S_1(r_1, r_2) = \int_{r_1}^{r_2} dr |g_1(r; r_1, r_2) - g_{av}| \quad (3)$$

is equal to or smaller than 0.7 (In expression (3), $g_1$ is obtained by dividing the average radial distribution function g(r) of each dot in the area by an integration value of g(r) over a range of from $r_1$ to $r_2$, and $g_{av}$ is the average value of $g_1$ within the range of from $r_1$ to $r_2$. When the dots are arranged in a square lattice to satisfy a given filling rate, $r_1$ and $r_2$ are chosen as one and four times the value of the lattice constant Dr respectively. The dot filling rate is a value obtained by multiplying the square of the maximum diameter of a dot by the number of dots, and dividing the product by the size of the area.);

a light source for projecting light onto the light guide plate; and a reflector for reflecting the light projected by the light source and transmitting the reflected light to the light guide plate.

According to the invention, expression (1) is satisfied when the number of predetermined dots included in the area is equal to or smaller than 4000. D is the square of the discrepancy, and for the dots included in the area, the exponent is smaller than −1.15 at a predetermined filling rate. $S_1$ is equal to or smaller than 0.4, and that the discrete pattern be an arrangement wherein the average radial distribution function for the area is satisfactory smooth. Each of the dots has at least a three-dimensional shape selected from a group including a polygon, a circle, an ellipse, a square, a rectangle, a circular conic and a polyhedron. The discrete pattern is so arranged that substantially adjacent dots are not overlapped. Further, the discrete pattern is arranged without depending on the filling rate of the dots in the area, and in corner areas of the light guide plate, the dots are arranged at a higher filling rate than that for the center area of the light guide plate. The light guide plate includes a display area wherein the discrete pattern is formed and a non-display area enclosing the display area.

Further, according to the invention, a light-transmitting liquid crystal display device comprises:

the above described side light device as a backlight unit.

According to the invention, a method for generating a discrete pattern wherein dots are discretely arranged in two dimensions comprises the steps of:

providing a predetermined area;
determining the number of dots to be arranged in the predetermined area; and
determined the position coordinates of the dots, so that the dots included in a rectangular area having a longitudinal length of Lx and a transverse length of Ly satisfy expression (1), $$D \leq 0.13 N^{-1.15} \qquad (1)$$

(in expression (1), N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x, y) is a diagonal line), $$D(L_x, L_y; N) = \int\int_{L_x \times L_y} \left[\frac{A(x,y)}{N} - \frac{xy}{L_x L_y}\right]^2 \frac{dxdy}{L_x L_y} \qquad (2)$$

and wherein $S_1$ that is obtained by expression (3)

$$S_1(r_1, r_2) = \int_{r_1}^{r_2} dr \, |g_1(r; r_1, r_2) - g_{av}| \qquad (3)$$

is equal to or smaller than 0.7 (In expression (3), $g_1$ is obtained by dividing the average radial distribution function g(r) of each dot in the area by an integration value of g(r) over a range of from $r_1$ to $r_2$, and $g_{av}$ is the average value of $g_1$ within the range of from $r_1$ to $r_2$. When the dots are arranged in a square lattice to satisfy a given filling rate, $r_1$ and $r_2$ are chosen as one and four times the value of the lattice constant Dr respectively. The dot filling rate is a value obtained by multiplying the square of the maximum diameter of a dot by the number of dots, and dividing the product by the size of the area.);

setting the position coordinates as initial positions; and changing the position coordinates of the dots so that the dots for which the position coordinates are determined do not overlap each other.

The step of determining the position coordinates includes the steps of:

generating and storing a first generator matrix for each coordinate axis;

employing the first generator matrix to generate and store a second generator matrix;

generating, as a first vector, the binary representation of a natural number n of a set of N natural numbers corresponding to N dots in the area;

generating a second vector using a product of the first vector and the second generator matrix;

generating the position coordinates of the dots while, for the coordinates, the elements of the second vector are defined as the values of the digits of a binary decimal number; and increasing the natural number n by a predetermined number and generating position coordinates until the total number of repetitively generated point coordinates equals the number N of dots in the area. Further, the discrete pattern generation method further comprises the step of: generating a discrete pattern having a predetermined size by employing a predetermined boundary condition between any two of multiple areas. The step of changing the position coordinates includes the step of calculating a repulsive force between adjacent dots depending on their distances and their sizes. The step of changing the position coordinates includes the steps of:

calculating a repulsive force exerted by another dot located near a predetermined dot;

displacing the predetermined dot in accordance with the magnitude of the repulsive force;

calculating a repulsive force for the predetermined dot that is displaced; and calculating a total for the repulsive forces of dots located within a predetermined range.

The discrete pattern generation method further comprises the step of: repetitively performing the step of changing the position coordinates until a predetermined convergence condition is established by a difference between a total of first potential energy and a total of second potential energy, which are calculated immediately before getting the total of first potential energy. When the interval between the dots is equal to or smaller than a predetermined value, the repulsive force is substantially constant, and when the interval exceeds the predetermined value, the repulsive force is reduced in accordance with the increase in the interval. The initial positions of the dots are obtained by using low-discrepancy sequences.

According to the invention, a program is provided for executing a method for generating a discrete pattern wherein dots are discretely arranged in two dimensions, the program comprising the steps of:

providing a predetermined area;

determining the number of dots to be arranged in the predetermined area; and determined the position coordinates of the dots, so that the dots included in a rectangular area having a longitudinal length of Lx and a transverse length of Ly satisfy expression (1), $$D \leq 0.13 N^{-1.15} \qquad (1)$$

(in expression (1), N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x, y) is a diagonal line), $$D(L_x, L_y; N) = \int\int_{L_x \times L_y} \left[\frac{A(x,y)}{N} - \frac{xy}{L_x L_y}\right]^2 \frac{dxdy}{L_x L_y} \qquad (2)$$

and wherein $S_1$ that is obtained by expression (3)

$$S_1(r_1, r_2) = \int_{r_1}^{r_2} dr \, |g_1(r; r_1, r_2) - g_{av}| \qquad (3)$$

is equal to or smaller than 0.7 (In expression (3), $g_1$ is obtained by dividing the average radial distribution function g(r) of each dot in the area by an integration value of g(r) over a range of from $r_1$ to $r_2$, and $g_{av}$ is the average value of $g_1$ within the range of from $r_1$ to $r_2$. When the dots are arranged in a square lattice to satisfy a given filling rate, $r_1$ and $r_2$ are chosen as one and four times the value of the lattice constant Dr respectively. The dot filling rate is a value obtained by multiplying the square of the maximum diameter of a dot by the number of dots, and dividing the product by the size of the area.);

setting the position coordinates as initial positions; and changing the position coordinates of the dots so that the dots for which the position coordinates are determined do not overlap each other.

The step of determining the position coordinates includes the steps of:

generating and storing a first generator matrix for each coordinate axis;

employing the first generator matrix to generate and store a second generator matrix;

generating, as a first vector, the binary representation of a natural number n of a set of N natural numbers corresponding to N dots in the area;

generating a second vector using a product of the first vector and the second generator matrix;

generating the position coordinates of the dots while, for the coordinates, the elements of the second vector are defined as the values of the digits of a binary decimal number; and increasing the natural number n by a predetermined number and generating position coordinates until the total number of repetitively generated point coordinates equals the number N of dots in the area. Further, the program further comprises the step of generating a discrete pattern having a predetermined size by employing a predetermined boundary condition between any two of multiple areas. The step of changing the position coordinates includes the step of calculating a repulsive force between adjacent dots depending on their distances and their sizes. The step of changing the position coordinates includes the steps of:

calculating a repulsive force exerted by another dot located near a predetermined dot;

displacing the predetermined dot in accordance with the magnitude of the repulsive force;

calculating a repulsive force for the predetermined dot that is displaced; and calculating a total for the repulsive forces of dots located within a predetermined range. The program further comprises the step of: repetitively performing the step of changing the position coordinates until a predetermined convergence condition is established by a difference between a total of first potential energy and a total of second potential energy, which are calculated immediately before getting the total of first potential energy. When the interval between the dots is equal to or smaller than a predetermined value, the repulsive force is substantially constant, and when the interval exceeds the predetermined value, the repulsive force is reduced in accordance with the increase in the interval. It is preferable that the initial positions of the dots be obtained by using low-discrepancy sequences.

According to the invention, a computer-readable storage medium is provided on which a program is stored that executes a method for generating a discrete pattern wherein dots are discretely arranged in two dimensions, the program comprising the steps of:

providing a predetermined area;

determining the number of dots to be arranged in the predetermined area; and determined the position coordinates of the dots, so that the dots included in a rectangular area having a longitudinal length of Lx and a transverse length of Ly satisfy expression (1), $$D \leq 0.13 N^{-1.15} \quad (1)$$

(in expression (1), N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x, y) is a diagonal line), $$D(L_x, L_y; N) = \int\int_{L_x \times L_y} \left[ \frac{A(x,y)}{N} - \frac{xy}{L_x L_y} \right]^2 \frac{dx\,dy}{L_x L_y} \quad (2)$$

and wherein $S_1$ that is obtained by expression (3)

$$S_1(r_1, r_2) = \int_{r_1}^{r_2} dr \left| g_1(r; r_1, r_2) - g_{av} \right| \quad (3)$$

is equal to or smaller than 0.7 (In expression (3), $g_1$ is obtained by dividing the average radial distribution function g(r) of each dot in the area by an integration value of g(r) over a range of from $r_1$ to $r_2$, and $g_{av}$ is the average value of $g_1$ within the range of from $r_1$ to $r_2$. When the dots are arranged in a square lattice to satisfy a given filling rate, $r_1$ and $r_2$ are chosen as one and four times the value of the lattice constant Dr respectively. The dot filling rate is a value obtained by multiplying the square of the maximum diameter of a dot by the number of dots, and dividing the product by the size of the area.);

setting the position coordinates as initial positions; and changing the position coordinates of the dots so that the dots for which the position coordinates are determined do not overlap each other.

The step of determining the position coordinates includes the steps of:

generating and storing a first generator matrix for each coordinate axis;

employing the first generator matrix to generate and store a second generator matrix;

generating, as a first vector, the binary representation of a natural number n of a set of N natural numbers corresponding to N dots in the area;

generating a second vector using a product of the first vector and the second generator matrix;

generating the position coordinates of the dots while, for the coordinates, the elements of the second vector are defined as the values of the digits of a binary decimal number; and increasing the natural number n by a predetermined number and generating position coordinates until the total number of repetitively generated point coordinates equals the number N of dots in the area. Further, the program further comprises the step of: generating a discrete pattern having a predetermined size by employing a predetermined boundary condition between any two of multiple areas. The step of changing the position coordinates includes the step of calculating a repulsive force between adjacent dots depending on their distances and their sizes. The step of changing the position coordinates includes the steps of:

calculating a repulsive force exerted by another dot located near a predetermined dot;

displacing the predetermined dot in accordance with the magnitude of the repulsive force;

calculating a repulsive force for the predetermined dot that is displaced; and calculating a total for the repulsive forces of dots located within a predetermined range. The program further comprises the step of: repetitively performing the step of changing the position coordinates until a predetermined convergence condition is established by a difference between a total of first potential energy and a total of second potential energy, which are calculated immediately before getting the total of first potential energy. When the interval between the dots is equal to or smaller than a predetermined value, the repulsive force is substantially constant, and when the interval exceeds the predetermined value, the repulsive force is reduced in accordance with the increase in the interval. It is preferable that the initial positions of the dots be obtained by using low-discrepancy sequences.

According to the invention, a discrete pattern generation system, for generating the above described discrete pattern, comprises:

means for providing the discrete pattern;

storage means for storing the position coordinates of the dots that form the discrete pattern;

printer means for outputting the position coordinates included in the recording means; and pattern receiving elements wherein the discrete pattern is formed by the printer means.

The present invention provides a discrete pattern generation method for employing a computer system to generate a discrete pattern formed of discrete dots disposed two-dimensionally, said method comprising:

a step of providing a predetermined block;

a step of providing a filling factor distribution function of said dot;

a step of providing an area of said dot;

a step of generating at least two dots according to said filling factor distribution function for said predetermined block;

a step of employing predetermined functions to move said generated dots and update thereof to new coordinate values;

a step of judging a distance between dots of which said new coordinate values have been obtained;

a step of generating or deleting new dots regarding said distance; and a step of employing said predetermined functions to update coordinate values of dots including said generated dots.

The present invention provides a binarized pattern generation method of employing a computer system to generate a binarized pattern of a variable-density image formed of discrete dots disposed two-dimensionally, said method comprises:

a step of giving a predetermined block;

a step of determining a number of dots disposed in said predetermined block;

a step of determining said dot position coordinates so that said dots contained in a rectangular block having a lateral size of Lx and a longitudinal size of Ly satisfy formula (1) given hereunder:

$$D \leq 0.13 N^{-1.15} \quad (1)$$

(wherein N in formula (1) denotes a number of dots contained in said block and D is given by formula (2) given hereunder assuming that a number of dots contained in a rectangular region having a diagonal line extending from a reference coordinate (0, 0) to an arbitrary coordinate (x, y) is A (x, y):

$$D(L_x, L_y; N) = \int\int_{L_x \times L_y} \left[ \frac{A(x,y)}{N} - \frac{xy}{L_x L_y} \right]^2 \frac{dx dy}{L_x L_y} \quad (2)$$

and $S_1$ given by formula (3) given hereunder is equal to or less than 0.7:

$$S_1(r_1, r_2) = \int_{r_1}^{r_2} dr \, |g_1(r; r_1, r_2) - g_{av}|, \quad (3)$$

wherein $g_1$ in formula (3) is a value obtained from dividing an average radius distribution function g(r) by an integral value ranging from $r_1$ to $r_2$ and $g_{av}$ is a mean value of $g_1$ ranging from $r_1$ to $r_2$. When dots are disposed in a shape of a tetragonal lattice to satisfy a given filling factor, $r_1$ and $r_2$ are specified to an equal value and a quadruple value of a lattice constant $\Delta r$, respectively. A filling factor of dots is a value obtained as follows: a square of a maximum diameter of a dot is multiplied by a number of dots, then thus calculated value is divided by an area of said region);

a step of setting said predetermined position coordinates as initial positions; and a step of changing said dot position coordinates so that dots of which said position coordinates have been determined do not overlap with each other and said dots are distributed around a space related to a predetermined gradation; and a step of employing predetermined boundary conditions to adjoin a plurality of said predetermined blocks to generate a discrete pattern of a predetermined size.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

FIGS. 21A and 21B are diagrams respectively showing a discrete pattern generated using the LDS method and the repulsive force relaxation method and a discrete pattern generated using the pseudo random number generation method.

FIGS. 32A and 32B are graphs showing the value of g obtained for the square lattice.

FIGS. 33A and 33B show a discrete pattern at a portion wherein a filling factor generated by the repulsion relaxation method changes rapidly.

FIGS. 34A and 34B show a rectangular region and a filling factor distribution function employed in the present invention.

FIGS. 39A and 39B show embodiments of a rectangular region and a filling factor distribution function employed when dots are automatically generated or deleted according to the present invention.

FIGS. 52A and 52B are more detailed enlarged diagrams showing one of the dots in FIG. 51.

DETAILED DESCRIPTION OF THE INVENTION

Figure 1:
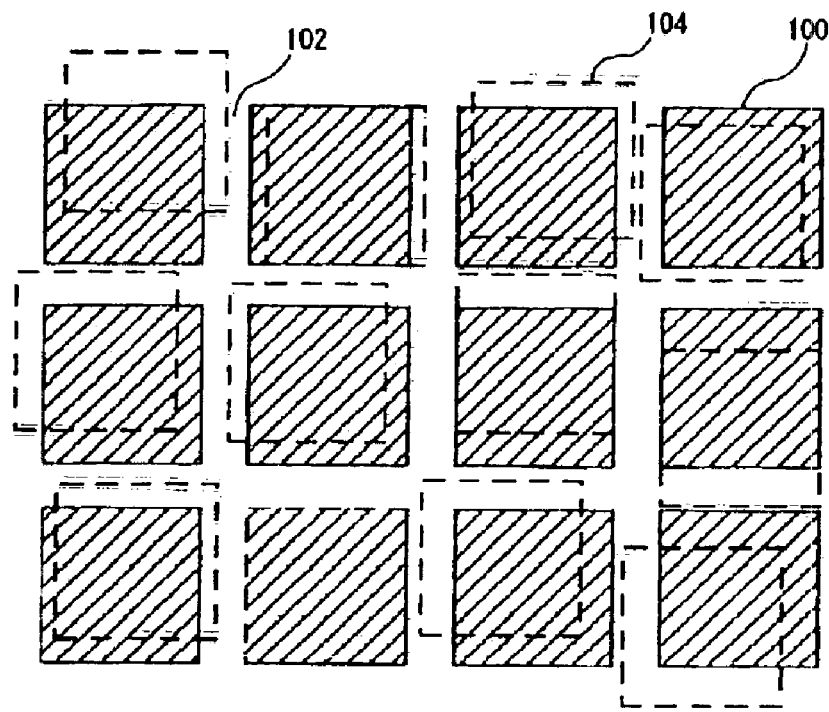
FIG. 1 is a diagram showing a dot pattern generated by a conventional pseudo random number generation method.
Figure 2:
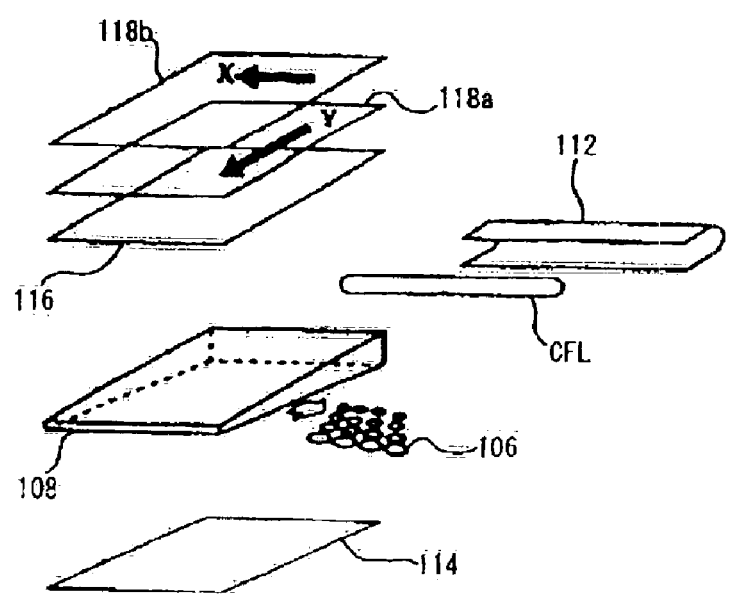
FIG. 2 is an exploded perspective view of the configuration of a conventional light-transmitting liquid crystal display device.
Figure 3:
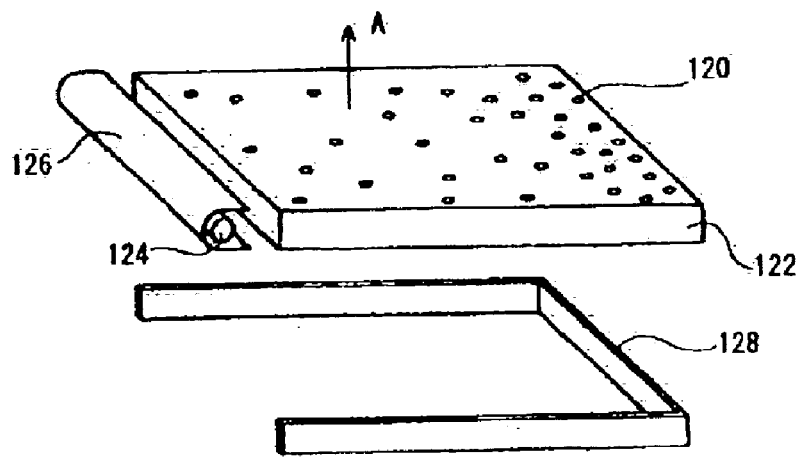
FIG. 3 is an exploded perspective view of a reflection type liquid crystal display device that employs a conventional random discrete pattern.
Figure 4:
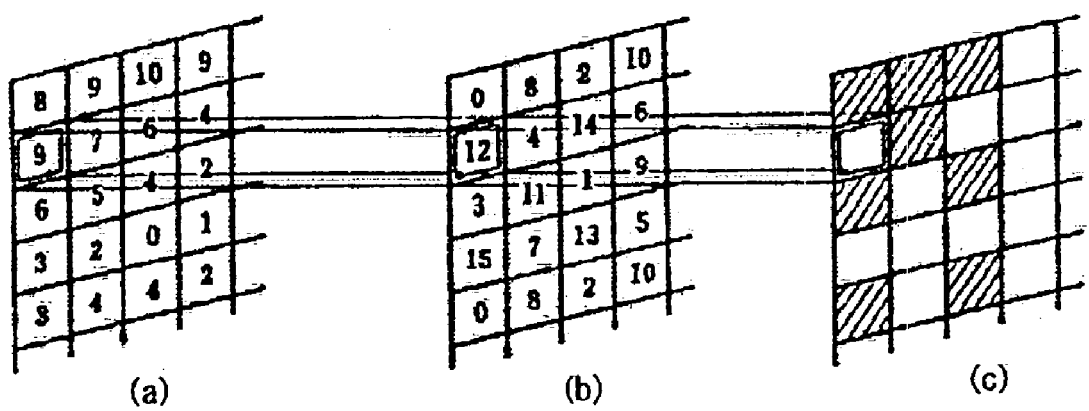
FIG. 4 shows a view depicting a halftoning process for a conventional variable density image.

As is described above, no method has been proposed whereby a filling rate distribution is continuously provided until a high filling rate of more than 50% is reached for an area, and whereby a pattern that does not cause a visible optical pattern is generated. The strict upper limit for the filling rate is a great barrier for controlling the luminance of a backlight unit. Thus, there a need exists for means to generate a discrete pattern without it being affected by filling rates, even if the filling rates are distributed, so that a preferable filling rate distribution can be obtained, while higher flexibility is provided and the occurrence of moire is prevented. In addition, problems with the random dot pattern generation method using the pseudo random number generation method have arisen; high filling rates can not be coped with; and dot distributions are of great non-uniformity and great deal of time and labor are required to correct them.

As is described above, a method is required whereby discrete patterns with a low discrepancy can be provided, and whereby dots are satisfactorily arranged at random and are not overlapped.

Furthermore, a discrete pattern generation method is required whereby dot patterns are satisfactorily arranged at random, regardless of the filling rates.

Further, a program for generating discrete patterns and a recording medium on which the program is recorded are required.

In addition, an optical member that includes a discrete pattern is required.

Moreover, a light guide plate that includes the above described discrete pattern, and a backlight unit that includes this light guide plate are required.

Also, a light-transmitting liquid crystal display device is required wherein a backlight unit is mounted that includes the above discrete pattern.

Furthermore, a discrete pattern generation system is required that can generate the above discrete pattern.

The preferred embodiment will now be described while referring to the accompanying drawings. However, the present invention is not limited to this embodiment. The determination made for the initial position of a discrete pattern will be described in section A. A method for eliminating the overlapping of dots, using the repulsive force relaxation method, and forming a discrete pattern will be described in section B. The process performed when a filling rate is continuously changed will be described in section C. The range of the discrepancy in a discrete pattern according to the invention and the determination reference for randomness will be described in section D. And an optical member, a side light device and a light-transmitting liquid crystal display device using a discrete pattern obtained by using the LDS method will be described.

The present invention will be described with reference to embodiments shown in attached drawings. The present invention however is not limited to the embodiments described hereinafter. Hereunder, part I describes the first structure of the present invention wherein repulsion is relaxed by applying repulsion model between dots after an initial disposition is given to form a random discrete pattern with the LDS method. Part II describes the second structure of the present invention wherein a discrete pattern is generated by generating or deleting dots automatically. Further, part III describes the third structure of the present invention wherein a binarized pattern of a variable-density image whereto an excellent blue noise characteristic may be given. Still further, part IV describes optical components, a side light unit and a transmissive liquid crystal display device employing the above-described LDS method and discrete patterns obtained based on an automatic dot generation method.

Part I: Generating a Discrete Pattern by Assuming the LDS Method and Repulsion Between Dots to Relax the Dots Part I describes determination of an initial position of a discrete pattern in Section A;

a method of employing repulsion relaxation method to eliminate overlapping of dots to form a discrete pattern in Section B;

handling in the case wherein a filling factor is changed continuously in Section C; and a range of discrepancy of a discrete pattern given by the present invention and a judgment standard for randomness in Section D.

1. Section A

Generation of the Initial Position of a Discrete Pattern with Low Discrepancy (A-1) Establishment of a Mathematical Formula for the Discrepancy When N points are distributed in a rectangular area, such as an oblong or a square having a longitudinal length of Lx and a transverse length of Ly, the discrepancy can be provided in the following manner.

Assume there is a rectangular area having an orthogonal line that extends across a rectangular division from an origin (0,0) to a position (x,y). When V denotes a ratio of the size of this area to the size of the entire division, V=x×y/(Lx× Ly). Further, when A(x,y) denotes the number of points, of N points, included in the rectangular area, A(x,y)/N is the ratio of the points, of N points, that are included in the entire division. For the distribution of points to be ideally uniform, the ratio of the points included in any rectangular area should correspond to the ratio of the rectangular area to the overall area.

When the difference between how far these two ratios is shifted from 0 is examined, the bias of the points can be understood. In this specification, the discrepancy is defined as the square root of the value obtained by integrating the square of (A(x,y)/N)−V for all the positions in the above described square area. That is, when the square of the discrepancy is denoted by D(Lx,Ly;N), D(Lx,Ly;N) is obtained using the following expression.

$$D(L_x, L_y; N) = \int_0^{L_y} \int_0^{L_x} \left[ \frac{A(x, y)}{N} - \frac{xy}{L_x L_y} \right]^2 \frac{dx\,dy}{L_x L_y}$$

When this discrepancy is employed, it is 0 in the ideal distribution, or has a maximum value ⅓ in the most biased state wherein, for example, all the points are collected at the origin.

Further, consider a sequence of points truly generated at random. For a sequence of points that is truly generated at random, the discrepancy is not very small. The reason this is true can be intuitively understood from the fact that when casting a die six times is used to determine random numbers, cases wherein specific numbers appear multiple times occur more frequently than those wherein numbers are evenly distributed. Randomness and the absence of bias, i.e., uniformity, are two independent concepts, and when a sequence of points possessing randomness and low discrepancy is required, a sequence of points that is generated to reduce discrepancy must be employed at the initial position. The present inventors paid attention to the fact that the LDS has sufficiently low discrepancy by definition, and it was found through careful studies (that were conducted) that using the LDS method was an effective way to solve the actual problem of arranging dots in a predetermined division.

(A-2) Flowchart for Using the LDS Method

Figure 7:
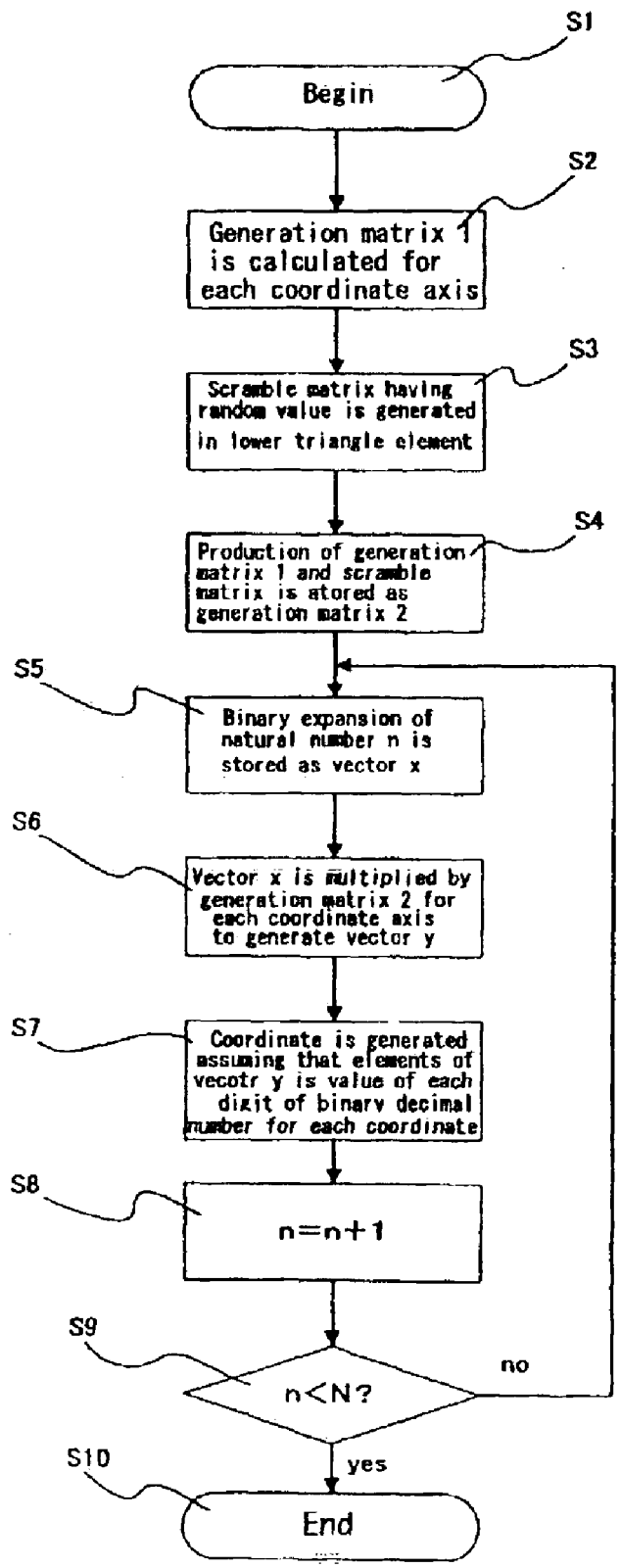
FIG. 7 is a flowchart showing the LDS method used for the invention.

FIG. 7 is a flowchart for the LDS method used for this invention. The LDS method according to the invention is initiated at step S1, and at step S2, a generator matrix 1 is calculated for each coordinate axis. The generator matrix is explained in detail in, for example, "Discrepancy for points", by Tezuka, in "Discrete structure and algorithm IV", edited by Kazuo Murota, Modern Science, Chapter 3. At step S3, a scramble matrix is generated wherein the lower triangular elements are random numbers, and at step S4, the product of the generator matrix 1 and the scramble matrix is stored as a generator matrix 2. In this invention, the initial arrangement can also be obtained without using the scramble matrix. However, when a great number of dots are employed, it is preferable that the scramble matrix be employed to generate a more uniform discrete pattern.

At step S5, the binary expansion of a natural number n, corresponding a predetermined position, is performed, and the result is stored as a vector x. At step S6, the vector x is multiplied by the generator matrix 2 for each coordinate axis, and a vector y is generated. At step S7, new coordinates are generated, while for each coordinate axis the elements of the vector y are used as the values of the digits of the binary decimal number, and at step S8, the natural number n is incremented by one.

The processes at steps S5 to S8 are repeated until a predetermined number, i.e., N, is reached, and as a result, N coordinates are generated using the LDS method.

(A-4) Specific Procedures for the LDS Method

The processing performed to generate a discrete pattern using the LDS method in FIG. 7, when the LDS method is used for one dimension, will now be described in detail. The following processing is used for the explanation, and can be employed unchanged for higher dimensions, such as two dimensions.

To determine the initial position in this invention using the LDS method, the processing speed is increased by employing the Niederreiter structure method, which is an extension of the net theory. In this invention, since randomness at the initial position is also important, a sequence possessing both randomness and low discrepancy is generated by using a generalized Niederreiter sequence employing a random scramble described in "Discrepancy for points", by Tezuka, in "Discrete structure and algorithm IV", edited by Kazuo Murota, Modern Science, Chapter 3.

The net theory is employed for a typical LDS generation method. As is defined for the discrepancy, the total of the sizes of the points in an area of any size must be close to the size of a division. Therefore, according to the net theory, the division is divided into smaller divisions using a p-ary box, one edge of which is hierarchically divided by the unit of the power series of the prime number p, and the division is occupied by nested p-ary boxes of various sizes. In this condition, the position coordinates for the point are determined based on the p-ary expansion coefficient of a natural number, so that the discrepancy is reduced.

More specifically, when the natural numbers 1, 2, 3 and 4 are employed, they are arranged in order, so that a sequence of points that are widely distributed throughout the entire division can not be obtained, even though overlapping of the same number does not occur.

In this invention, therefore, a strictly deterministic method, whereby coordinate values are correlated with original natural numbers, is employed, and a sequence of points that is not arranged in order, unlike the natural numbers, is generated, while the bias caused by a sequence of random points is eliminated. As the basic idea, first, a division is divided into small divisions by the large units, and points are arranged in the small divisions. When the number of points is increased, the small divisions are divided into smaller segments, so that the positions occupied by the points are different.

Due to the property of the representation of a sequence of natural numbers, the lowest digit is quickly changed from 1 to 9, and thereafter the higher digit is gradually changed. Therefore, when these digits are rearranged to locate the lowest digit at a higher position, and when differently divided segments for the different sizes obtained for the respective position digits are changed greatly, as the original natural numbers are changed slightly, and cover the entire division, position coordinates can be generated without any bias. That is, in the generation method used for this invention, a natural number is expressed using the binary system rather than the decimal system, and a predetermined method is used to replace the numerical values appearing at the positions of the individual digits. Specifically, an original sequence of natural numbers is represented as the binary number, and is then transformed. Thus, lower digit positions whereat values are changed more quickly provide a large positional change across the entire division in correlation with higher digits of the coordinate values, and higher digit positions whereat values are changed slowly provide a small positional change in correlation with the lower digits of the coordinate values so that the irregularity is enhanced.

Figure 8:
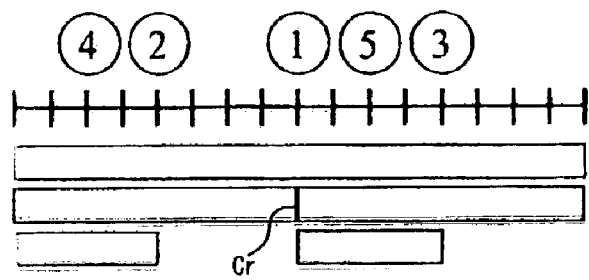
FIG. 8 is a diagram showing a method for generating a sequence of points according to the invention.

More specifically, when, for example, the natural numbers 1 to 5 are expressed using the binary system, they are 1, 10, 11, 100 and 101. Then, for a natural number n wherein abcd is expanded, abcd are invertedly arranged and are correlated with 0.dcba using a binary system decimal. In the embodiment, in a case wherein the above natural numbers, 0.1, 0.01, 0.11, 0.001 and 0.101 are obtained, which denote ½, ¼, ¾, ⅛ and ⅝, respectively. Thus, as is shown in FIG. 8, a sequence of points is obtained wherein small divisions that grow gradually smaller, from 0 to 1, are distributed widely relative to the center Cr.

Figure 9:
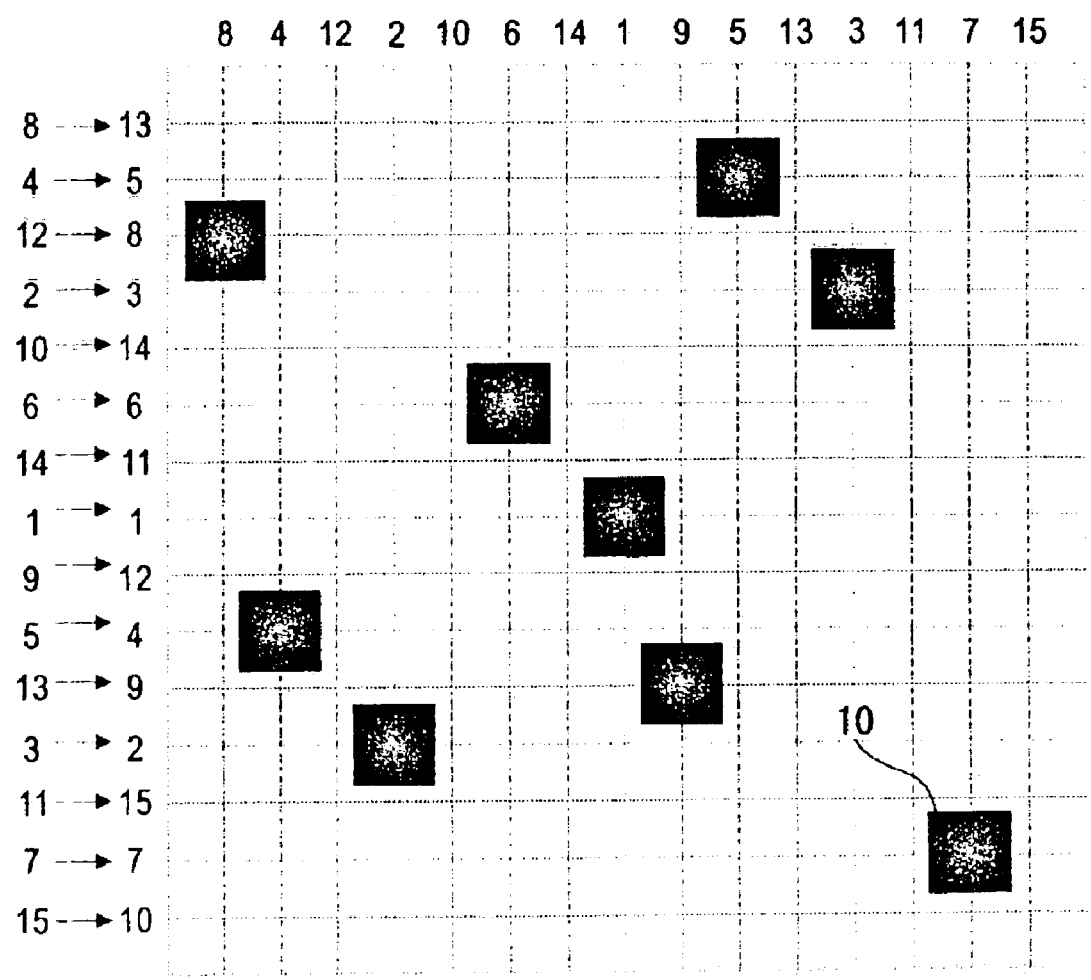
FIG. 9 is a diagram for explaining the generation of the initial positions using the LDS method according to the present invention.

To obtain the coordinate values in two dimensions, the values of the individual digits are replaced by using the above method and transform matrices for which the dimension differ, so that the values for the respective dimensions, such as x coordinate and the y coordinate, are independently changed. Then, the original sequence of natural numbers are employed to calculate corresponding coordinate points. FIG. 9 is a diagram showing a low-discrepancy discrete pattern in two dimensions that is obtained by the generation of position coordinates by allocating natural numbers in order to the positions of coordinates to be used for the coordinate axes. In FIG. 9, along the vertical axis, by means of the above conversion, transformations indicated by arrows are performed and two-dimensional position coordinates are obtained. In FIG. 9, a dot 10 is arranged at the position coordinates whereat the horizontal axis and the vertical axis intersect, and is defined as the initial arrangement generated using the LDS method.

In this invention, it is preferable that a specific rearrangement called the scramble method be performed to rearrange the digits, so as to provide more variation for the arrangement of point coordinates. When the scramble method is employed, the generator matrices provided for the individual dimensions are stored in advance in a storage device. These matrices are multiplied by the vector x, consisting of the numerical values of the digits of a target natural number expressed using the binary numeration system, and the vector y is generated. In this manner, the arrangement can easily be extended.

Figure 10:
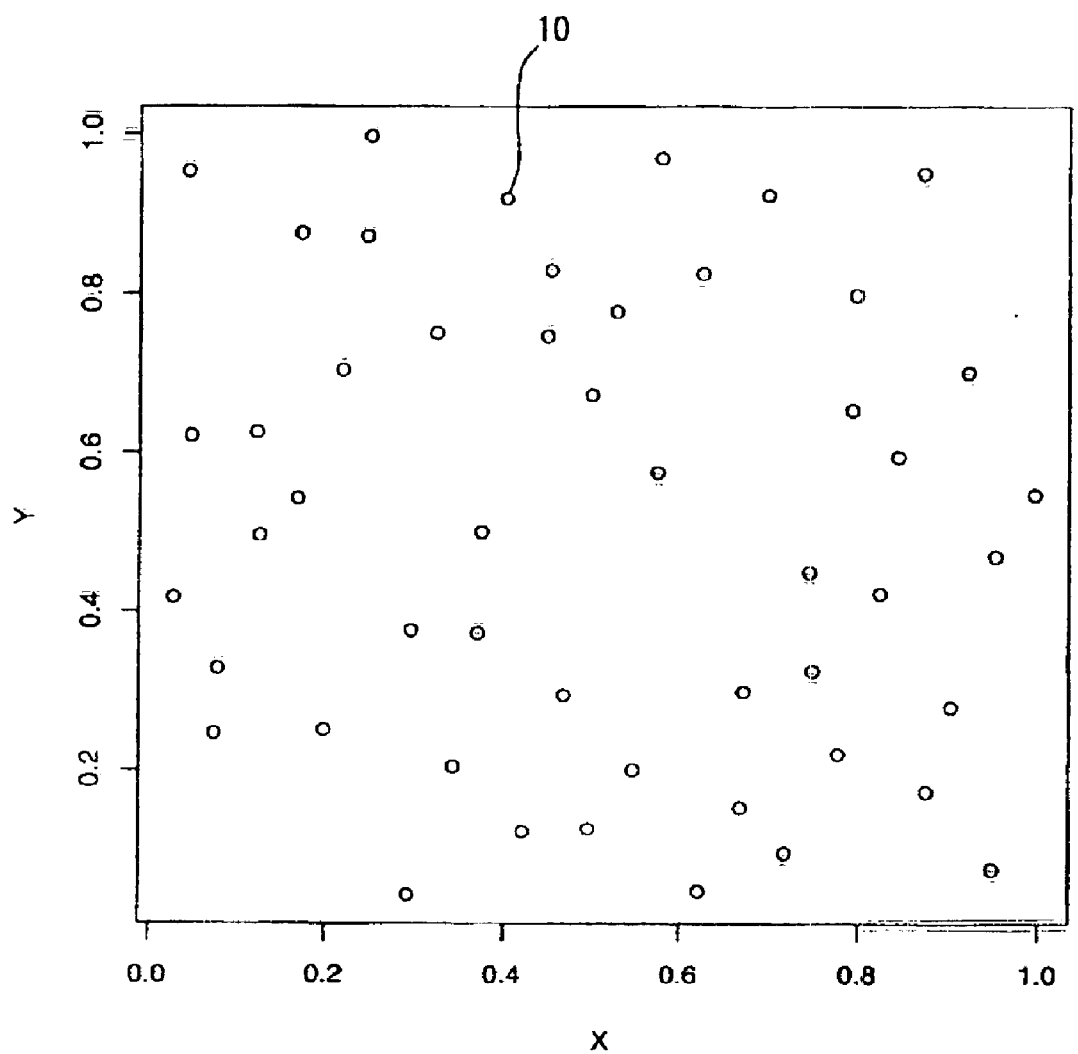
FIG. 10 is a diagram showing the initial positions of fifty dots generated using the LDS method according to the invention.

FIG. 10 is a graph showing a discrete pattern including a dot pattern, generated using the LDS method, wherein 50 dots 10 are arranged in the division. In FIG. 10, the vertical axis and the horizontal axis are represented by the regulated unit length, and the division is defined as a square.

Figure 11:
FIGS. 11A and 11B are diagrams showing the initial positions generated using the LDS method and the initial positions generated using a pseudo random number generation method.

FIG. 11 are diagrams showing low-discrepancy dot patterns used for this invention. In FIGS. 11A and 11B, no special effort is made to handle the overlapping of the dots, and their positions correspond to so-called initial positions. The dot pattern in FIG. 11A was obtained by using the LDS method of the invention, and the dot pattern in FIG. 11B was generated for comparison using the pseudo random number generation method.

As is apparent from a comparison of FIGS. 11A and 11B, although the overlapping of dots is not removed, the initial positions generated using the LDS method provides a more satisfactory uniformity than does the dot pattern in FIG. 11B generated using the pseudo random number generation method. It is also apparent that there is no portion wherein the density of dots is drastically high or low. Whereas, in the dot pattern in FIG. 11B generated using the pseudo random number generation method, a portion having a high dot density and a portion having a low dot density are locally generated, and while the randomness is satisfactory, there is insufficient uniformity when compared with the dot pattern, provided by the invention, in FIG. 11A.

Figure 12:
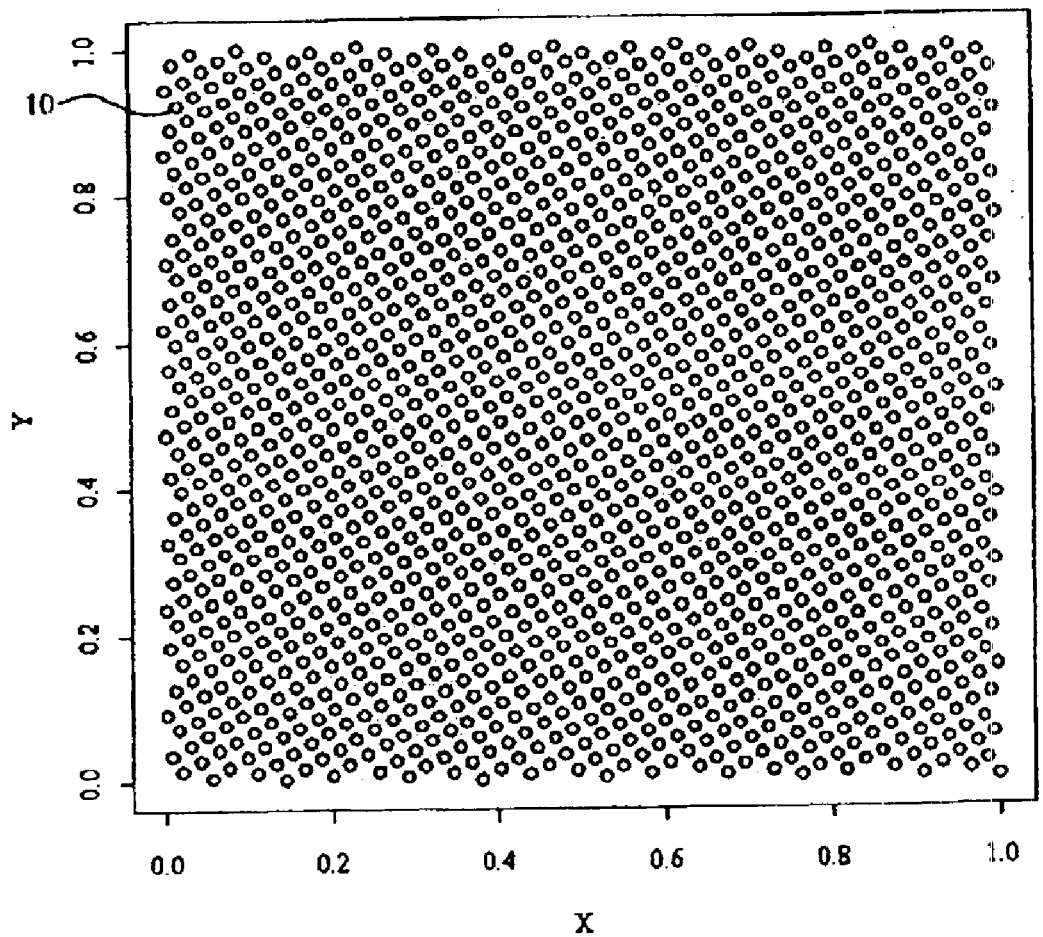
FIG. 12 is a diagram showing the low-discrepancy initial arrangement generated using the GLP method according to the present invention.

To generate a low-discrepancy discrete pattern, in this invention, not only is the net theory used, but as another example, the Good Lattice Point (GLP) method may also be employed. FIG. 12 is a diagram showing a low-discrepancy dot pattern obtained using the GLP method. In the dot pattern in FIG. 12, as the initial arrangement, the dots 10 are arranged in the square division using the GLP method. To obtain the dot pattern in FIG. 12, when the generator vector is selected as (h1,h2), the GLP relative to the natural number k is provided as ((h1×k) modn)/n, ((h2×k) modn/n). For example, when two adjacent Fibonacci sequences are defined as F(m-1) and F(m), n=F(m) and the generator vector can be defined as (1, F(m-1)).

The dot pattern in FIG. 12 is prepared with F(m-1)=987 and F(m)=1587. As is shown in FIG. 12, the uniform distribution having low discrepancy is also obtained using the GLP method. However, as is apparent from the dot pattern in FIG. 12 for which the GLP method was used, the individual dots are arranged more regularly than those in a dot pattern produced using the LDS method, so that the GLP method is inappropriate for an application, such as a liquid crystal display device, for which a moire pattern should be avoided.

However, an application for which the moire pattern is not an important factor, specifically, an application for a stopper or a design application or a case wherein the discrete pattern of the invention is used as a dithering pattern, a discrete pattern having satisfactory randomness can be provided. Similarly, for another embodiment of the invention, the Richtmeyer sequence using the decimal portion of the square root of a prime number, or the Halton sequence using p-ary expansion and employing prime numbers having differing coordinate axes, can also be used for the generation of a low-discrepancy pattern.

2. Section B
Removal of the Overlapping of Adjacent Dots Using a Repulsive Force Relaxation Method
(B-1) Overview of the Repulsive Force Relaxation Method According to the conventional method for the perturbation of a lattice point, as has already been explained, a malfunction substantially occurs for an area having a high filling rate. That is, according to the method for the sequential generation of random numbers, it is substantially impossible to prepare an irregular pattern wherein dots are not overlapped in an area having a high filling rate. Without the introduction of a certain interaction between the dots, it is difficult to generate an irregular pattern having a high filling rate that is greater than 50%. Especially in the invention, it is required that the overlapping of dots be easily removed, not only in a division having a comparatively low filling rate, but also in a division having a high filling rate equal to or greater than 50%.

In this invention, the filling rate can be a ratio of the area occupied by dots in a predetermined division to the area of the division wherein dots are arranged. At this time, in order to cope with dots having various geometrical shapes, the area occupied by dots is defined as the product of the number of dots and the square of the maximum diameter of the dot. The ratio of the number of dots to the size of the division can also be used as another definition for the filling rate.

In principle, for a case wherein the initial position is determined using the pseudo random number generation method, the overlapping of dots can also be removed by using the repulsive force relaxation method. However, when the initial position is determined using the pseudo random number generation method, in most cases, an uneven net pattern appears, as will be described later, and a great number of processes and a great deal of time are required to remove this uneven pattern. Therefore, it is preferable that a low-discrepancy initial pattern be provided in advance using the LDS method, for example, and that the repulsive force relaxation method be applied for the initial position, so that a discrete pattern having greater uniformity can be generated.

As is described above, when merely the initial arrangement is generated using the LDS method, the dots are overlapped due to the definite size of the dots, while the uniformity and the randomness are satisfactory, so that some clusters of dots can be identified visually. Therefore, the rearrangement process for the distribution (removal of overlapping) is indispensable. In this invention, the dots distributed in the initial state that are generated using the LDS method are regarded as particles interacting in a two-dimensional space, so that the overlapping of adjacent dots is removed, through a relaxation process, wherein the repulsive force gradually removes the overlapping from the initial state. Specifically, this invention employs an interaction model wherein a strong repulsive force is exerted on dots at a distance between particles that is close to 0. Therefore, a high potential energy state is established between dots that overlap at the initial positions, so that only the overlapped dots are permitted to be efficiently moved, and the overlapping of the dots can be removed.

When this model is employed, it can be assumed that, as the relaxation time elapses, the adjacent dots will settle in positions at appropriate intervals as determined by the repulsive force. In this invention, the above process can be defined as the repulsive force relaxation method. In accordance with the relaxation time, and in accordance with the dynamical mechanism employed for relaxation, various patterns can be generated that are appropriate for specific applications.

Figure 13:
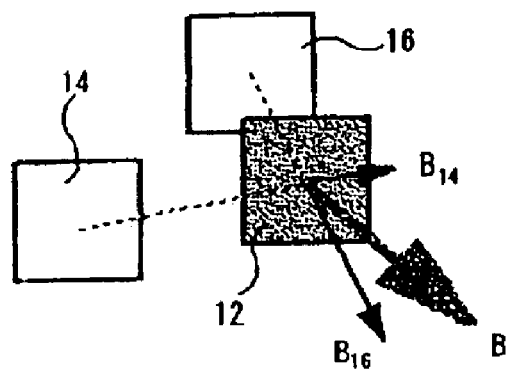
FIG. 13 is a schematic diagram showing a repulsive force relaxation method used for the invention.

FIG. 13 is a schematic diagram showing the principle of the repulsive force relaxation method when the repulsive force is exerted on dots 12, 14 and 16 while the dot shape is square. In FIG. 13, assume that the dots are two-dimensional particles that repulsively interact with each other, and that at a specific time the dots 14 and 16 are positioned around the dot 12. In this invention, a repulsive force model is provided so that a greater repulsive force is imposed as the interval between adjacent dots becomes shorter.

The coordinates of a dot are obtained after the relaxation process has been calculated, based on a theory of molecular dynamics described, for example, in "Solid-Structure and property", Junjiro Kanamori et al., Iwanami Shoten, page 255, and "Physics of an irregular structure system", N. E. Cusac, Yoshioka Shoten, page 110, 1994. In order to prepare an irregular pattern, the equation of motion for a dot need not be exactly resolved for the present purpose. Therefore, in this specification, for this embodiment, an explanation will be given for the simplest approximation, while the equation of motion is based on the molecular field model that is described, for example, in "Statistical Mechanics: An Advanced Course with Problems and Solutions", Ryogo Kubo et al., Elsevier Science, 1990. However, a more complicated model may also be employed for this invention.

The molecular field model is used to calculate the force exerted at a specific time on one target dot in the distribution and to calculate the displacement at the next step based on the obtained force. As is shown in FIG. 13, the dot 12 receives a repulsive force exerted by the adjacent dots 14 and 16. In FIG. 13, the forces exerted by the dots 14 and 16 against the dot 12 are denoted by $B_{14}$ and $B_{16}$, and the resultant force obtained for the forces $B_{14}$ and $B_{16}$ is indicated by an arrow B. The repulsive force is similarly applied for the dots 12 and 16. As a result, at a specific time, the force exerted by a surrounding dot can be calculated for each dot. The dots are displaced in proportion to the obtained force, and the distribution at the next step is obtained. By repeating this process, the overlapping of the dots that exert a strong repulsive force can gradually be eliminated.

(B-2) Repulsive Force Model for the Repulsive Force Relaxation Method

The object of the repulsive force relaxation method used for this invention is to remove overlapping or abnormal approaches between dots having a definite size, and to maintain an appropriate distance between the dots. Therefore, it is preferable for the model used for interaction that a greater repulsive force be exerted when the distance between two dots is reduced within an area defined by a specific limit D, and that, beyond the limit D, the magnitude of the repulsive force is drastically reduced in accordance with the interval. That is, it is preferable that, as a featured parameter for the repulsive force model, a distance L for the attenuation of the repulsive force be present in addition to the limit D, out to which the repulsive force is maintained.

Figure 14:
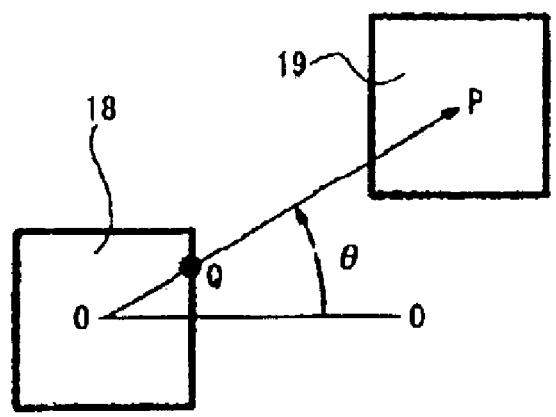
FIG. 14 is a schematic diagram showing a coordinate system used for the repulsive force relaxation method of the invention.

In this invention, the coordinate system shown in FIG. 14 is provided to establish the formula for the above model. Specifically, by employing an arbitrary dot in a two-dimensional plane (or curve) for the generation of a pattern, the two-dimensional polar coordinates (r,q) are set, while the center of a dot is used as the origin. An arbitrary positional relationship can be employed between the start line OO' and dots 18 and 19, and when the center P of the dot 19 reaches position (r,q), the force exerted is defined by the following expression.

$$\vec{F} = F(r, \theta) \frac{\vec{r}}{r}$$

where $\vec{r}$ denotes a vector OP having a magnitude of r.

In this invention, the range D for the repulsive force can also depend on the angle q, and for example, as is shown in FIG. 14, can also be defined as D(q)=OQ. The above expression 44 means that the force exerted between the dots is a so-called central force. It is found that this condition is effective for avoiding a phenomenon wherein, as the relaxation process progresses, dots are spirally arranged and the overlapping of dots can not be performed efficiently.

A function F(r,q), which is the index of the magnitude of the force, can be selected that satisfies the following condition relative to a predetermined definite function $F_1(q)$ that does not depend on r.

| | |
|---|---|
| F(r, q) m $F_1(q)$ | for r m D(q) |
| F(r, q) [$F_1(q)$] | for r < D(q) |
| F(r, q) d 0 | as r d° |

The positive value of F(r,q) represents a repulsive force, and the negative value represents an attractive force. It should be noted that the function D(q) is an arbitrary function for the order of the maximum diameter s of dots or the average interval Dr between dots. The average interval between the dots can be defined as a lattice constant of such a square lattice that the dots are arranged area so that s satisfies a predetermined filling rate.

An example repulsive force model used for the embodiment of the invention is shown below. Further, for convenience sake, the distance L for the attenuation of the repulsive force is calculated using the following expression for which the base e of the natural logarithm is employed.

$$F(L+D, \theta) = \frac{1}{e} F(D, \theta)$$

As is apparent from this expression, in this invention, L generally depends on θ.

(B-3) Specific Example of a Repulsive Force Model (1) Isotropic Repulsive Force Model In this invention, the model wherein the q dependency of F, $F_1$ and D, which are used for the above expression, is ignored is defined as an isotropic repulsive force model. In this case, when the center of a predetermined dot enters a circle around a central dot for which the radius is D, a strong repulsive force acts between these dots. There are various functions that satisfy the above condition, and while taking into account the numerical value calculation, the following repulsive force model, which includes a power function and an exponential function, can be employed.

(a) Exponential Function Type $$F(r) = \begin{cases} F_1 & \text{for } r < D \\ F_1 \exp[-(r-D)^n / L_1^n] & \text{for } r \geq D \end{cases}$$

(b) Yukawa Type $$F(r) = \begin{cases} F_1 & \text{for } r < D \\ F_1 \left(\frac{D}{r}\right)^n \exp[-(r-D)^m / L_1^m] & \text{for } r \geq D \end{cases}$$

(c) Power Series Type $$F(r) = \begin{cases} F_1 & \text{for } r < D \\ F_1 \left(\frac{D}{r}\right)^n & \text{for } r \geq D \end{cases}$$

(d) Leonard Jones (LJ) Type $$F(r) = \begin{cases} F_1 & \text{for } r < D \\ \dfrac{F_1}{\alpha^m - \alpha^n}\left[\left(\dfrac{\alpha D}{r}\right)^m - \left(\dfrac{\alpha D}{r}\right)^n\right] & \text{for } r \geq D \end{cases}$$

where m, n and å denote real numbers, and m>n and å>1.

(e) Compound Type $$F(r) = \begin{cases} F_1 & \text{for } r < D \\ \dfrac{F_1}{\alpha^m - \alpha^n}\left[\left(\dfrac{\alpha D}{r}\right)^m - \left(\dfrac{\alpha D}{r}\right)^n\right]\exp\left[-\left(\dfrac{r-D}{L_1}\right)^l\right] & \text{for } r \geq D \end{cases}$$

where m, n and å denote real numbers, and m>n and å>1.

Figure 15:
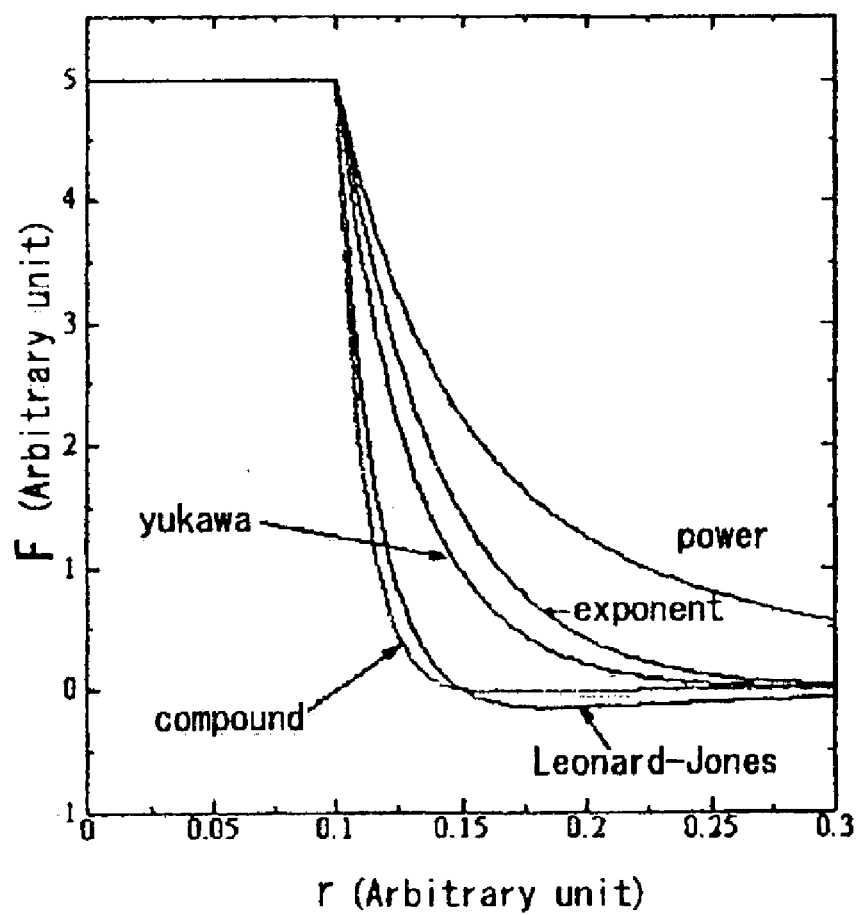
FIG. 15 is a graph showing the dependency of the repulsive force model on r.

FIG. 15 is a graph showing the above described repulsive forces that are calculated using parameters with which curves are positioned closely each other. In FIG. 15, D=0.1 mm and $F_1$=5 for all the models. The parameters used for this graph are shown in table 1.

TABLE 1

|  | $L_1$ | n | m | l | alpha |
|---|---|---|---|---|---|
| Exponential function type | 0.4 | 1 |  |  |  |
| Yukawa type | 0.4 | 1 | 1 |  |  |
| Power series type |  |  | 2 |  |  |
| LJ type |  | 6 | 3 |  | 1.5 |
| Compound type |  | 6 | 3 | 1 | 1.5 |

In the embodiment for the repulsive force models for this invention, only the model wherein a constant force is employed for r<D, being a variation for a so-called hard-core model. However, the constant force can depend on r, and in this case, preferably, the repulsive force is monotoniously reduced in accordance with r.

As is apparent from the graph in FIG. 15, the differences in the forms of these functions do not provide a drastic difference in discrete patterns generated for the dot pattern. An exponential function of n=1 is satisfactory for achieving the object whereby the discrete pattern of the invention is provided for an optical application and a random discrete pattern is prepared to remove a moire pattern. However, when the distance between dots is to be limited to a specific small range, the LJ type or the other repulsive force model may be employed. Further, a linearly compound model can be employed as these repulsive force models.

For example, the repulsive force model having the minimum value is effective for keeping the fluctuation of the distance between dots in a restricted range, because the force between dots takes the minimum value at a predetermined location. It should be noted, however, that the numerical error tends to be accumulated for the LJ type force model that, compared with the other models, has the extremum points. Therefore, the error should be taken into account when performing a numerical calculation.

(2) Anisotropic Repulsive Force Model

In this invention, an anisotropic repulsive force model is defined as such a model that has dependency on q as well as on r. Anisotropic repulsive force models used for this embodiment are enumerated. The dependency on q is an important element for the generation of an actual pattern. So long as a dot has a symmetrical shape, such as a circle or an equilateral polygon, the isotropic repulsive force models are sufficient to generate a uniform irregular dot patterns. However, when dots having less symmetrical shapes are to be distributed more uniformly, in this invention it is preferable that the range of the repulsive force be anisotropic, in accordance with the dot shape. Many repulsive force models used in this case can also be enumerated, and for a case wherein the dot shape is rectangular, the following two models can be provided as especially effective repulsive force models.

(a) Elliptic Model

Of the various types, such as the exponential type, the power series type and the LJ type, as an example, the simplest exponential elliptic model for which n=1 is provided by the following expression.

$$F(r, \theta) = \begin{cases} F_1 & \text{for } r_b < D \\ F_1 \exp[-(r - r_b)/L_1] & \text{for } r_b \geq D \end{cases}$$

It should be noted that in expression 52, $$\frac{r_b^2}{(kD)^2} = 1 + \frac{1 - k^2}{k^2 + \tan^2 \theta}$$

Figure 16:
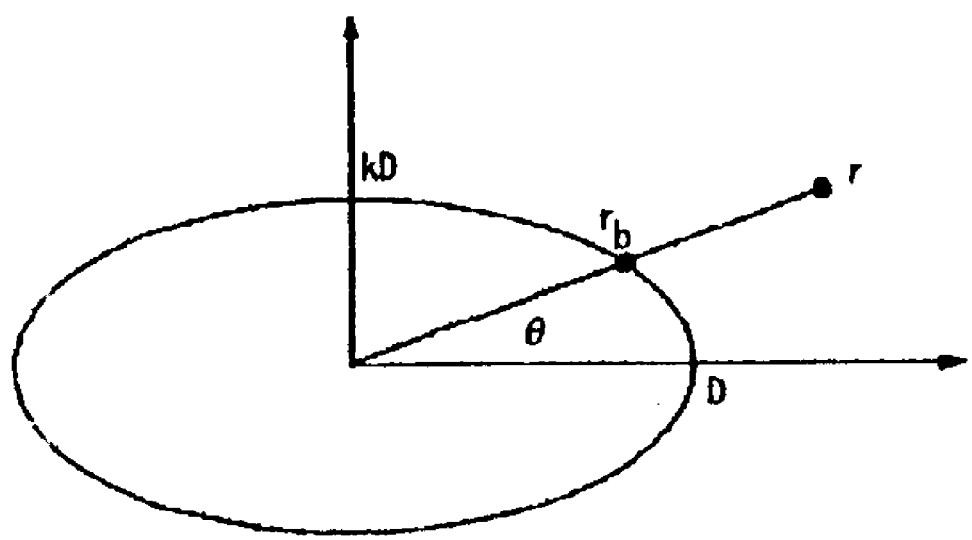
FIG. 16 is a diagram showing the relationship of the parameters of the repulsive force model.
Figure 17:
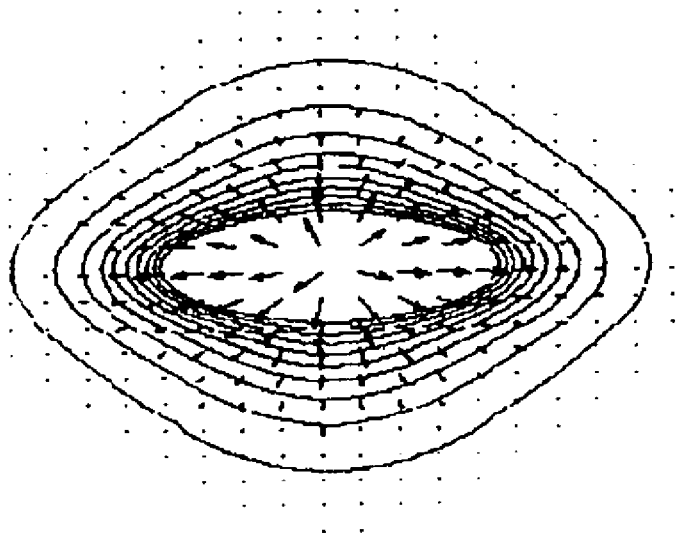
FIG. 17 is a diagram showing a repulsive force field obtained by using an elliptical model.

FIG. 16 is a diagram showing the relationship of the parameters. In FIG. 16, D denotes the long axis of an elliptic, kD denotes the short axis of the elliptic, and r denotes the distance to the center of an adjacent dot. FIG. 17 is a diagram showing the repulsive force field provided by the above expression. The repulsive force field in FIG. 17 is obtained when the parameter k is 0.3.

(b) Rectangular Model

Various types, such as the exponential type, the power series type and the LJ type, can be employed as this model, and the simplest exponential type rectangular model for which n=1 is provided by the following expression $$F(r, \theta) = \begin{cases} F_1 & \text{for } R(r, \theta) < D \\ F_1 \exp[-(R(r, \theta) - D)/L_1] & \text{for } R(r, \theta) \geq D \end{cases}$$

In expression 54, R(r, q) is represented by the following expression.

$$R(r, \theta) = \max\left\{r\cos\theta, \frac{r}{k}\sin\theta\right\}$$

Figure 18:
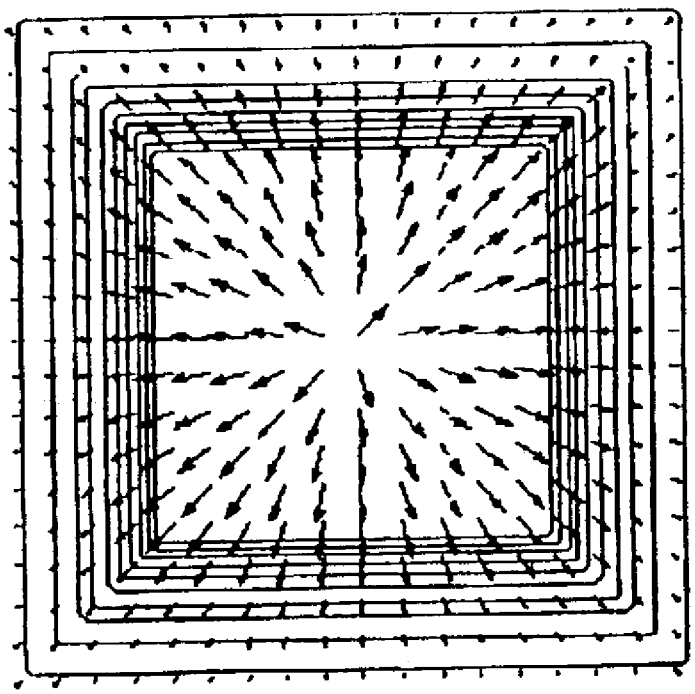
FIG. 18 is a diagram showing a repulsive force field obtained by using a rectangular model.

The repulsive force field used when a rectangular model is employed is shown in FIG. 18. It should be noted that in k=1 in FIG. 18.

The repulsive force models previously explained belong to a class of the hard-core models. However, the invention is not limited to these models, and so long as a strong interaction force acts as the interval between dots becomes shorter, any conventional repulsive force model can be employed, such as any one written in N. E. Cusac, Yoshioka Shoten, 1994.

(B-4) Convergence Determination Condition for a Repulsive Force Relaxation Method To represent the progress of the relaxation method by using numerical values, the most appropriate change can be the potential energy E for each dot. Relative to the scalar function V, which satisfies the following expression for the repulsive force, $$\vec{F} = -\text{grad} V,$$

the potential energy E is strictly defined as $$E = \frac{1}{2N}\sum_i\sum_j V(\vec{r_j}-\vec{r_i})$$

In expression 56, grad represents a two-dimensional gradient, and $$V(\vec{r_j}-\vec{r_i})$$

represents the interaction energy between a dot j and a dot i, while N denotes the number of all the dots. For the isotropic exponential function model of n=1, the function form of V is represented as follows.

$$V(r) = \begin{cases} F_1(D+L_1-r) & \text{for } r < D \\ F_1 L \exp\left[-\frac{r-D}{L_1}\right] & \text{for } r \geq D \end{cases}$$

Figure 19:
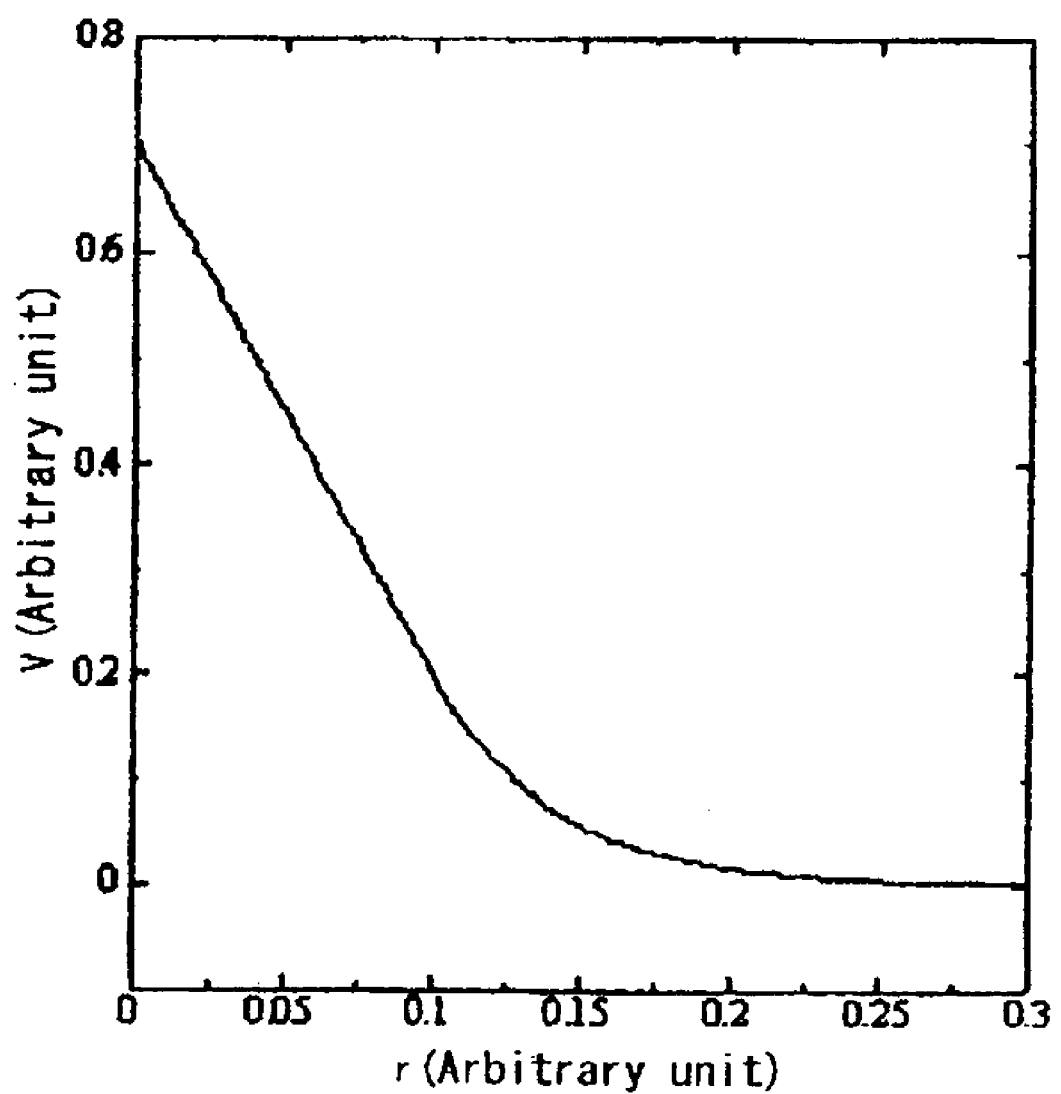
FIG. 19 is a diagram showing the convergence of V relative to r.

FIG. 19 is a graph showing the form of the scalar function V for r when D=0.1, $L_1$=0.04 and $F_1$=5 in V(r).

When this function V(r) is employed as the evaluation function for the elliptic model of k=0.5 that is a model of a rectangular dot, it is found that in order to generate a uniform pattern having no dot overlapping, $$\frac{E_{n+1}-E_n}{E_n} < 10^{-5}$$

is preferable, as the convergence determination condition, for the reduction ratio of the potential energy $E_n$ for each dot at the n-th step in the relaxation process.

is initiated at step S11, and at step S12 the initial positions of the dots are calculated using the LDS method. Then, at step S13, the repulsive force exerted by surrounding dots is calculated for each dot. In this case, any of the above described repulsive force models can be selected as needed. At step S14, based on the resultant force obtained for the repulsive forces, the coordinates for the position of each dot are displaced from their initial position. And at step S15, the coordinates generated at step S14 for the positions are stored as a new dot distribution.

At step S16, the potential energy E is calculated based on the new arrangement of the dots, and at step S17, a check is performed to determine whether the potential energy is convergent under the convergence determination condition. When the potential energy E is not satisfactorily small, the repulsive force is again calculated for the dot, the dot is displaced, a new distribution is generated, the energy is calculated, and the potential energy E is reduced until it is convergent. When, at the decision at step S17, the change in the energy is smaller than the convergence determination condition (Yes), it is assumed that the relaxation process is convergent, and the final position of the dot is registered as part of the discrete pattern. The processing is thereafter terminated at step S18.

Table 2 shows the results obtained for a case wherein a discrete pattern was generated using the repulsive force relaxation method for the initial positions obtained using the LDS method and using the conventional pseudo random number generation method.

TABLE 2

| Dot count | Pseudo random number Discrepancy Before relaxation | After relaxation | LDS Discrepancy Before relaxation | After relaxation | The size of a division (unit: mm) |
|---|---|---|---|---|---|
| 1225 | 118 | 61.6(29.4) | 1.88 | 2.68 | 5*5 |
| 2401 | 31.2 | 21.3 | 0.68 | 1.53 | 7*7 |
| 4900 | 23.1 | 26.4 | 0.22 | 0.46 | 10*10 |

The potential energy E can be calculated in the same manner for another model, or for an anisotropic case. When the calculation formula becomes complicated, as the above example, a similar function can actually be used for convergence determination. Further, in this invention, the potential energy as shown in FIG. 19 may be approximated by several linear functions to perform the convergence determination. In addition, the function V of the isotropic model can be used for the convergence determination of the elliptic model. This is because in this invention the dot dynamics themselves are not important, and the V is merely a measure of convergence. In addition, for another example for this invention, an evaluation function (having a value that is drastically reduced in accordance with the distance between dots and that is comparatively similar to the potential energy E) can be used. A convergence determination condition as described above can be set as needed, in accordance with the calculation time for the repulsive force relaxation method and the evaluation function that is to be used.

(B-5) Actual Process for a Repulsive Force Relaxation Method

Figure 20:
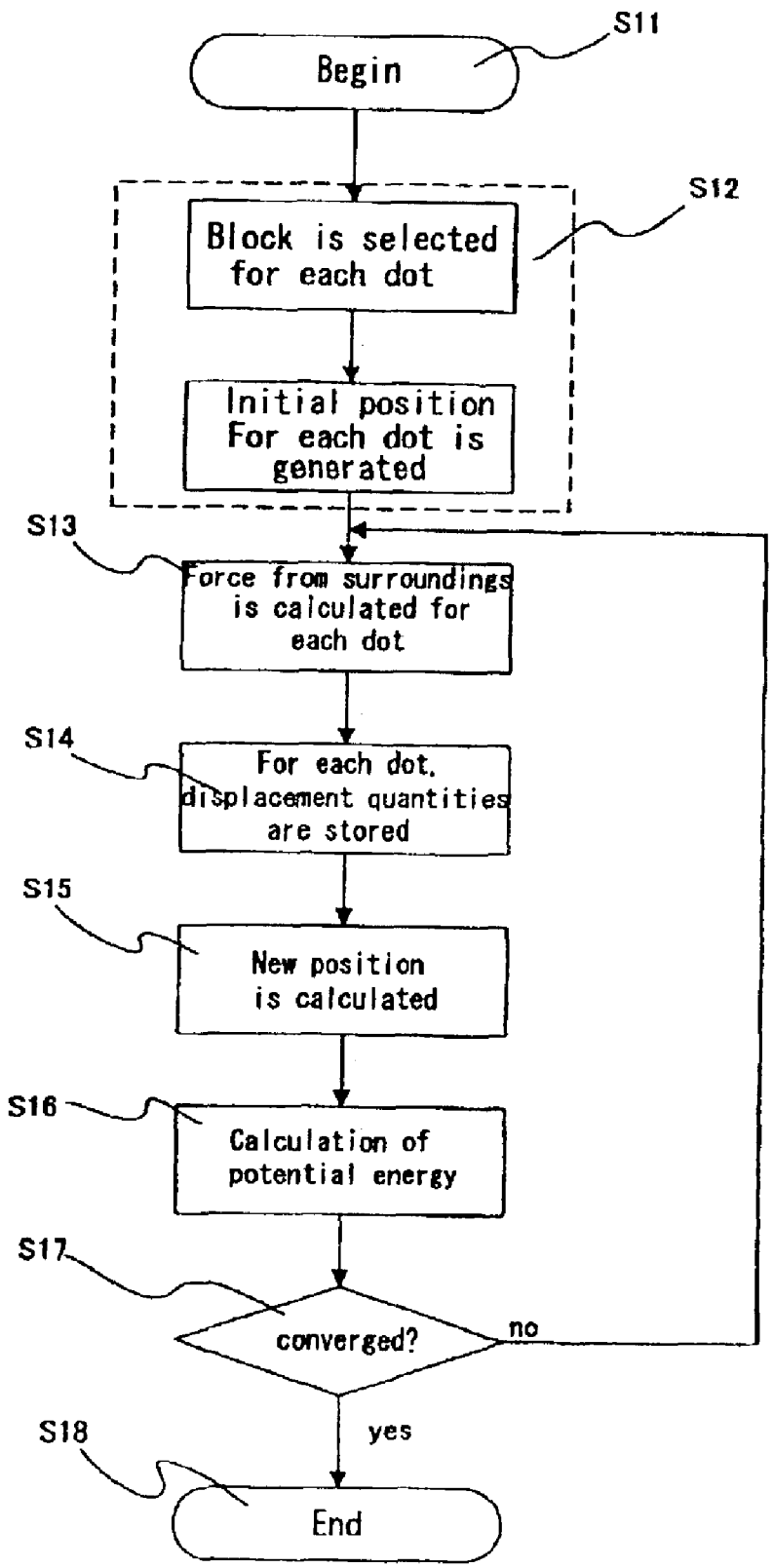
FIG. 20 is a flowchart showing the repulsive force relaxation method used for the invention.

FIG. 20 is a flowchart showing the repulsive force relaxation method used for this invention. The process in FIG. 20

D(Lx,Ly;N) was calculated for a pattern wherein N represented the total number of dots present in a rectangular area having, as a diagonal line, a line segment extending from point (0,0) to point (x,L) on the two-dimensional orthogonal linear coordinates (x,y), and was multiplied by $10^6$. The obtained product is shown in Table 2. The periodic boundary condition was employed for the calculations performed for Table 2, and the calculations were performed for a small division containing 0.1 mm square dots and at a constant filling rate of 50%. The same relaxation time was employed for the LDS method and the pseudo random number generation method. In order to determine the effect of the relaxation time on discrepancy calculated using the pseudo random number generation method, a calculation was performed with the relaxation time five times longer than the others. The result obtained for the data for 1225 dots using the pseudo random number generation method is shown as a value in parentheses. As is apparent from Table 2, since the difference between the LDS method and the pseudo random number generation method increases in consonance with an increase in the number N, it can be understood that the comparison of the pseudo random number generation method with the LDS method was made under the most advantageous condition for the prng method. As is shown in Table. 2, when the pseudo random number was employed, it was found that the discrepancy was high, compared with the use of the LDS method.

Further, it is understood that, for a discrete pattern generated using the LDS method and the repulsive force relaxation method, a satisfactory low discrepancy is maintained after the relaxation process, although it tends to be slightly increased. When the conventional pseudo random number generation method is employed, the discrepancy are high or low due to the repulsive force relaxation method. It is assumed that this occurs because, since the uniformity is inferior when the pseudo random number generation method is employed, there are dots that travel a long distance due to the repulsive force relaxation. Accordingly, since the dependency on the relaxation time is also great, while taking into account the computer resources and the calculation labor, it is preferable that the repulsive force relaxation method be used with the LDS method, although the repulsive force relaxation method is also effective when used with the conventional pseudo random number generation method.

FIGS. 21A and 21B are diagrams showing a discrete pattern generated for this invention, and a discrete pattern generated using a pseudo random number generation method. The discrete pattern in FIG. 21A was generated using the LDS method and the repulsive force relaxation method of this invention, and the discrete pattern in FIG. 21B was generated using the pseudo random number generation method and the repulsive force relaxation method. The same repulsive force model was used in both cases. As is shown in FIG. 21A, the discrete pattern generated for this invention has a uniform irregularity, and inhomogeneity in the dot density can not substantially be observed.

However, in the discrete pattern in FIG. 21B generated using the pseudo random number generation method, the inhomogeneity in the dot densities can be visually observed, and the uniformity is inferior. As is apparent from the results in FIGS. 21A and 21B, the LDS method used for this invention provides satisfactory initial positions, and the repulsive force relaxation method used for this invention can suppress the discrepancy and remove the overlapping of adjacent dots.

Figure 22:
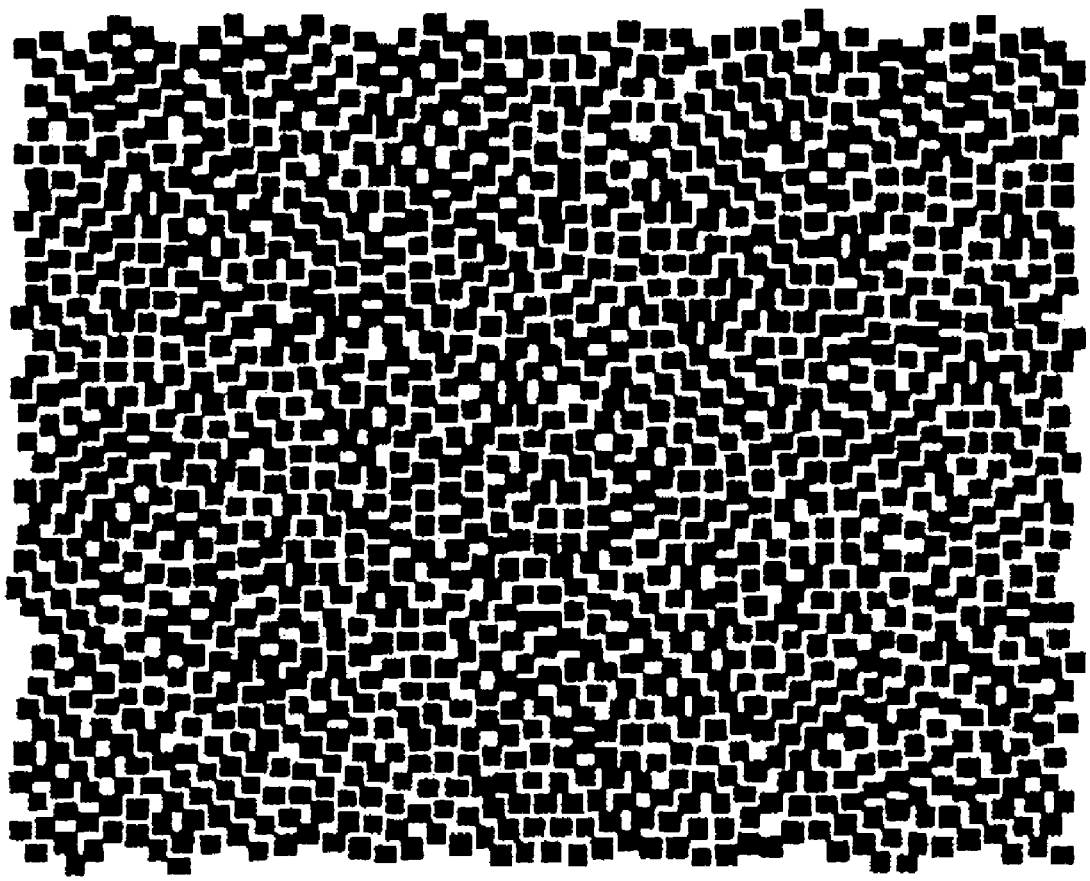
FIG. 22 is a diagram showing a discrete pattern obtained through the process in FIG. 20.

FIG. 22 is a diagram showing a discrete pattern for this invention that is generated using the repulsive force model of an isotropic exponential function type, while the initial positions were provided by the LDS method using the process in FIG. 20. The parameters used for the repulsive force model are n=1, D=0.8 mm and L1=0.4D, and a dot is a 0.1 mm square. In the discrete pattern generated in the division, a 4 mm×5 mm area is enlarged and shown in FIG. 22. Further, in FIG. 22, the filling rate is set to 70%. As is apparent from FIG. 22, according to the invention, a random discrete pattern that possesses satisfactory uniformity can be generated, even at a high filling rate.

It should be noted that for the calculation performed for FIG. 22, the pattern does not result in a regular array for a square lattice even when an extended period of time is provided for the relaxation time. Conversely speaking, this means that an appropriate irregular pattern in FIG. 22 can not be generated for a square lattice by a perturbation based on pseudo random numbers, and it can be concluded that a satisfactory discrete pattern can be generated by the synergistic effect produced by the joint use the LDS method and the repulsive force relaxation method of the invention.

Figure 23:
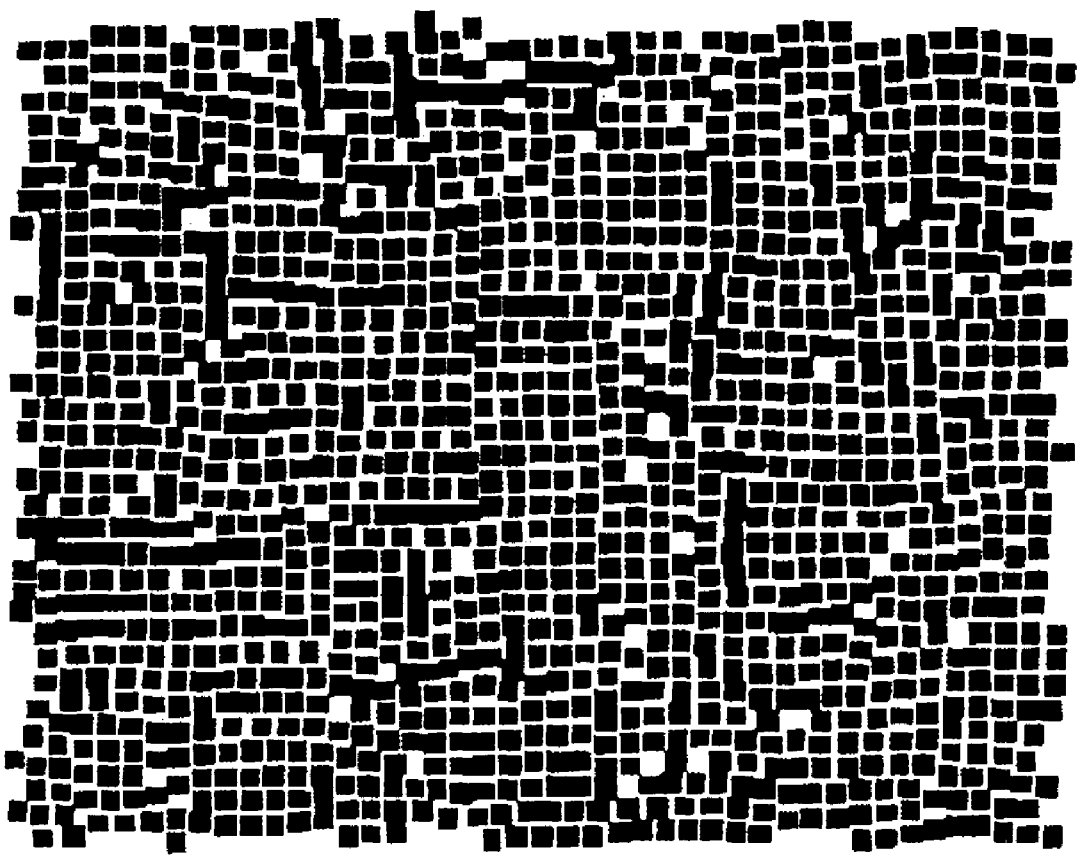
FIG. 23 is a diagram showing a discrete pattern generated through the process in FIG. 20 while a rectangular repulsive force model is employed.

FIG. 23 is a diagram showing a discrete pattern for this invention obtained by using the rectangular repulsive force model of the exponential function type at the same filling rate (70%). The parameters for the repulsive force model are n=1, D=0.1 mm and L=0.15D, and the dot is a 0.1 mm square. The area in FIG. 23 is the same was given in the explanation for FIG. 22. As is apparent from FIG. 23, simply by adjusting the parameters of the repulsive force model, the appearance of the discrete pattern can be changed considerably freely in accordance with the application.

It is understood from the results shown in FIGS. 22 and 23 that there is an optimal repulsive force model that corresponds to the shape of a dot. For example, a repulsive force model having an elliptical range corresponding to the reach of the repulsive force is appropriate for an oblong dot. This high flexibility provided by the invention can not be obtained at all by the conventional method, and compared with the method disclosed, for example, in Japanese Unexamined Patent Publication No. Hei 10-153779, a considerably higher flexibility can be provided, and a satisfactorily uniform discrete pattern can be generated at a high filling rate.

When the repulsive force relaxation method is employed, boundary conditions are important, because the dots would spread throughout the entire division were there no boundary conditions designated. There may be a case wherein the area for arranging dots is partitioned to provide multiple divisions, and irregular patterns are to be calculated under different conditions. Therefore, the selection of the boundary conditions is especially important to provide for the removal of seams.

For a uniform distribution or an almost uniform filling rate distribution, the repulsive force is calculated under a so-called periodic boundary condition, and a satisfactory result is obtained. However, when the maximum filling rate is reached at an edge, dots are rearranged by using the above described dynamic repulsive force model, so that an error may occur in the filling rate distribution. This occurs because, since the periodic boundary condition is employed, the filling rate is discontinued virtually at the boundary. In this case, the initial position generated by the LDS method is inverted at the boundary, and the inverted position is stored as an outer field and may be used as the following boundary condition. In this specification, the above described boundary condition is defined as a self-similarity boundary condition. This is specifically shown in FIG. 24. It was found that when this boundary condition was employed, the filling rate discontinuity was removed and a satisfactory result was obtained. It should be noted that the initial position is used as the boundary condition, because the initial positions provided by the LDS method are highly uniform and random.

Figure 24:
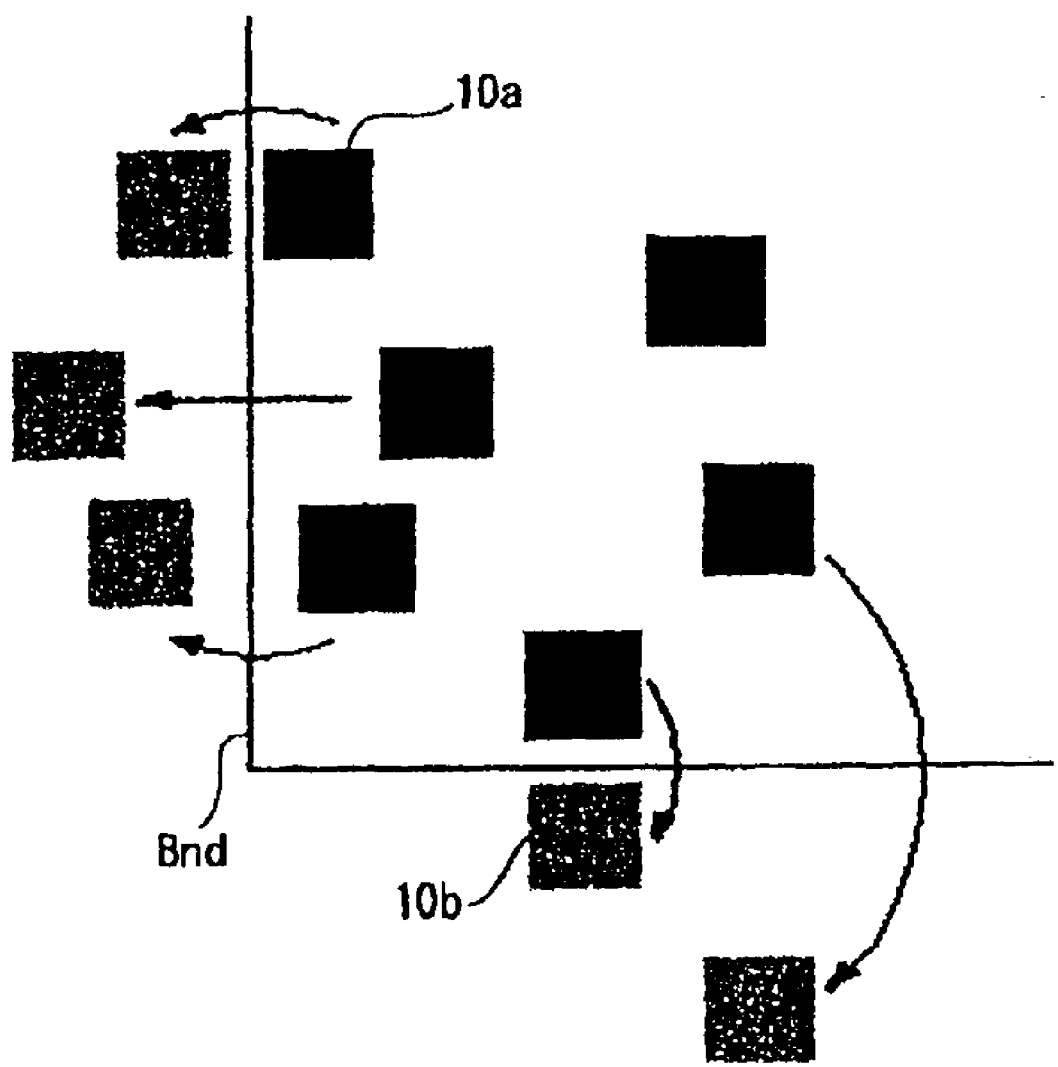
FIG. 24 is a diagram showing the self-similarity boundary condition used for the invention.

When discrete patterns for individual divisions are to be calculated independently and bonded together, first, a discrete pattern segment is calculated using the self-similarity boundary condition, and thereafter, the repulsive force relaxation method is employed to calculate the portion at a valley lying between the divisions. At this time, the outer field shown in FIG. 24, which is obtained from a surrounding pattern, can be used as the boundary condition. In FIG. 24, dots 10a are in a predetermined division, while dots 10b occupy inverted positions along a boundary Bnd. As will be described later, it is understood that a pattern having no seams will be obtained while a predetermined filling rate distribution is maintained, because the interaction provided by the repulsive force relaxation method is introduced for the dots.

3. Section C
Continuous Change of a Filling Rate: Probabilistic Sampling

Figure 25:
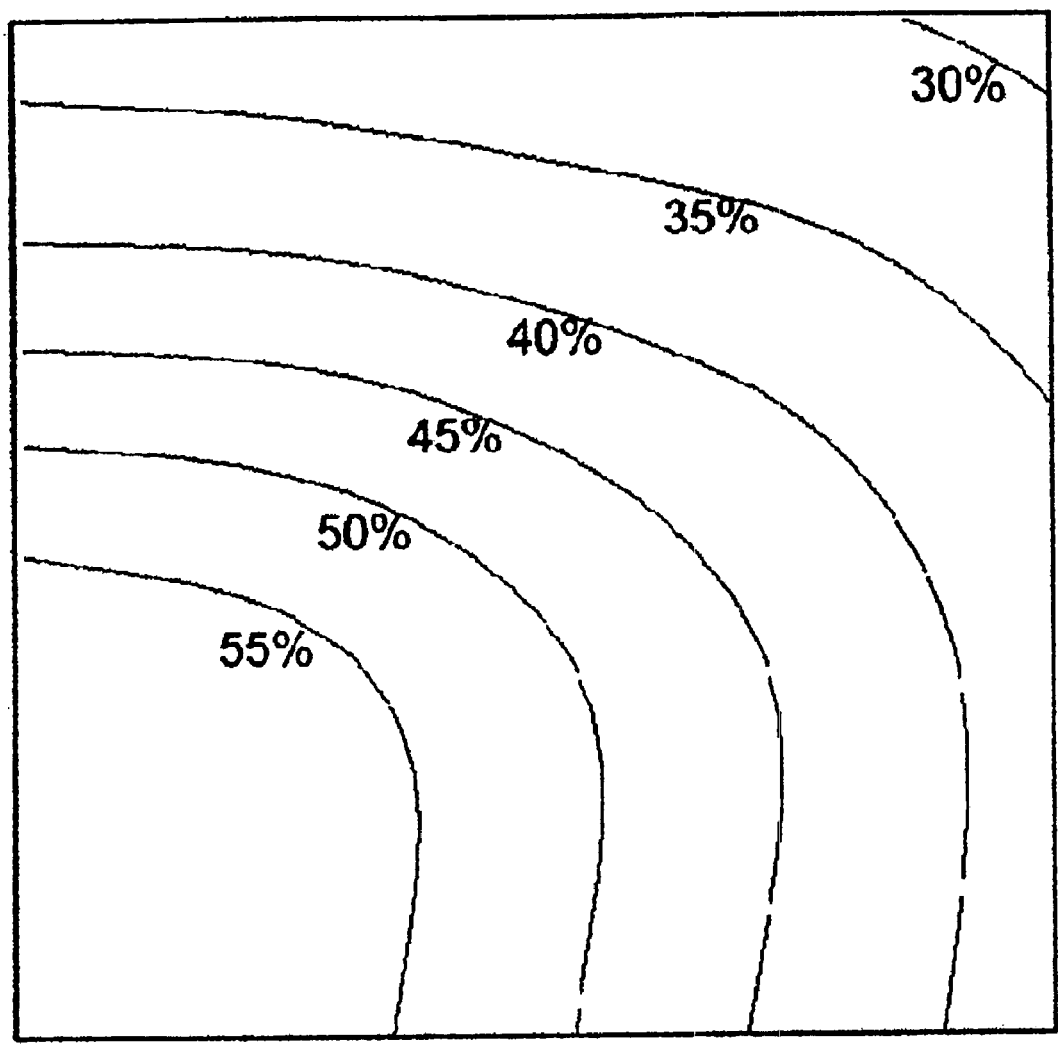
FIG. 25 is a diagram showing a filling rate distribution for the discrete pattern.

To employ the discrete pattern for an actual application, it may be necessary for the filling rate to be changed while the uniform randomness is maintained. In this invention, the probabilistic sampling is employed in order to continuously change the dot filling rate and to prevent visible defects in a discrete pattern. FIG. 25 is a diagram showing the filling rate distribution required when the present invention is applied for the light guide plate of the backlight unit of a light-transmitting liquid crystal display device. The filling rate at the lower left corner in FIG. 25 is about 60%, while the filling rate at the diagonally opposite corner is about 30%, and the intervals between these ratios are represented by the contour lines for the filling rates.

This filling rate distribution is provided because the light scattering property is increased at the four corners to remove low-luminance areas that tend to appear thereat on the screen of a light-transmitting liquid crystal display device. For the conventional method for considering the random perturbation from a lattice point, it is substantially difficult for the continuous filling rate distribution shown in FIG. 25 to be implemented without causing a moire pattern or a visible boundary. In this invention, the probabilistic sampling is employed, and the overall area for generating a discrete pattern is partitioned into divisions having a predetermined size, e.g., several mm. Then, the filling rate is defined for each division, while the filling rate for a division i is denoted as di. A quantity provided by the following expression $$p_i = \frac{d_i}{\sum_j d_j}$$

is defined by using the filling rate, and the sum runs over all of the divisions. This quantity is regarded as a probability defined for each division, and a division for which a predetermined filling rate should be set is selected in accordance with the probability. That is, a division k is selected from the equation $$F_k \equiv \sum_{i=1}^{k} p_i = U$$

where U denotes a low-discrepancy sequence defined within the interval (0,1). The discrete function $F_k$ is a quantity corresponding to the cumulative probability distribution. The location in the division k is again selected by using two sets of low-discrepancy sequence values. Through this selection, an arbitrary filling rate distribution can be implemented at the initial positions. While the dots are shifted through the following relaxation process, the shift in the filling rate distribution can be almost ignored, so long as the filling rate is provided by the continuous function and so long as the range reached by the repulsive force and the distance whereat the repulsive force is attenuated are correctly scaled in accordance with the filling rate. In this invention, the above described method is defined as the probabilistic sampling.

When the probabilistic sampling and the relaxation method are employed, it is important that the parameters of the repulsive force be scaled in accordance with the filling rate. For the application for a light guide plate for which the filling rate approximately changes from 70% to 10%, it is preferable that the parameters be arranged as $$0.5 < \frac{D(\theta)}{\Delta r} < 1.5$$

$$0.1 < \frac{L(\theta)}{D(\theta)} < 1$$

$$\frac{D(\theta) + L(\theta)}{\Delta r} < 2$$

where $\Delta r$ denotes the mean interval of dots, which is defined as a lattice interval when dots are arranged in a square lattice to satisfy a predetermined filling rate. The $\Delta r$ is related to the filling rate a under the relationship $$\Delta r = \frac{s}{\sqrt{a}}$$

where s is the maximum diameter of the dot. For example, a dot is 0.1 mm and the filling rate is 50%, while $\Delta r$ is about 0.14 mm. When appropriate parameters are selected within the above described ranges in accordance with the repulsive force model, the dots are distributed at a mean interval of substantially $\Delta r$. It was found that the overlapping of dots can not be properly eliminated with a D that is several times $\Delta r$. Through the above scaling, not only when the filling rate is changed, but also when the diameter of a dot is continuously changed, a uniform, irregular pattern with no overlapping of dots can be generated by using the D and L in common.

Figure 26:
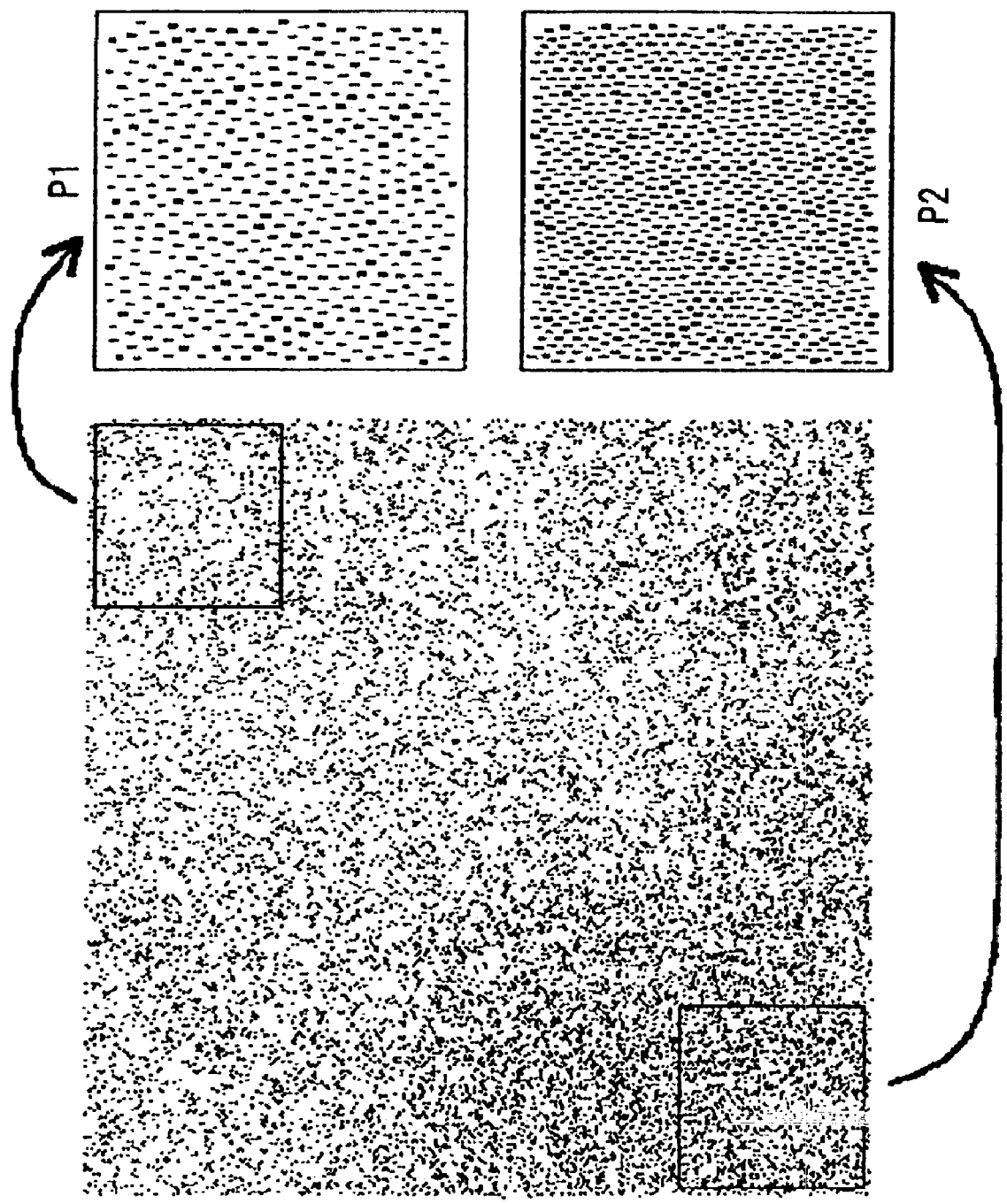
FIG. 26 is a diagram showing a discrete pattern obtained using the probabilistic sampling.

FIG. 26 is a diagram showing a discrete pattern for the invention, which is generated by the probabilistic sampling and for which the filling rate is continuously changed, and partially enlarged portions of it. In the discrete pattern in FIG. 26, a filling rate distribution proportional to the one in FIG. 25 is provided for rectangular dots. For the calculations performed for the pattern in FIG. 26, the repulsive force model is an elliptic exponential type having parameters of n=1, k=0.5, D=Dr [mm] and $L_1$=0.4D. A dot diameter of 0.1 mm is employed to calculate the filling rate. As is shown in FIG. 26, in the discrete pattern for the invention, wherein the filling rate is changed continuously, the deterioration of the uniformity is not visually identified in the boundary area wherein the filling rate is changed, and a moire pattern does not occur. As a result, a satisfactory discrete pattern can be obtained.

Figure 27:
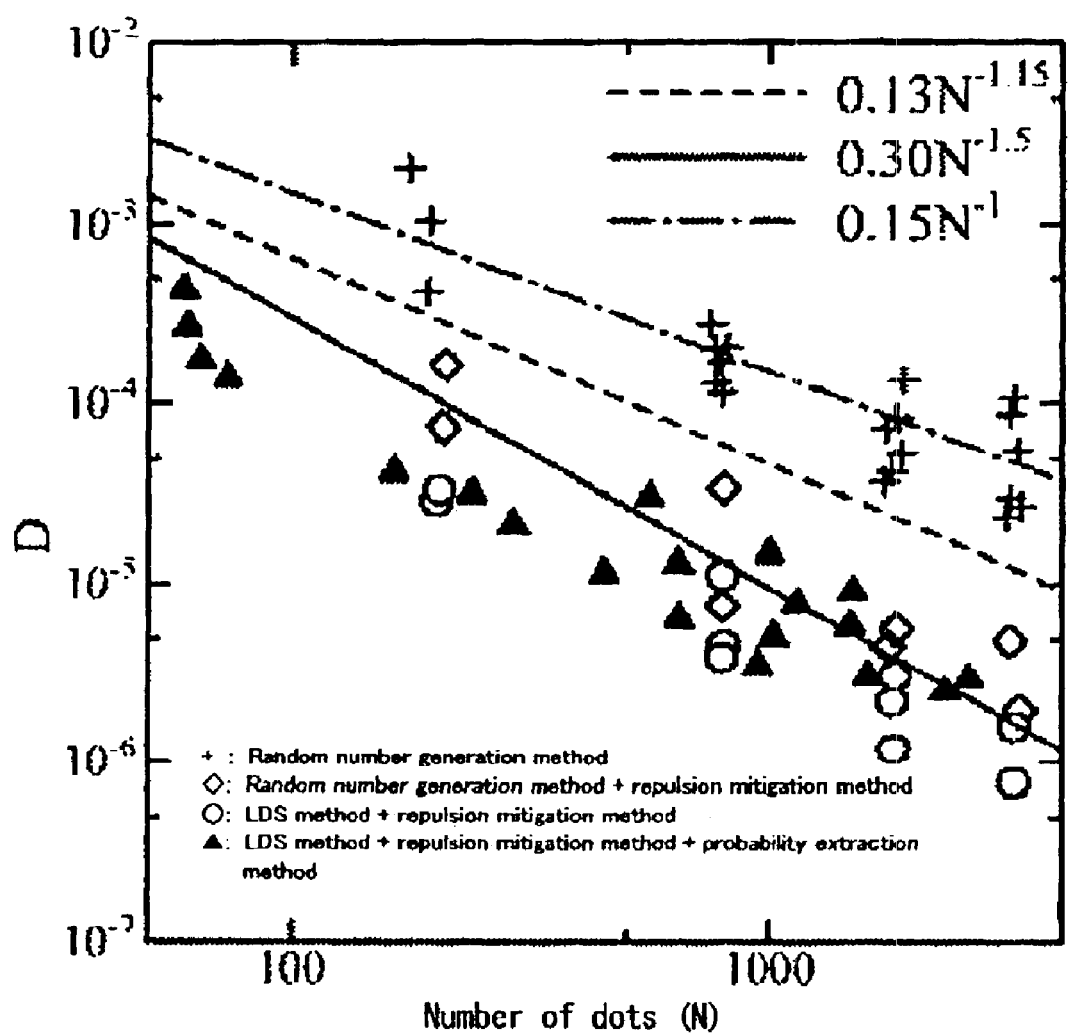
FIG. 27 is a graph showing the discrepancy of discrete patterns, provided by the individual methods, that are plotted in accordance with the number of dots.

4. Section D
Range of Discrepancy for a Discrete Pattern Obtained Using the LDS Method
(D-1) Range of Discrepancy FIG. 27 is a diagram showing the results obtained by performing the calculations for discrepancy for various patterns. The horizontal axis represents the number N of dots, i.e., the number of dots in the area to be calculated. As is shown in FIG. 27, the discrepancy change in accordance with the number of dots arranged in a predetermined division. In FIG. 27, "+" represents the value of D when the dots are distributed, using a pseudo random number, in a uniform pattern at a filling rate of 50%. As is indicated by a chain line in FIG. 27, this value is distributed along the linear line of D=0.15/N in the range for N shown in FIG. 27. The value of D is obtained by calculating the center coordinate of each dot in a specific square area extracted from a random pattern. N is the number of dots included in the square area. In FIG. 27, Î represents the discrepancy when the overlapping of dots has been removed by the repulsive force relaxation method in the initial arrangement determined using the pseudo random number at a uniform filling rate (50%). In this case, since the uneven dot arrangement is reduced by the repulsive force relaxation method, the value of D tends to become smaller than a pseudo random number within a range of the fluctuation of value. As is explained while referring to FIG. 21, however, the distribution is more or less biased compared with when the initial positions are determined using the LDS method (indicated by F and Õ), and within a range of the fluctuation of the distribution the value of D will become greater than that of the pseudo random number. By performing various calculations, including those in FIG. 27, it was found that the value of D must satisfy a predetermined condition in order to prevent an uneven dot arrangement. N is the number of dots included in the square area, and the value of D is obtained by calculating the center coordinate of each dot in a specific square area extracted from a random pattern. It should be noted that, for the random dot pattern wherein the filling rate distribution is present, the value of [(maximum filling rate)−(minimum filling rate)]/(maximum filling rate) should not exceed 0.05. This is because the filling rate distribution itself should not affect the value of D. Further, when the area to be calculated is partitioned into divisions having a size wherein the number of included dots ranges from equal to or greater than 10 to equal to or less than 100 dots, the filling rate for the area to be calculated is obtained by using the number of dots included in the pertinent division.

Through the above study, in order to obtain the uniformity provided by this invention, it was found that when the number of dots arranged in a predetermined division was equal to or less than 4000, the value of D, which is the square of the discrepancy, should satisfy the following expression.

$$D \leq 0.13 N^{-1.15}$$

The number represented by N is determined to be equal to or smaller than 4000, because with more dots, the area for which discrepancy is to be calculated is increased, and this increase may cause an error for D when the filling rate distribution is present. In this invention, it was found that, in the discrete pattern generated by the repulsive force relaxation method, a uniform discrete pattern wherein substantially no uneven dot arrangement was visually present was obtained when the number represented by N ranged from 50 to 4000 and $D \leq 0.30 N/^{1.15}$ was established. Further, in this invention, it was also found that, in addition to the above expression, a very uniform random pattern wherein substantially no uneven dot arrangement was visually present was obtained when the number represented by N ranged from 50 to 4000 and D [$0.30/N^{1.50}$ was established. As is shown in FIG. 27, when the initial value is obtained using the LDS method at a uniform filling rate distribution (50%), and the overlapping of dots is removed using the repulsive force relaxation method, the obtained discrete pattern (F) satisfies the above condition. The discrepancy tend to be slightly increased in this case compared with the discrepancy of a pattern produced by the LDS method; however, this change is quite small compared with the degree of reduction when the pseudo random number is used. When the filling rate distribution is prepared using the probabilistic sampling, and when the initial position is generated using the LDS method (Õ), the variance in the value of D tends to be greater, and the above condition is satisfied within the range of the variance.

It should be noted that low discrepancy itself does not directly mean irregularity. Low discrepancy is preferable for uniformity; however, a discrete pattern whose discrepancy is also low can be generated in a regular lattice. In this case, even if the discrepancy is low, a moire pattern occurs, and this is an inappropriate pattern, especially for an optical application. That is, for the present invention, low discrepancy is a necessary condition for providing uniformity, but can not adequately provide a uniform, random discrete pattern.

Therefore, by employing the method of the invention, the present inventors generated multiple types of discrete patterns that are visually uniform and practically random, and carefully studied these patterns.

Figure 28:
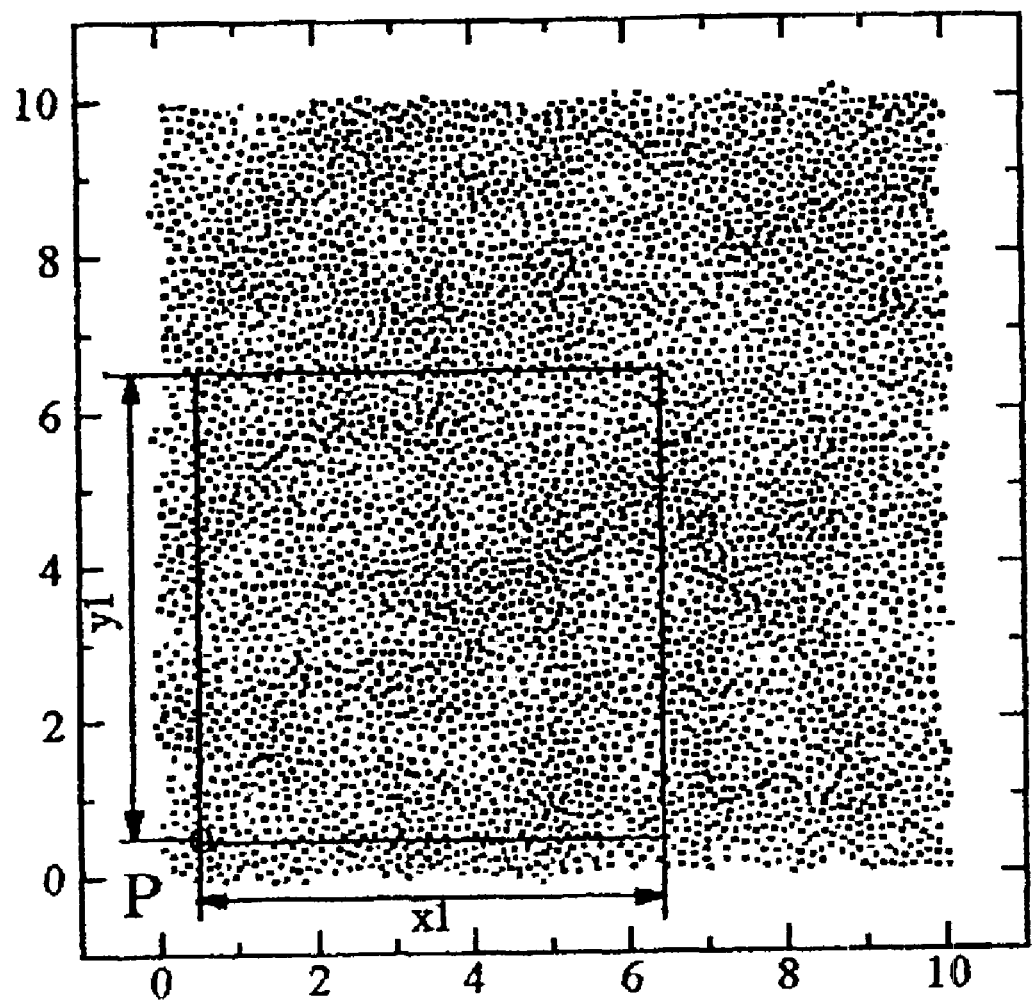
FIG. 28 is a diagram showing the uniformity of a discrete pattern generated using the pseudo random number generation method.
Figure 29:
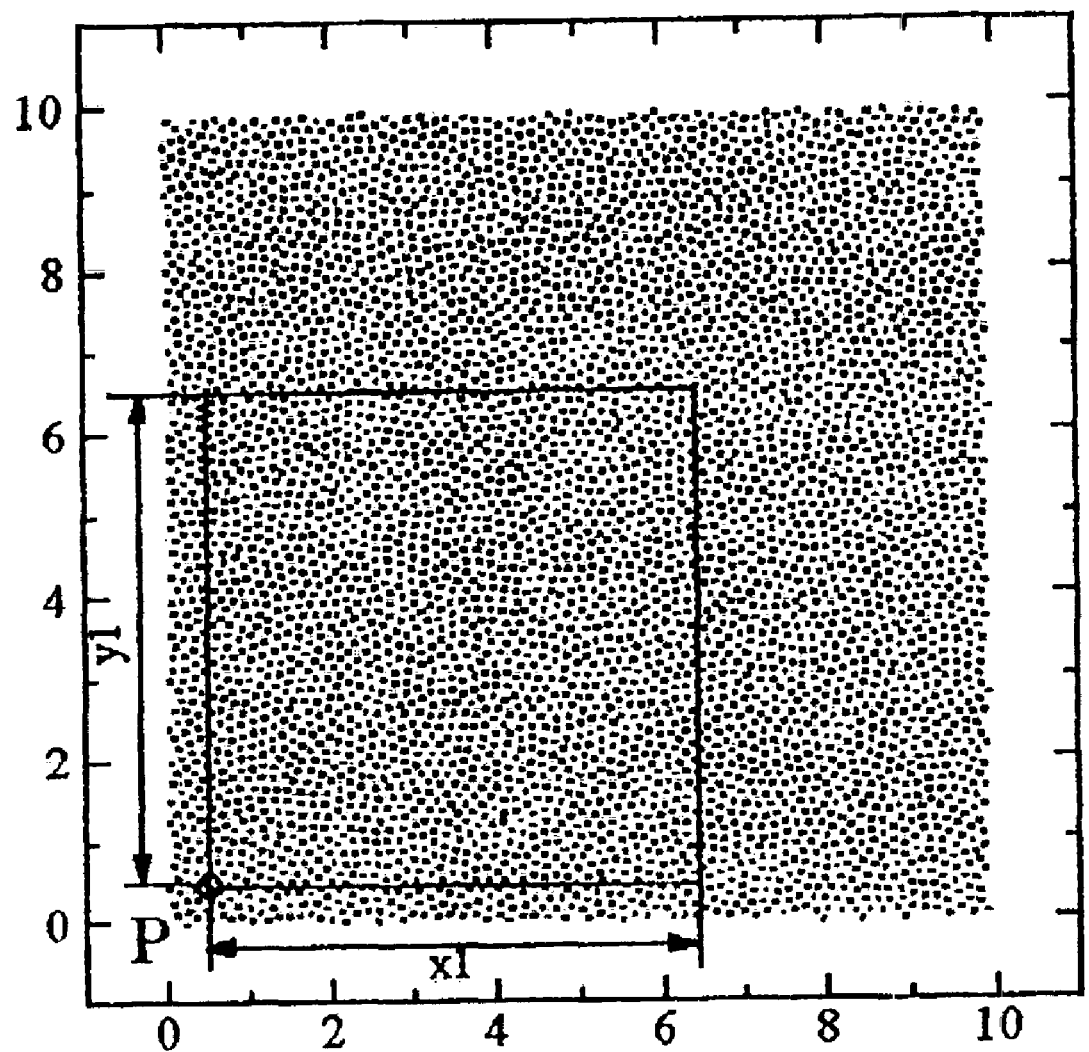
FIG. 29 is a diagram showing the uniformity of a discrete pattern generated using the LDS method and the repulsive force relaxation method.

FIG. 28 is a diagram showing a discrete pattern generated using the pseudo random number generation method and FIG. 29 is a diagram showing a discrete pattern generated using the LDS method and the repulsive force relaxation method. As is apparent from FIGS. 28 and 29, there is a great difference between the two patterns in the uniformity. As is shown in FIGS. 28 and 29, the present inventors calculated the values for D by actually measuring the discrete patterns. For this calculation, as is shown in FIGS. 28 and 29, D was calculated while the point P was fixed and the lengths x1 and y1 for a rectangular area were changed.

Figure 30:
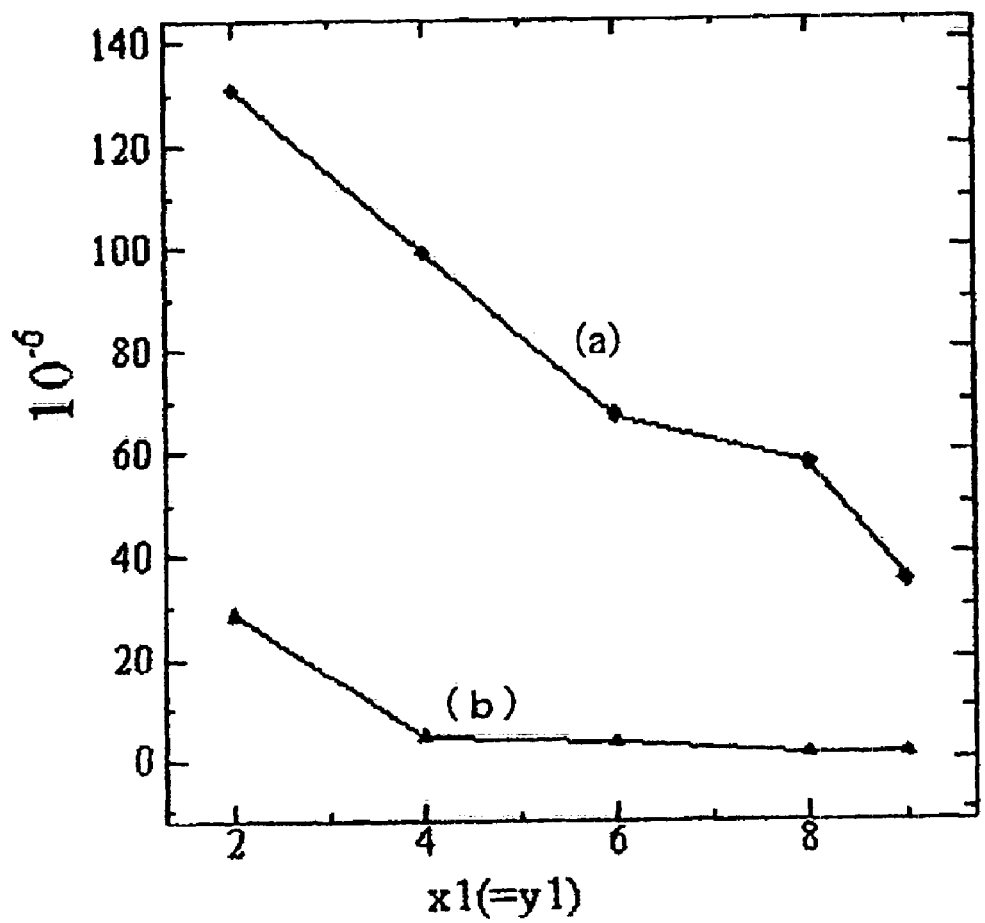
FIG. 30 is a graph showing a discrepancy actually measured in a discrete pattern.

FIG. 30 is a graph wherein the relationship between one side of a square area (x1=y1) and the value D is shown in order to schematically explain the calculation of D. In FIG. 30, (a) represents value of discrepancy obtained for the discrete pattern in FIG. 29, and (b) represents values of discrepancy actually measured in FIG. 29. It is understood that the value of D in the pattern in FIG. 29 is smaller than the D in the pattern in FIG. 28, this is because the value reflects the uneven dot arrangement in FIG. 28. That is, the value of D is proved to actually be the index for the uniformity of an irregular pattern.

(D-2) Index for Randomness

The present inventors defined the total change $S_1$ as the index of randomness by using the following expression.

$$S_1(r_1, r_2) = \int_{r_1}^{r_2} dr \left| g_1(r; r_1, r_2) - g_{av} \right|$$

In expression 64, g is a radial distribution function having a predetermined dot as its center.

$$g(r) = \frac{1}{N-1} \sum_{R \neq 0} \frac{\delta(r-R)}{2\pi r}$$

where d represents Dirac's function, and R represents the distance to another dot when a predetermined dot is used as the origin. The sum is calculated for the central positions of all the dots (other than the original dot) in a target area. In the expression, N is the total number of dots present in the pertinent area. As a reference, the area for which the sum is to be calculated can be a square area wherein the original dot is centrally and wherein at least 50 dots are included.

The above function can be interpreted as the presence probability density of dots using the unit length along the circumference of the radius r. This can be understood because the following specification condition is established.

$$\frac{1}{N-1} \sum_{R \neq 0} \int 2\pi r dr \frac{\delta(r-R)}{2\pi r} = 1$$

Figure 31:
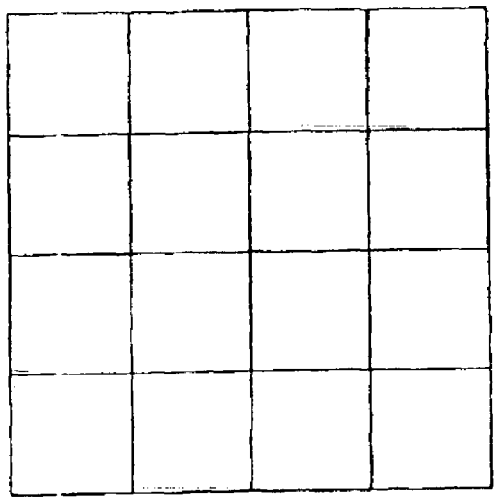
FIG. 31 is a diagram showing a 5×5 square lattice wherein dots are arranged at the individual lattice points.

An explanation will now be given for an example wherein the dots are arranged at individual lattice points in a square 5×5 lattice shown in FIG. 31. In this case, the radial distribution function around the center position is provided by the following expression.

$$g(r) = \frac{1}{12\pi a}\left[\delta(r-a) + \frac{1}{\sqrt{2}}\delta(r-\sqrt{2}\,a) + \frac{2}{\sqrt{5}}\delta(r-\sqrt{5}\,a) + \frac{1}{2}\delta(r-2a) + \frac{1}{\sqrt{8}}\delta(r-\sqrt{8}\,a)\right]$$

In this expression, a is the lattice constant, and it is easily confirmed that the lattice constant a satisfies the specification condition.

Actually, the delta function is calculated by being replaced with the following Gaussian function.

$$\delta(r-R) \to \frac{1}{\sqrt{2\pi}s}\exp\left[-\frac{(r-R)^2}{2s^2}\right]$$

This is because a definite measurement error is taken into account. In expression 68, s is so selected that the following expression is established.

$$\frac{s}{\Delta r} = \frac{1}{N-1}$$

This expression relates to N, taking into account the fact that the average number of surrounding dots for the calculation of g. Dr is a lattice constant for a square lattice that satisfies a predetermined filling rate.

FIG. 32A is a graph showing g in the square lattice when s=a/24. As is shown in FIG. 32A, peaks are pointed and are thorn shaped, and this means that the dots are arranged regularly. This is because the surrounding dots are dispersed regularly relative to the central dot. If the dots are irregularly arranged, a sharp peak in FIG. 32A for a sufficiently large N will not appear relative to the average g for the original dot, and a smooth function can be expected. Therefore, for a function defined by the following expression, $$g_1(r; r_1, r_2) = g(r) / \int_{r_1}^{r_2} dr g(r)$$

the following expression is defined $$S_1(r_1, r_2) = \int_{r_1}^{r_2} dr |g_1(r; r_1, r_2) - g_{av}|$$

as the index of regularity, i.e., the total variance. Here the domain of g, is from r=$r_1$ to $r_2$. It should be noted that g or $g_1$ is regarded as an average distribution function when the dot position of the origin is variously changed.

In this case, $g_{av}$ is defined as follows.

$$g_{av} = \frac{1}{r_2 - r_1}\int_{r_1}^{r_2} dr g_1(r)$$

This value is indicated by a broken line in FIG. 32A. $S_1$ corresponds to the sum of the area sizes A, B, C and D in FIG. 32A.

FIG. 32A is a graph showing the results obtained through the simulation of the square lattice by changing the value s. In the regular lattice, the distribution function averaged over all of dots is exactly equal to the distribution function with respect to an arbitrary dot. In this case, the values of s are set to a/24, a/10 and a/2, from the top, and $r_1$=1 and $r_2$=3 are employed. The calculation example in FIG. 32B is an example using a regular lattice. In this case, since the Gaussian function can be understood also as the function that represents the fluctuation of the dot center position, a large value s simulates a pseudo irregularity. In FIG. 32B, the horizontally drawn broken line indicates $g_{av}$, i.e., the average value of $g_1$. In this case, since the 5×5 lattice is employed as an example, $g_{av}$ is calculated for the range of from 1 to 3 in FIG. 32B. As is apparent from FIG. 32B, the smoother the function, the greater the reduction in the value of $S_1$. That is, it is concluded that the value of $S_1$ is becomes smaller as the regularity becomes lower.

When the discrete pattern of the invention is used for an optical application, the regularity of dots must be satisfactorily low in order to prevent a problem, such as a moire pattern. Through careful study of the random dot patterns actually generated, the present inventors found that when the above condition is satisfied for D and $r_1$=1.0 Dr and $r_2$=4.0 Dr, and when $S_1$ is equal to or smaller than 0.7, the randomness of the discrete pattern is appropriate practically. Further, it is found that it is preferable for $S_1$ to satisfy $$S_1 < 0.4$$

because the occurrence of a moire pattern can be substantially prevented. Through further careful study, the present inventors confirmed that (since the regularity of dots is more or less observed), patterns that does not satisfy this condition cause a visually perceptible moire pattern.

(D-3) Calculation of Discrepancy and Total Variance for a Discrete Pattern

Various methods are employed for discrepancy calculation and the total variance for actual discrete patterns. For example, a discrete pattern is obtained as digital data by a digital camera or a scanner. Thereafter, discrepancy is calculated using the digital data, including the discrete pattern obtained using the method explained while referring to FIGS. 28 and 29. Then, the parameters explained in (D-2) are calculated using the digital data of the discrete pattern, and the total variance $S_1$ is obtained. Thus, the uniformity of the randomness of the discrete pattern specified in this invention can be determined from the object that includes the discrete pattern.

A discrete pattern can be provided in general two-dimensional areas, i.e., curved surfaces. When a discrete pattern is made by using photolithography techniques, a three-dimensional discrete pattern can be formed. And when a three-dimensional discrete pattern has been formed, for the invention, the uniformity and the randomness can be determined by using, as a reference, an arbitrary portion of the structure of the discrete pattern. In addition, a dot shape providing necessary characteristics is specified by performing appropriate image processing, such as discrimination and trimming, and for the invention, the uniformity and the randomness can also be determined for the dot.

Furthermore, in this invention, prevention of the occurrence of a moire pattern is necessary when a discrete pattern is used, especially when it is used for an optical application. In this case, the radial distribution function, which is obtained using the digital data for the discrete pattern measured in the above manner, can also be discussed. For this invention, especially in order to prevent the occurrence of a moire pattern, it is preferable that the average radial distribution function of the discrete pattern does not have a sharp peak. However, this restriction applied for the radial distribution function need not especially be taken into account for a pattern for which the occurrence of a moire pattern is not a serious issue, e.g., a pattern for slippage prevention or a pattern for a dithering process.

Part II: Generation of a Discrete Pattern by an Automatic Dot Generation Method

According to the first structure of the present invention, as described above, a dot pattern may also be generated by dividing an entire region into small blocks, employing a deterministic dot sequence generation method to generate dots for each small block, assuming that all small blocks have equal filling factors, and thereafter employing a relaxation method to relax a defect of a filling factor in each small block or between small blocks. However, since a number of generated dots is already determined in a step of generating dots in each small block, the number of dots does not increase or decrease in the relaxation step. Accordingly, where the gradient of the filling factor distribution function changes rapidly, dots might be preferably generated so that a filling factor is changed according to necessity, rather than according to a predetermined filling factor.

FIG. 33 shows the embodiment wherein a filling factor is determined in advance and the filling factor is relaxed by the repulsion relaxation method to randomize dots. Since the dot pattern shown in FIG. 33 has a large gradient, freedom for dots to move along with mitigation is restricted between filling factors, resulting in no showing of a desirable time change in a mitigation process. Such defect occurs more or less in the method of fixing an initial number of dots per small block described above. In this case, the defect shown in FIG. 33 may be prevented by generating or deleting dots for each small block.

Generation of a discrete pattern by the automatic dot generation according to the present invention will be described in detail hereinafter. In the present invention, dots are disposed in a predetermined region in the same manner as that described in Part I above. However, in the automatic dot generation method according to the present invention, 1) a rectangular region wherein dots are generated, 2) an area of one dot and 3) a filling factor distribution function defined in the rectangular region, are all given as input data. FIG. 34 shows the rectangular region and the filling factor distribution function employed in the automatic dot generation and deletion method according to the present invention. FIG. 34A is a view showing the rectangular region and FIG. 34B is a view showing the filling factor distribution function defined in the rectangular region shown in FIG. 34A.

Figure 35:
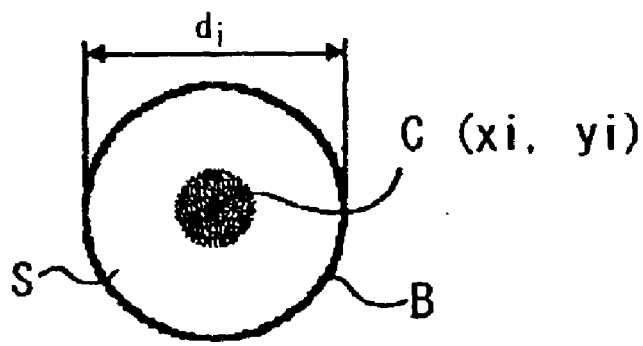
FIG. 35 illustrates a definition of a bubble employed in the present invention.

FIG. 35 shows a bubble, which is a concept related to dots, employed in the present invention. In FIG. 35, a dot is specified to Pi (i=1, . . . , n). According to the specific embodiment of the present invention, all dots have the same area A. When a center (xi, yi) of the dot Pi is specified, the filling factor distribution function may be employed to calculate a filling factor Gi (xi, yi) on said center (xi, yi). The filling factor is a percentage of a total dot area per unit area. When a position of one dot is considered, a circular region wherein any other dot may not exist to satisfy a filling factor specified on said position may be determined. Said circular region is defined to a bubble B. In the embodiment shown in FIG. 35, disposition of dots on the center (xi, yi) and the area of the bubble B having a diameter di specified to S are shown.

Said bubble B has a center [xi, yi] and a diameter di(xi, yi). In the present invention, the said bubble B may be given specifically by, e.g., the formula given hereunder:

$$d_i(x_i, y_i) = \sqrt{\frac{400A}{G_i(x_i, y_i)\pi}},$$

wherein $G_i(x_i, y_i)$ denotes a filling factor shown as a percentage (e.g., 80%) and A denotes a dot area. As described above, in the present invention, since a dot area is given in advance, when one point [xi, yi] in the rectangular region is specified, the filling factor distribution function may be employed to obtain a diameter d of a bubble on said point [xi, yi].

The present invention employs the bubble to automatically generate or delete dots by the steps given hereunder:
  1) an initial dot generation step (optional);
  2) a dot coordinate value updating step employing an attraction and repulsion model; and
  3) an adaptable addition or deletion step, and
dynamically relaxing the dots, including the generated dots, to generate an excellent discrete pattern specially in a region wherein a filling factor distribution changes rapidly.

The initial dot generation step will be described hereinafter. In the present invention, the initial dot generation step may be considered optional. When the initial dot generation step is omitted, the process is started from an initial state wherein a number of dots is 0. Thereafter, the number of dots may be increased and dots may be added sequentially into a rectangular region in the automatic dot generation and deletion step. In the present invention however, hardware resources, e.g., a calculation time required to generate a desired dot pattern, a storage capacity and the like may be primarily saved by generating a dot pattern close to the desired dot pattern. In the embodiment of the present invention wherein the initial dot generation step is omitted, said initial dot generation step may be executed according to a capacity of hardware resources by repeatedly applying the position coordinate update step and dot addition and deletion step by performing dot attraction and repulsion mitigation described later. Therefore, procedures including the initial dot generation step will be described in the embodiments of the present invention hereinafter.

Figure 36:
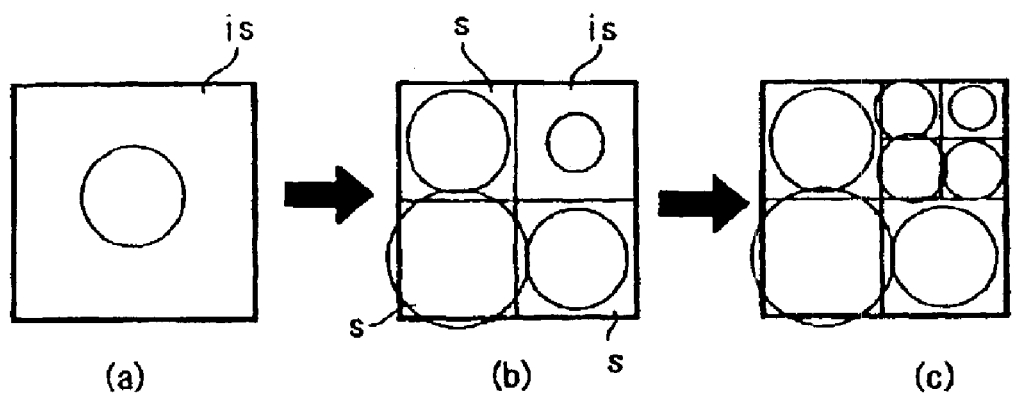
FIGS. 36A, 36B and 36C show a region division method for automatic dot generation according to the present invention.

As apparent from the foregoing description, the initial dot generation step adopted in the present invention is a step for generating a dot pattern close to a desired dot pattern in order to reduce a calculation time. In the present invention, several methods may be employed for the above-described initial dot generation step. FIG. 36 shows the method for employing a quadtree available in the present invention. In the method of employing the quadtree shown in FIG. 36, a bubble is primarily disposed in a center of a rectangular region. The diameter of said bubble is calculated by employing a filling factor on said center from the formula given above. In a block denoted by s wherein said bubble covers a sufficient area of the rectangular region, no more division is performed leaving said bubble. In a block denoted by is wherein said bubble does not cover a sufficient area of the rectangular region, the quadtree is employed to divide the rectangular region into four small sections, the same processing is performed on all small sections and bubbles are disposed in all small sections. By recursively repeating said processing, a bubble is given as shown in FIG. 36C and the center position of the given bubble is determined as a dot position to generate an initial dot. In still another embodiment of the present invention, an initial dot may be generated by the LSD method employing the filling factor distribution as described in Part I above.

In the present invention, the attraction and repulsion model is employed subsequently to adjust a position coordinate of a dot to correct the position of an initial dot in an appropriate attraction and repulsion potential. In the dot coordinate value update step, when two bubbles are disposed adjacently, repulsion acts, or when two bubbles are separated, attraction acts, such that bubbles are moved to positions where the two forces are balanced and the center positions of the bubbles are set to position coordinates where the potential energy between bubbles after moving is minimized.

Figure 37:
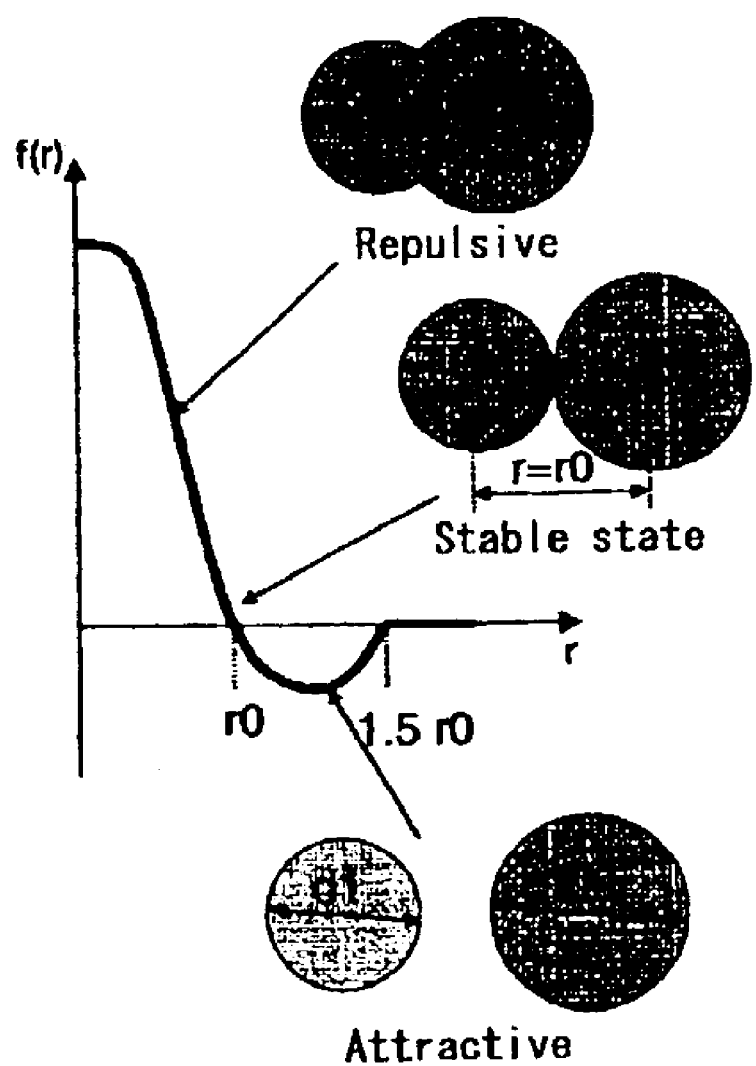
FIG. 37 shows a force to be made to act between bubbles employed in the present invention.

A potential energy between two bubbles B1 and B2 is studied for further specific description. Centers of the two bubbles are assumed to be [x1, y1] and [x2, y2] respectively and diameters thereof are assumed to be d1(x1, y1) and d2(x2, y2) respectively. When a distance between centers of the two bubbles is represented by a variable r and said r is a value r0 calculated from the formula given hereunder, the two bubbles are adjacent and both forces of attraction and repulsion between them are balanced. FIG. 37 shows this state with a repulsion function. The structure shown in FIG. 37 enables repulsion to act when the adjacent bubbles are overlapped with each other; neither repulsion nor attraction acts when the bubbles' boundaries are adjoined; and, attraction acts when the bubbles are separated.

$$r0 = d1(x1, y1)/2 + d2(x2, y2)/2$$

This state is assumed to be a stable state whereto no force acts. Further, as shown in FIG. 37, a force between bubbles is determined so that attraction acts when r is greater than r0 and repulsion acts when r is fewer than r0. As one example, a force between bubbles f(r) may be defined as f(r) in the formula given hereunder.

$$f(r) = \begin{cases} ar^3 + br^2 + cr + d & (0 \le r \le r0) \\ 0 & (1.5r0 < r) \end{cases},$$
$$f(r0) \equiv f(1.5r0) = 0, \; f'(0) = 0, \; f'(r0) == k0.$$

The function f(r) in the formula given above shown in FIG. 37 has a repulsion access range D and includes a repulsion term and an attraction term. When a dot is automatically generated in the present invention, the attraction shown in FIG. 37 is preferably considered in addition to repulsion. Accordingly, a function having an attraction term of a variety of potentials described in Part I may be employed in the automatic dot generation step. The reason why is because, when the automatic dot generation method is used, bringing the generated dot close to a separate dot need be considered in addition to repulsion between the generated dot and another dot.

In the automatic dot generation step adopted in the present invention, one newly generated bubble Bi[xi, yi] is given a force from a multiplicity of bubbles existing in the surroundings by the formula given above to obtain a new coordinate. At this time, the formula given hereunder, for example, may be employed as a energy equation of motion by a potential energy:

$$m\frac{d^2 x_i(t)}{dt^2} + c\frac{dx_i(t)}{dt} = f_i(t), \; m\frac{d^2 y_i(t)}{dt^2} + c\frac{dy_i(t)}{dt} = f_i(t),$$

wherein a coefficient t denotes a time, m denotes a dot mass and c denotes a resistance at moving of a dot. A moving destination position is calculated by employing a formula created by employing a difference to rewrite the formula given above to increase a time Δt for a specific amount at each repetition. A center position of a bubble thus obtained is determined as a dot position.

Further, the adaptable dot addition and deletion step, which is the third step in the dot generation method according to the present invention, is executed. Said automatic dot generation step is processing which is performed repeatedly together with the moving of a generated dot. In the dot addition and deletion step, extremely overlapping bubbles are deleted and new bubbles are added into spaces in a process using repeated calculations. In the present invention, a variety of methods to be employed in the above-described dot addition and deletion step may be thought of. A method of employing Delaunay triangle division to add or delete a bubble is one representative method.

In the method of employing the Delaunay triangle division in the present invention, a Delaunay triangle mesh connecting centers of existing bubbles is primarily generated. Then, the side length of the mesh and an r0 value (a sum of bubble radiuses) calculated from bubbles on both ends of the mesh are compared. When the side length is larger than a specific rate in comparison with r0, a new bubble is generated on a middle point of the side. On the other hand, when the side length is less than a specific rate in comparison with r0, either of the bubbles on the ends is deleted. This bubble addition and deletion need not be always performed at each repetition, but may be performed only once in several repetitions.

In the present invention, any method other than the above-described Delaunay triangle division may be employed to generate or delete a bubble. In the present invention, any method including a method for specifying a specific threshold value for a distance between adjacent bubbles and then generating a new bubble on a gravity center of bubbles separated farther then said threshold value, or a method of specifying a minimum threshold value for a distance between bubbles and then erasing either of bubbles separated fewer than the minimum threshold value, may be adopted as long as bubbles may be added and deleted appropriately.

Figure 38:
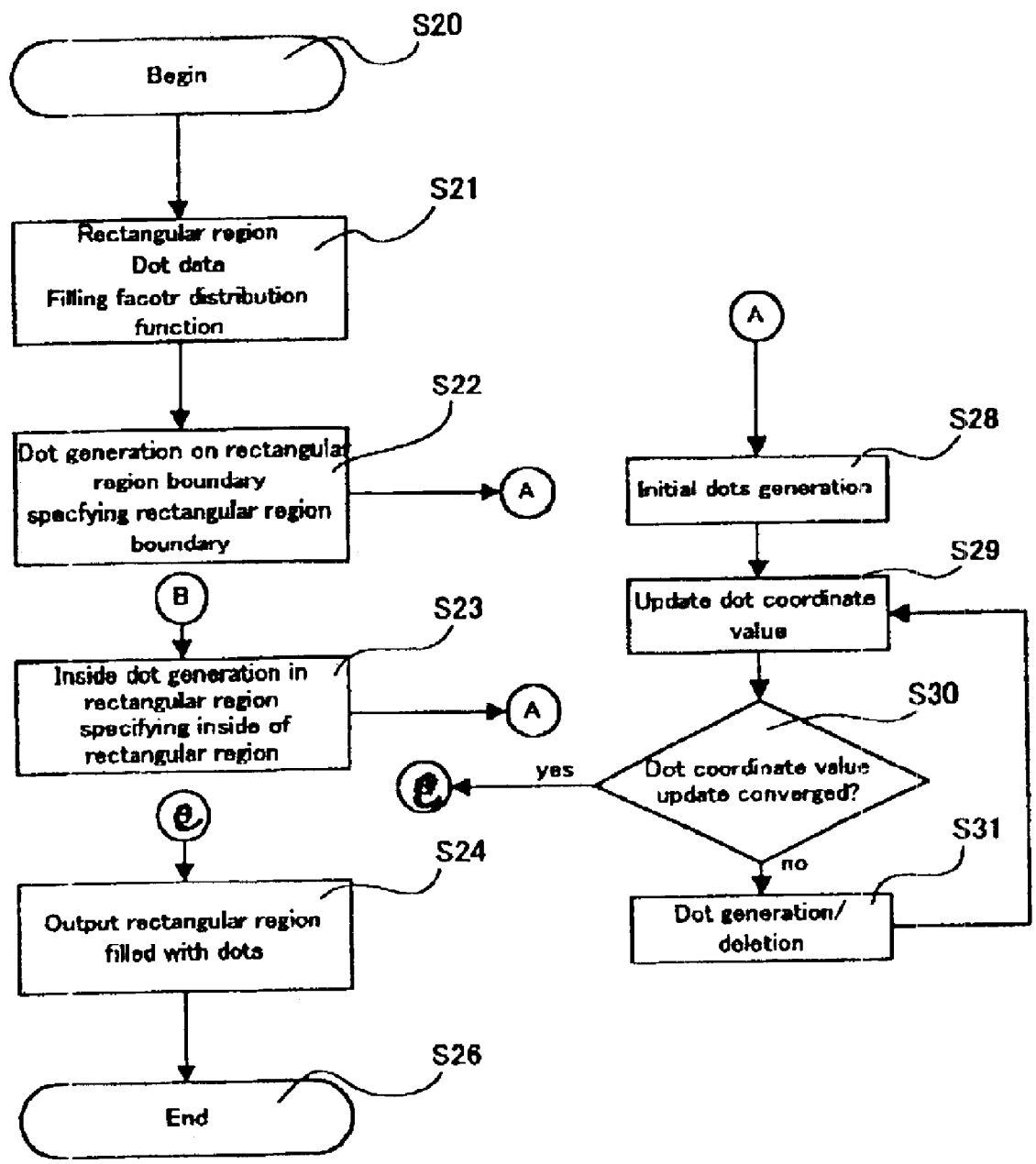
FIG. 38 shows a flowchart of an automatic dot generation and deletion method according to the present invention.

The specific embodiment of the automatic dot generation method according to the present invention will be described in details hereinafter. In the present invention, the automatic dot generation method is executed in order to perform adaptable automatic dot generation or deletion to retain an appropriate filling factor distribution. FIG. 38 shows processing processes employable in the present invention for the above-described purpose. FIG. 38A shows a schematic procedure to generate dots in a predetermined rectangular region. FIG. 38B shows a schematic procedure of the dot addition and deletion process. There are three types of input data for the automatic dot generation processing according to the present invention; a rectangular region wherein dots are generated, a dot area, and a filling rate distribution function. In the specific embodiment of the present invention, said rectangular region is given as a region nearby an end portion whereto a margin is added so that a filling factor distribution may be accurately obtained in a region where dots are desired to be generated. Said dot area is employed when a bubble diameter is calculated from a filling factor by employing the formula given above. The filling factor distribution function, which is the third data, is a filling factor distribution function defined in a rectangular region wherein dots are generated. FIG. 39A shows the rectangular region employable for said dot generation. FIG. 39B shows the filling factor distribution function. When one point in the rectangular region is given, a filling factor on said point is calculated from said filling factor distribution function.

The automatic dot generation and deletion processing will be described with reference to the flowchart shown in FIG. 38 hereinafter. The automatic dot generation and deletion processing is started from step S20 and thereafter, the rectangular region, the dot area, and the filling factor distribution function are entered in step S21. Subsequently, generation of a dot on a boundary of the rectangular region is declared in step S22 according to the procedure shown in FIG. 38. After said declaration, the automatic dot generation and deletion procedure shown in FIG. 38 at C is executed on the boundary of the rectangular region. After the procedure shown in FIG. 38 at B ends, the result is passed to step S23 shown in FIG. 38 at A and generation of dots in the rectangular region is declared. Thereafter, the procedure shown in FIG. 38 at B is employed again to generate dots in the rectangular region, the result of dot generation is passed to step S24 and have step S24 output the result and the automatic dot generation and deletion processing according to the present invention is terminated.

Step S23 is executed after fixing the dot coordinate value on the boundary of the rectangular region generated in the above-described step S22 to prevent dots generated in step S23 from moving to outside of the rectangle in the process of the repeated calculation by generating bubbles in boundary regions of the rectangular region in advance. Specifically, when the procedure of step S22 is executed in advance, dots positioned nearby boundaries are given repulsion from dots positioned on boundaries so as to prevent dots from getting out of the rectangle.

For the rectangular region employed this time is given by adding a margin to an actually employed region as shown in FIG. 39 at A. The reason why is because, when step S22 is executed, dots are arranged along boundaries of the employed region and moiré or the like is generated on a boundary portion where rectangular regions are adjacent without a margin. Accordingly, the rectangular region whereto a margin is added is generated so that dots are not arranged on a boundary of a region desired to be employed. Flow A of FIG. 39 shows the process whereby dots are generated as a rectangular region. In the present invention however, a region of an arbitrary shape may be employed according to a purpose. Further, A shows the region wherein dots are generated as a plane region. In the present invention however, a three-dimensional region having, e.g., a curved shape or the like, may also be employed according to a purpose.

Further, in the present invention, the processing in step S22 shown in FIG. 38 is performed on a segment (one-dimensional figure). On the other hand, processing in step S23 is performed on a rectangular area (two-dimensional figure). The procedure shown in FIG. 38 at B may be employed for processing in steps S22 and S23 in the same manner. The procedure shown in FIG. 38 at B will be described hereinafter. In step S28, an initial dot is primarily generated. In this case, either the LDS method or the random number generation method may be employed in the present invention. In the specific embodiment of the present invention however, the LDS method may be employed to generate an initial dot to obtain an excellent discrete pattern in a relatively short time. Subsequently, coordinate values of dots are updated in the process of the repeated calculation in step S29. When a quantity of updating the dot coordinate values in step S30 becomes fewer than a predetermined threshold value, said repeated calculation judges that dot moving has almost ended then passes the result thereof to step S23.

In another case (i.e., a "no" determination), dots are automatically generated or deleted in step S31 and updating of dot coordinate values in step S29 is performed again. When a result of reexecuting the judgment in step S30 shows that the updating quantity of dot coordinate values is sufficiently small (yes), the result of the judgment is passed to step S24 as output data, dot patterns filled inside the rectangular region are output and the processing is terminated in step S26. Said steps will be described in more details hereunder.

First, step S28 of generating an initial dot shown in FIG. 38 will be described in details hereinafter. The above step is, as described above, processing performed to reduce a calculation time by primarily generating a dot pattern close to a dot pattern desired to be obtained. As shown in FIG. 36, the method of using a quadtree may be employed to generate an initial dot. In addition, when a quadtree is employed in the present invention, since the target is a segment in processing in step S22, a bitree may be employed and, since the target is a rectangular region in the processing in step S23, the quadtree may be employed to generate an initial dot.

Further, in the present invention, the method of giving an initial dot in advance by the LDS method may be employed as described above. Specifically, an initial dot may be generated by employing the LDS assuming that filling factors of a plurality of small blocks created by dividing the rectangular region are steady. Further, in the present invention, when an initial dot is generated in advance, a fluctuation is given to a filling factor distribution per small block for the initial dot to further improve discrepancy of a discrete pattern.

Step S29 of updating dot coordinate values shown in FIG. 38 will be described hereinafter. In said step, one bubble (circular region) corresponds to each dot, and a force of attraction or repulsion is made to act between bubbles to calculate a new dot position. A force which acts between bubbles is calculated by employing the formula given above. Further, dot movement is analyzed by employing the equation of motion in the formula given above to calculate new position coordinates of dots so that sums of attraction and repulsion reduce.

Further, since the target of bubble generation is a segment in the processing in step S22, one bubble is given forces from bubbles on both sides of said one bubble and moves to a new position on the segment. On the other hand, since the target is a rectangular region in the processing in step S24, one bubble is given forces from bubbles positioned around said one bubble and moves two-dimensionally to a new position in the rectangular region. At this time, with regard to repulsion and attraction between bubbles, since only forces from bubbles at the specific distance or nearer need be taken into consideration when a force is defined not to be given from a bubble separated for a specific distance (1.5 r0 in the specific embodiment of the present invention) or more, a stable convergence may be expected and a calculation time may be saved.

Further, step S30 for judging execution of the repeated calculation in the automatic dot generation and deletion processing will be described hereinafter. Moving ranges of all dots are calculated by the above-described processing. When a maximum value of the ranges is equal to or less than a predetermined threshold value, the repeated calculation ends, assuming that a dot moving range is very few (i.e., a "yes" determination at S30). In another case (i.e., the "no" determination at S30), the processing advances to the automatic dot generation and deletion step. Further, in the present invention, the repeated calculation may be terminated when a quantity of a change in a sum of attraction or repulsion becomes equal to or less than a predetermined threshold value.

Subsequently, dots are automatically generated or deleted in step S31. In step S31, a distance between centers of two adjacent bubbles and an r0 value (sum of radiuses of the two bubbles) are primarily compared. When the distance between centers of bubbles r is greater than, for example, a predetermined threshold value in comparison with the r0 value, a new bubble is added between said two bubbles. At this time, a value of, for example, 1.8 r0 denoting a distance between bubbles may be employed as a threshold value. On the other hand, when r is less than a specific rate or a minimum threshold value, either bubble is deleted. A value 0.5 r0 may be employed for example as said rate or said minimum threshold value.

In addition, in the present invention, adjacent bubbles need be specified. Since the target of the processing in step S22 is a segment, a method of specifying adjacent bubbles may retain bubble sequences on a segment in order. On the other hand, since the target of the processing in step S23 is a rectangular region, it is not as easy as the case wherein a segment is targeted. Accordingly, the Delaunay triangle division is primarily employed to generate a triangle mesh having bubble centers as nodes. As a result, two bubbles connected with a side of the triangle may be judged to be adjacent bubbles.

Further, when the above-described addition or deletion judgment is performed before bubbles added newly in the previous repetition move to stable locations, the newly added bubbles meet deletion judgment conditions and may be deleted. Therefore, the automatic dot generation or deletion procedure in step S30 is preferably executed only once in a predetermined number of repetitions (5 to 10 times) rather than being executed at each repetition.

Figure 40:
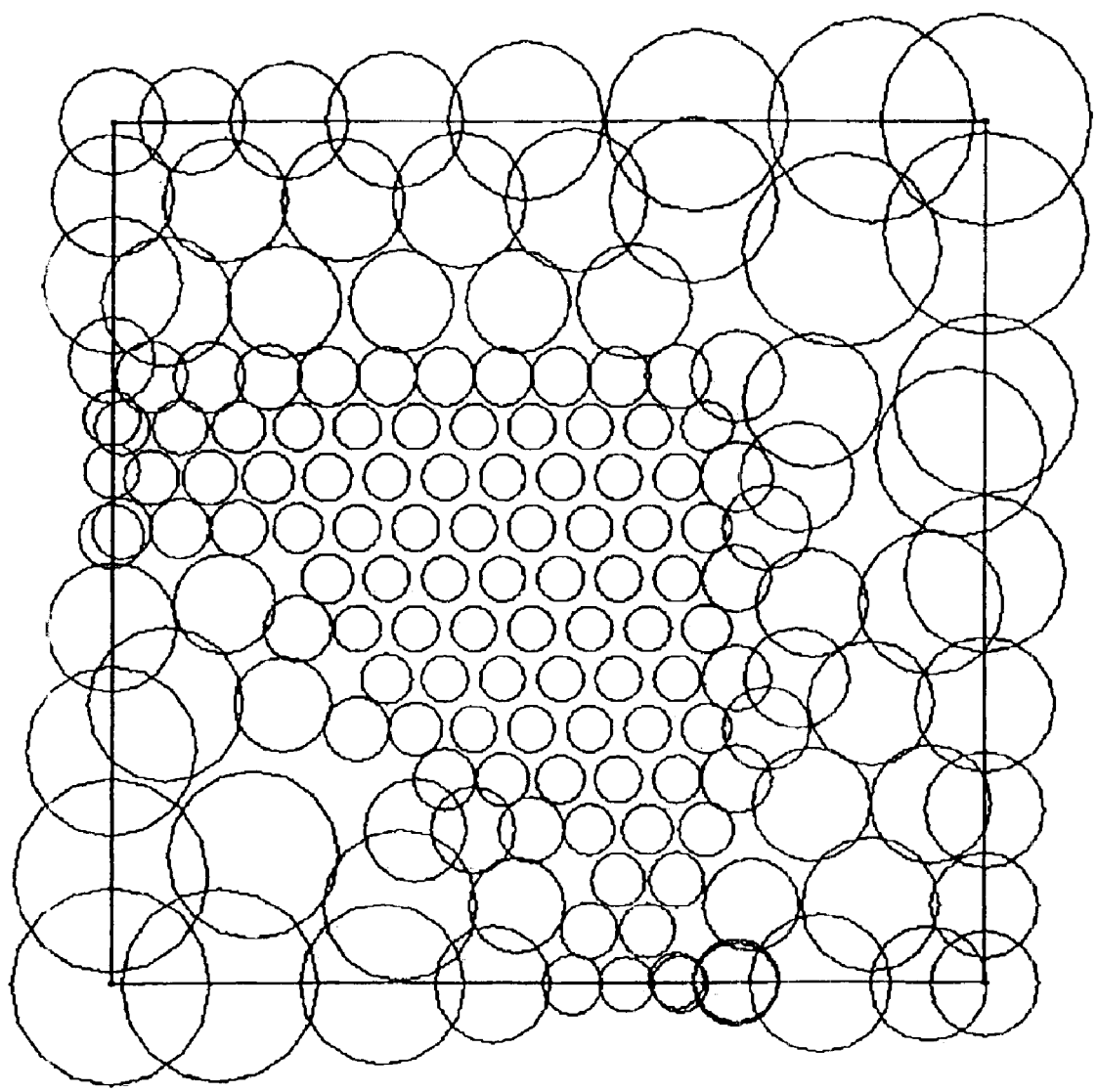
FIG. 40 shows a dot pattern before being generated by the automatic dot generation processing according to the present invention.
Figure 41:
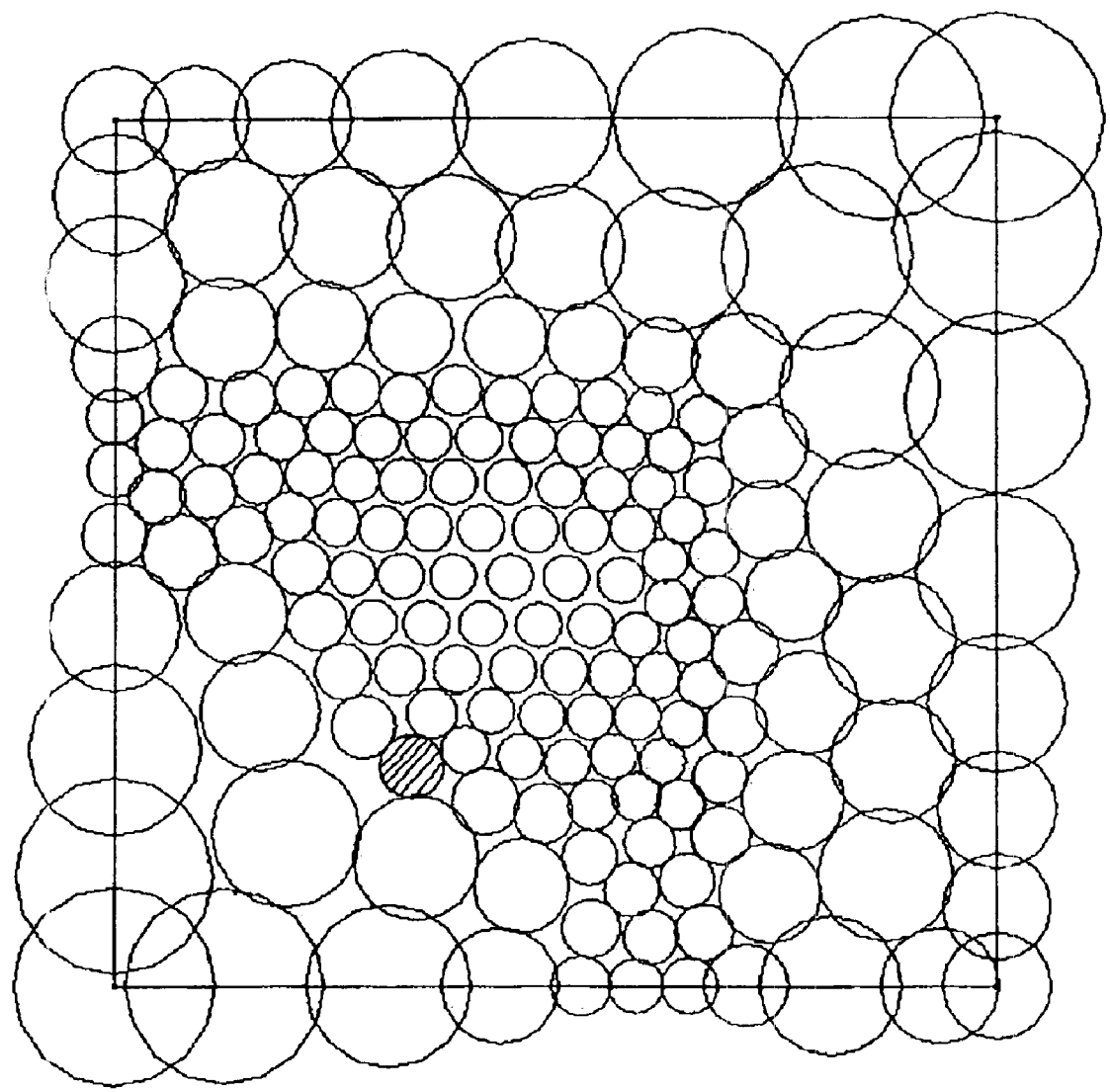
FIG. 41 shows a dot pattern immediately after dots are added according to the present invention.

FIG. 40 shows a dot pattern before being generated by the above-described automatic dot generation processing according to the present invention. FIG. 41 shows a dot pattern immediately after generating dots according to the present invention. New dots, shown as hatching in FIG. 41, thereafter obtain position coordinates where said dots enter a most stable state according to attraction or repulsion from surrounding dots and in, for example, a region wherein a distribution function rapidly changes, such that optical defects (e.g., moiré and the like) may be suppressed.

Part III: Halftoning of a Variable-density Image According to Dynamic Scaling Rules In the present invention, the above-described LDS and the above-described repulsion relaxation method may be employed to binarize a variable-density image satisfying a predetermined blue noise. In the halftoning of a variable-density image according to the present invention, the LDS method is employed to generate an initial pattern and thereafter the repulsion relaxation method may be applied to said initial dot pattern to provide a discrete pattern that provides a dithering pattern for halftoning of a variable-density image as a dynamical many-body problem. The halftoning of a variable-density image according to the present invention will be described in details hereunder.

The present invention may be applied to the halftoning of a variable-density image by giving repulsion between an arbitrary i dot and another dot adjacent to said i dot and then trace a dynamical time evolution of said repulsion as described above. Here, in the present invention, the formula given hereunder employing m and c as constants is employed as an equation of motion for the i dot.

$$m\frac{d^2 \vec{r}_i}{dt^2} + c\frac{d\vec{r}_i}{dt} = \vec{F}_i = \sum_j \vec{f}_{ij}$$

The total sum symbol on the rightmost side represents a vector sum over all dots adjacent to the i dot. The formula given above is assumed to include an attenuation term. Here, $t_o$ is assumed to be an initial time. A general solution of the formula given above may be obtained by establishing the formula given hereunder for $t>t_0$.

$$\vec{r}_i(t) = \vec{r}_i(t_0) + \frac{1}{c}\int_{t_0}^{t} dt' \vec{F}_i(t') \left[1 - \exp\left(-\frac{c(t-t')}{m}\right)\right]$$

Here, a value of a constant ratio c/m may be set arbitrarily. When this ratio is increased, for example, m is specified to a smaller value than c, said constant ratio c/m specifically corresponds to a case wherein a light-weight particle is moved in liquid having high-viscosity. In this case, since c/m is large, the term of the exponential function is far smaller than 1 and can be ignored. Accordingly, the position of the particle may be described satisfactory by the difference equation shown by the formula given hereunder $$\vec{r}_i(t + \Delta t) - \vec{r}_i(t) = \frac{1}{c}\Delta t \vec{F}_i(t)$$

In the formula given above, an unknown quantity included in the term of an interaction force on the right side is replaced by a past time value. This corresponds to a case wherein a multi-body correlation is approximated to a mean field from the viewpoint of the multi-body problem.

In the present invention, it has been found out that employment of the dynamical relaxation method in combination with the LDS under the above-described conditions brings a satisfactory result. The halftoning method for a variable-density image according to the present invention is hereinafter referred to as the DLDS (dynamical LDS) method. According to Ulichney (R. A. Ulichney, Proceedings of the IEEE, 76 (1988) 56), the blue noise characteristic described above as a Ulichney standard is thought out originally from assumption that spaces between most adjacent dots must be concentrated in the vicinity of the principal wavelength. The principal wavelength is defined by the formula given hereunder for a gradation a standardized between 0 and 1 (that is, a=1 is black and a=0 is white):

$$\lambda(\alpha) = \sqrt{\frac{a}{\alpha}}$$

wherein a denotes an area of one dot. It has been known that an isotropic dot pattern wherein spaces between most adjacent dots are concentrated in the vicinity of the principle wavelength has the blue noise characteristic. In the present invention, an access range D of a repulsion between dots as against the above-described principal wavelength is set to an approximate principal wavelength. Specifically, the access range D is set as shown by the formula given hereunder assuming D is a repulsion access range.

$$D \approx \lambda(\alpha)$$

The above is a direct regulation about a micro quantity guaranteeing that a dot pattern appearing as a result without complicated processing, e.g., Fourier transformation, has the blue noise characteristic while maintaining low discrepancy. In addition, in the present invention, the repulsion is assumed to be an isotropic central force.

The gradation dependency of the repulsion access range more or less has a freedom of optimization. A binarized pattern having an excellent characteristic may however be obtained by employing the above-described principle wavelength may be employed for dynamical scaling and the DLDS method. This method is hereinafter called "scaling DLDS method".

Figure 42:
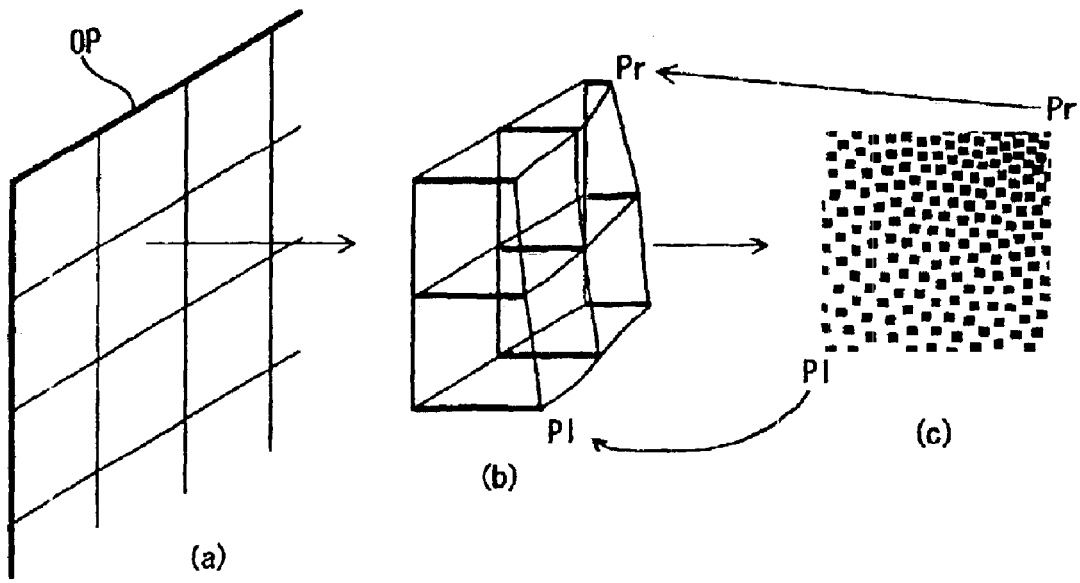
FIGS. 42A, 42B, and 42C show halftoning processing whereto the present invention may be applied appropriately.

The halftoning method whereto the above-described scaling DLDS method may be applied will be described in further details hereinafter. FIG. 42 is a schematic diagram showing halftoning processing whereto the present invention may be applied suitably. FIG. 42A shows a an original image OP which is a variable-density image. FIG. 40B shows a density gradient per block. FIG. 42C shows a dot pattern generated in relation to the density gradient. As shown in FIG. 42A, an initial dot is generated scrupulously to a density gradient in a block covering a multiplicity of pixels of the original image OP and said initial dot is optimized by the scaling DLDS method. Existence of the density gradient represented by the contour line in FIG. 42B is typically shown. In FIG. 42B, a higher side of the contour line represents a low density and a lower side of the contour line represents a high density. FIG. 42C shows a dot pattern generated in correspondence with the density gradient. In FIG. 42B and FIG. 42C, Pr and Pl correspond to each other.

According to the scaling DLDS method of the present invention, dot patterns in surrounding blocks are stored, repulsion fields created by dots are assumed to be external fields and position coordinates of dots are obtained by the repulsion relaxation method. According to the scaling DLDS method of the present invention, since joints between blocks may be made invisible essentially, defects which tend to appear between small blocks may be eliminated essentially. In the present invention, such a region containing a continuous tone change in an original image is assumed to be a basic block. A density is assigned evenly to gradations from 0 to 255 and a filling factor is specified for each gradation. Said block comprises a multiplicity of original pixels. When an initial position is generated in said block, the above-described probablistic sampling method is employed. Thus, an initial dot pattern in coordination with gradation changes depending on positions.

Subsequently, the repulsion relaxation method is applied to an initial dot pattern generated by employing the LDS method to improve the frequency characteristic of the dot pattern. At this time, the access range D of repulsion between dots is scaled as a gradation value function according to the scaling rule for the principal wavelength. In the present invention however, the repulsion access range may be changed by employing a function related to the principle wavelength according to a gradation gradient as shown by the formula given hereunder.

$$D=f(\lambda(\alpha))$$

When there is a gradation gradient equal to or less than 0.2/100 per pixel as a result of an energetic study by the present inventors, the blue noise characteristic may be obtained effectively by employing a function given by the formula given hereunder.

$$f(\lambda) = \sqrt{a}\left(\frac{\lambda}{\sqrt{a}}\right)^{\frac{4}{3}}$$

Figure 43:
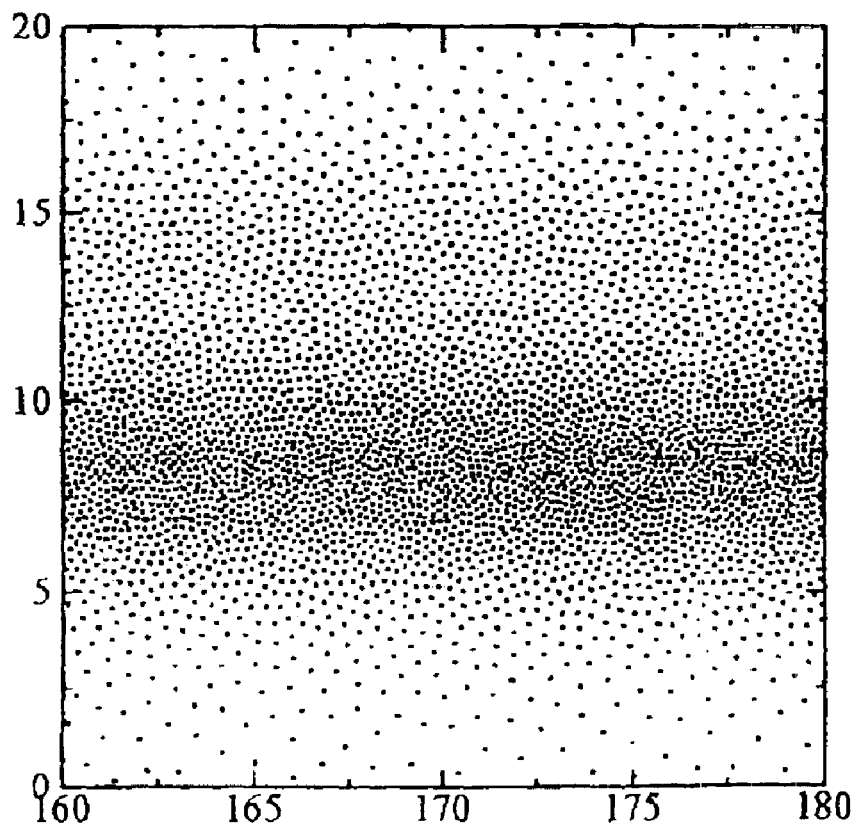
FIG. 43 shows dot pattern obtained by employing the repulsion relaxation method according to the present invention.

FIG. 43 shows a dot pattern obtained by employing the repulsion relaxation method employing the formula given above. As shown in FIG. 43, spaces between dots are scaled according to the gradation gradient by the DLDS method according to the present invention and an excellent binarized image without defects, e.g., moiré, unevenness and the like, is obtained.

Figure 44:
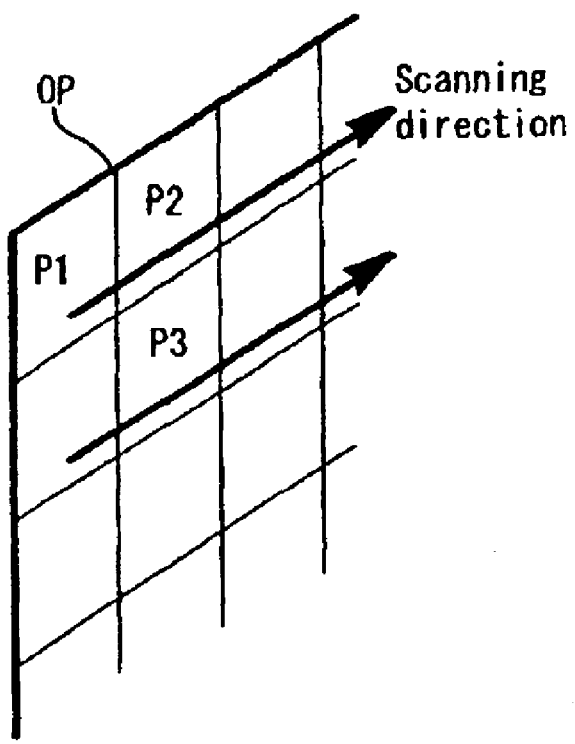
FIG. 44 shows an embodiment when division into small blocks is used in halftoning of a variable-density image according to the present invention.

Further, in the above-described scaling DLDS method, halftoning work may be carried out by generating an initial dot assuming that an entire original image as one small block. For the purpose of high-speed calculation, the original image is preferably divided into small blocks. FIG. 44 shows an embodiment employing the division into small blocks in the halftoning of a variable-density image according to the present invention. If there is no generated dot outside boundaries when all blocks shown in FIG. 44 are scanned, the above-described self-similar boundary condition may be employed to generate a dot pattern. Specifically, the repulsion relaxation method may be applied by folding back an initial position to a boundary and adopting a repulsion field formed on the boundary. As for a block already having a block wherein a dot pattern has already been generated (e.g., the left boundary of the block specified by "P3" in FIG. 44), a portion of a dot pattern in an external block (an area contacting a boundary) may be stored and then treated as a source of an external field. Thus, a joint is not generated on a boundary of blocks. In an error diffusion method, there are a variety of methods to scan small blocks in order to improve an image quality. In the method according to the present invention however, such contrivance is not necessary and simple software and hardware may be employed.

Figure 45:
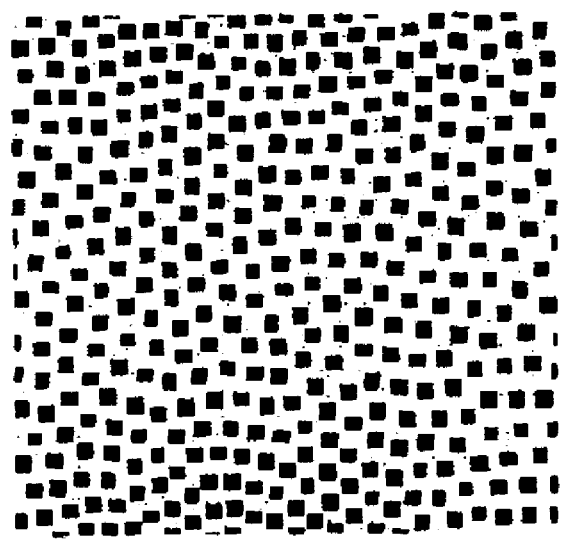
FIG. 45 shows a halftoning pattern of a variable-density image obtained according to the present invention.

FIG. 45 shows the variable-density dot pattern obtained by employing the self-similar boundary condition after division into the small blocks shown in FIG. 44 in an enlarged manner. FIG. 45 shows that it is difficult to sense boundaries although said boundaries are contained in the dot pattern. As apparent from FIG. 45, although a considerably sharp gradation ingredient is given in the lower portion of FIG. 45, spaces between dots are correctly scaled with a degree of the principal wavelength depending on gradations and so no severe optical defect occurs. As shown in FIG. 45, according to the present invention, a dot pattern generation in accordance with surrounding dot patterns is enabled in each block and an excellent binarized image without any defect, e.g., moiré or the like, may be obtained.

Figure 5:
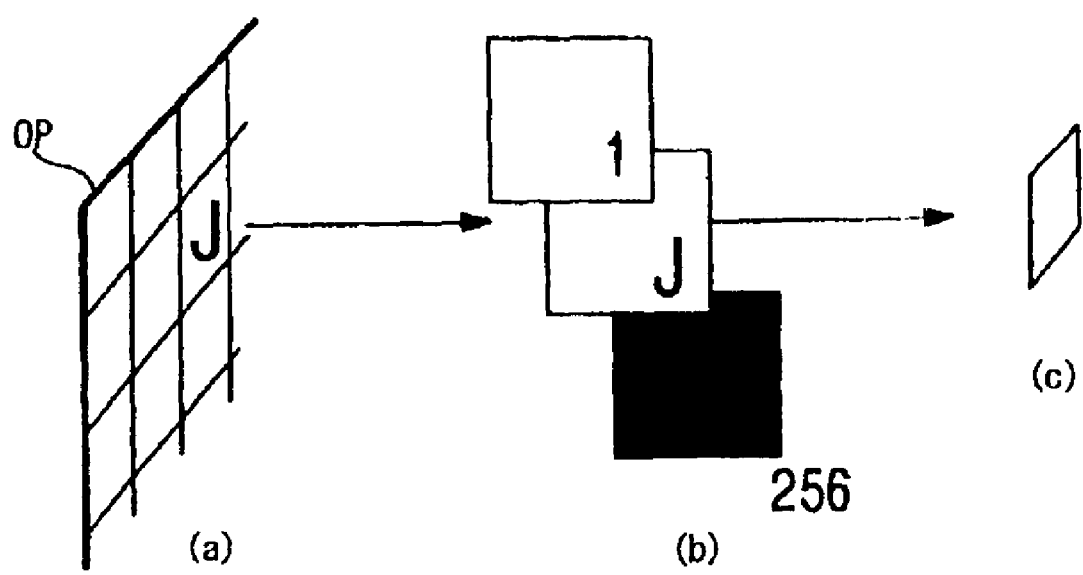
FIG. 5 depicts a halftoning process for a conventional one-to-multiple mask method.

The present inventors further employed the above-described scaling DLDS method to study generation of a dot pattern by a one-to-multiple mask method. A case wherein the present invention is applied to the one-to-multiple mask method shown in FIG. 5 will be described hereinafter. That is to say, the scaling DLDS method is applied when creating dot patterns having a variety of gradations by the one-to-multiple mask method. In this case, a dot pattern of each gradation does not satisfy the Mitsa-Parker conditions in a strict sense. As a result of a study by the present inventors, it has been found out that the scaling DLDS method is sufficiently applicable as the one-to-multiple blue mask method. From the characteristic of the LDS employed in the present invention, dot patterns having different gradations are not independent and patterns having adjacent gradations however correlate to each other. This correlation is a required condition for a preferable halftoning of an original image when a gradation is continuously changes and the scaling DLDS method according to the present invention is sufficiently applicable to the one-to-multiple blue mask method.

Figure 46:
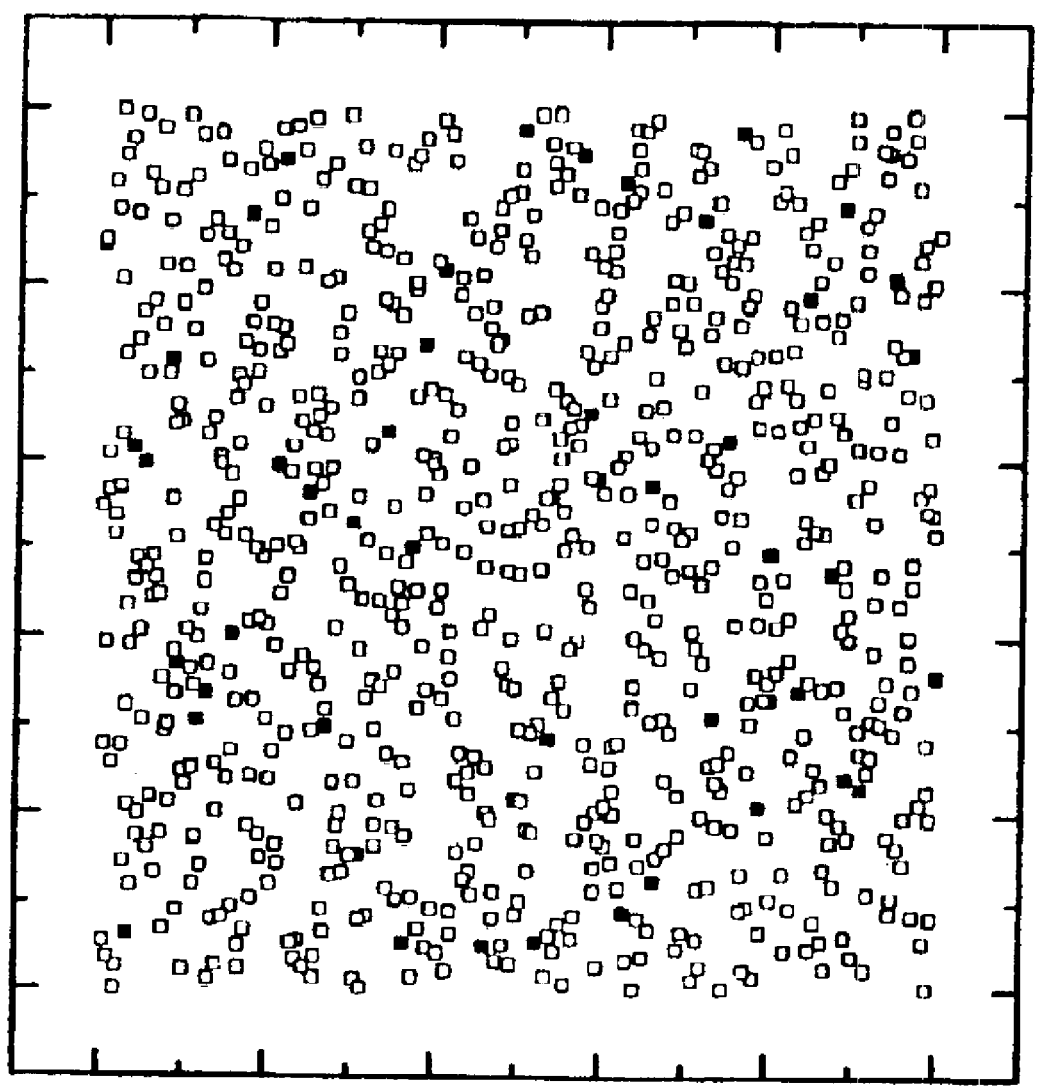
FIG. 46 shows correlation of the LDS between different gradations of 0.32 and 0.30.

FIG. 46 is a view showing a correlation of the LDS between different gradations. In FIG. 46, gradations 0.32 and 0.30 are compared. In addition, a dot added to a dot having a gradation of 0.30 when a gradation is specified to 0.32 is denoted by a filled-in square and the dot having the gradation of 0.30 is denoted by an empty square. In the figure, the dot which is represented by an empty square is overwritten by the dot represented by the filled-in square and a black portion is therefore the dot added at the gradation of 0.32. Such correlation between different gradations is preferable to remove a pseudo image accompanied with a gradation change.

Figure 47:
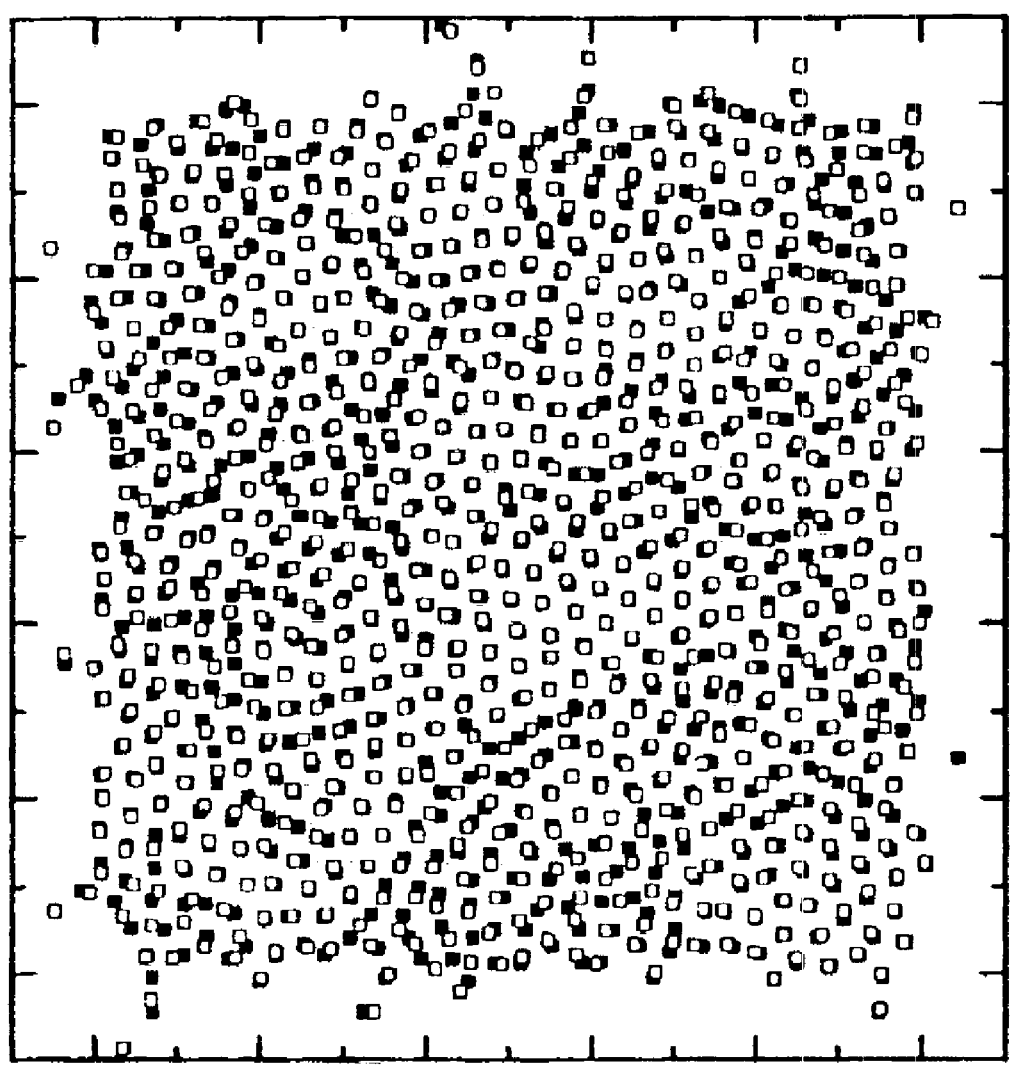
FIG. 47 shows a dot pattern relaxed by applying the repulsion relaxation method to the dot pattern shown in FIG. 46.

FIG. 47 shows a dot pattern relaxed by applying the repulsion relaxation method for the dot pattern shown in FIG. 46. Re-disposition of dots by the repulsion relaxation method generates a pattern having well-uniformed spaces between most adjacent dots specific to a dot pattern having a blue noise characteristic. In FIG. 47, a difference between two different gradations is not as clear as that of initial disposition. It can be known however that most dots are overlapping between the dark, filled-in shapes and the light, empty shapes in spite of as relatively large gradation difference as 0.02 (since a total number of gradations is specified to 256 gradations in the specific embodiment described in the present invention, the gradation difference of 0.02 corresponds to differences of about five gradations). A pattern generated by the scaling DLDS method therefore shows an extremely excellent characteristic as a one-to-multiple blue threshold value mask. When said one-to-multiple threshold value mask is employed as a threshold value mask, a cyclic environmental condition is preferably imposed in a process of mitigating dots to prevent joints on boundaries.

Further, the present invention may also be applied to the conventional one-to-one blue mask generation method to generate a blue noise dot pattern to be a starting point. In the one-to-one threshold value mask generation method disclosed in the above-described thesis of Mitsa-Parker, et al. and U.S. Pat. No. 5,543,941, a dot pattern having a blue noise characteristic is employed as a starting point at a halftone. Since a dot pattern generated by the scaling DLDS method according to the present invention has an extremely superior blue noise characteristic, it has been confirmed that said dot pattern may be employed for the above-described purpose.

Figure 6:
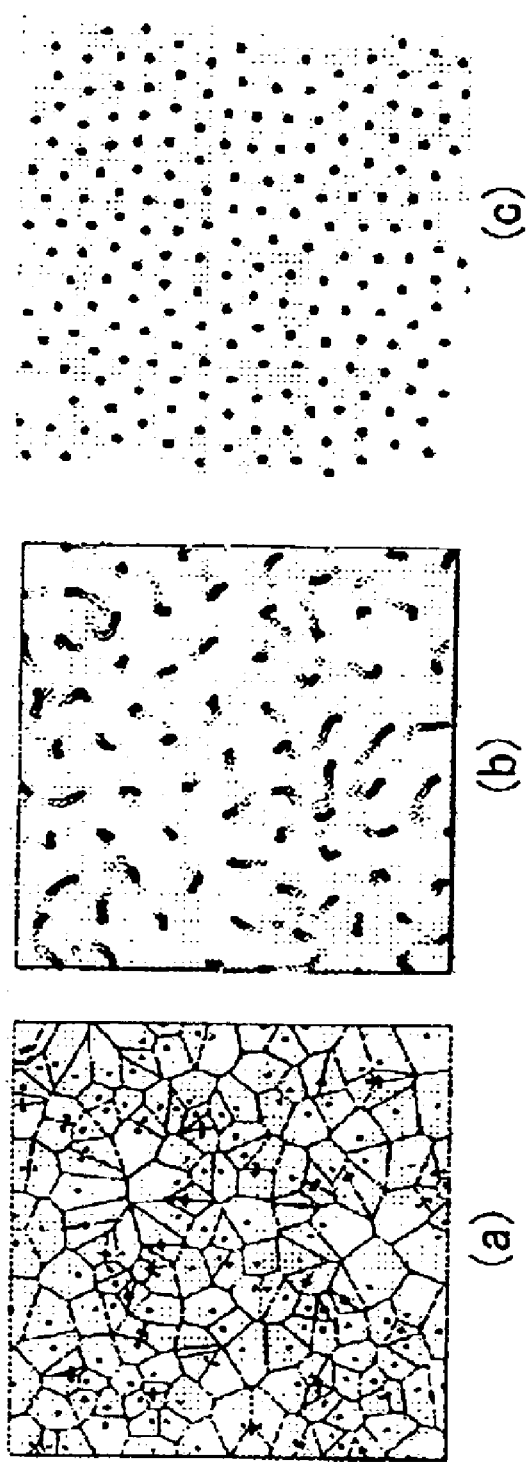
FIG. 6 shows a halftoning process for a variable density image employing a conventional dither method.

Further, the present inventors applied the scaling DLDS method according to the present invention to generation of a dot pattern having a blue noise characteristic based on the Voronoi division. When the probablistic sampling method and the scaling DLDS method according to the present invention are applied to create a dot pattern, an interaction force on a right side of a differential expression of an equation of motion need be obtained. This calculation must be performed on all dot pairs in a calculation region. Accordingly, in the present invention, a calculation speed may considerably be increased by contriving a data structure by, e.g., employing so-called a bucket search method. Employment of the Voronoi division is one of preferable methods to specify a dot pair. Specifically, the Voronoi division shown in FIG. 6(a) is performed in a specific time step and, with regard to repulsion acting to a specific dot, only repulsion existing in a Voronoi polygon adjacent to a Voronoi polygon whereto said dot belongs. It has been confirmed that this approximation becomes a sufficiently realistic approximation when a continuous-tone image is reproduced.

The present inventors further studied application of the scaling DLDS method according to the present invention to a method to create an even dot pattern based on a Hiller's relaxation method. It has been found out that unevenness which has hitherto been thought as inevitable may be prevented by performing initial position generation according to the method of Hiller, et al. by employing the scaling DLDS method according to the present invention.

[5. Section E]

An optical member including a discrete pattern generated using the LDS method and the repulsive force relaxation method, a light guide plate, a side light unit, a liquid crystal display device and a discrete pattern generation system.

Figure 48:
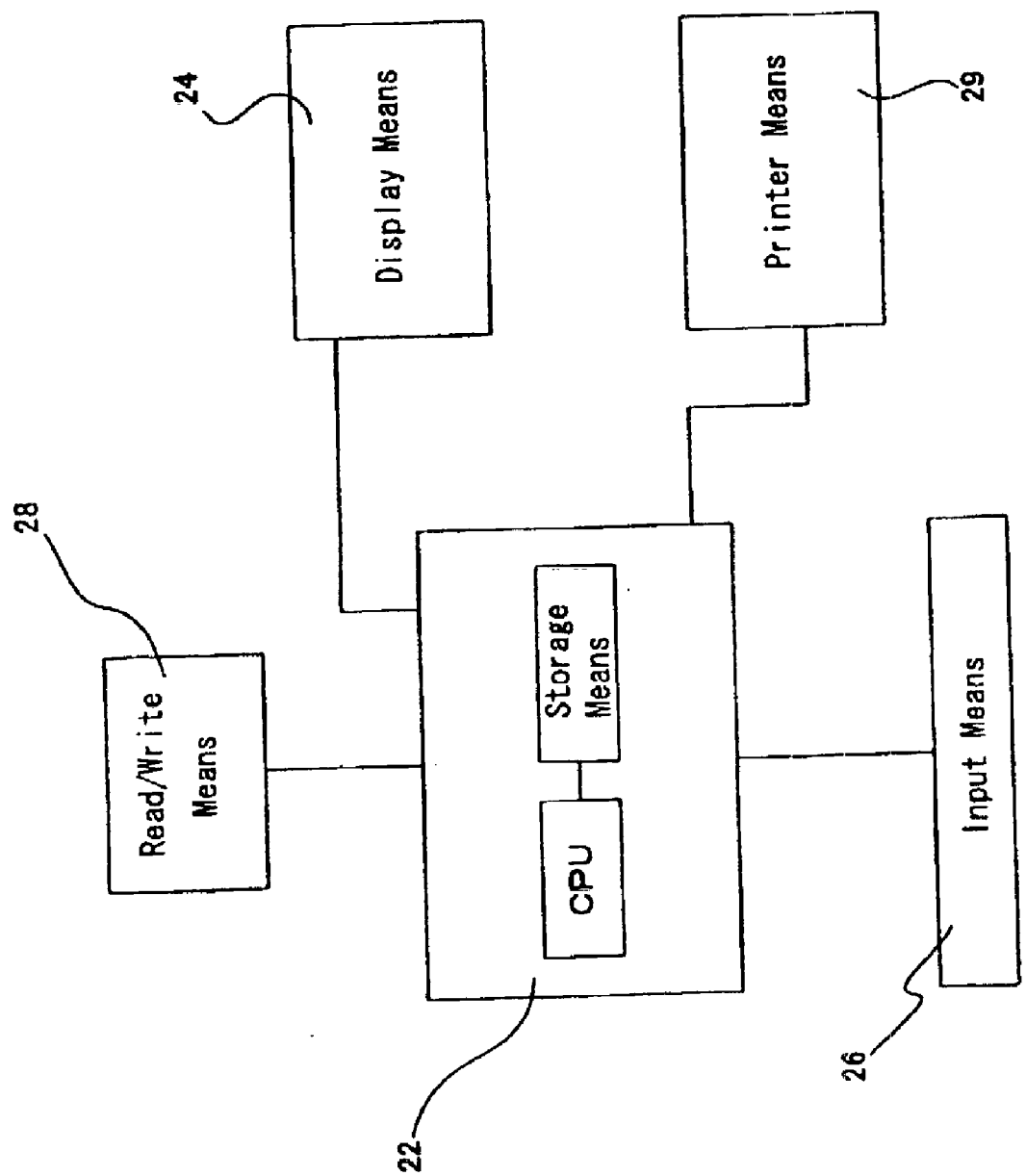
FIG. 48 is a diagram showing a computer system used for the present invention.

A discrete pattern that is generated using the discrete pattern generation method of the invention can be formed on a plane or a solid body using various methods, and an object including the discrete pattern of the invention can be provided. FIG. 48 is a diagram showing a computer system that is employed to generate the discrete pattern for this invention.

The computer system in FIG. 48 comprises: a computer 22, which includes a central processing unit (CPU), for executing the above described discrete pattern generation method, and storage means, for storing data, such as various parameters and position coordinates of dots, that are required for the generation of a discrete pattern; display means 24, for providing a necessary display; input medium 26, for entering various parameters; and reading/writing means 28, for reading, from the storage medium, a program for executing the discrete pattern generation method of the invention, and for writing, in a predetermined format, digital data corresponding to the discrete pattern.

When a discrete pattern generated by the discrete pattern generation method of the invention is employed to manufacture an object including this discrete pattern, first, the discrete pattern obtained by the computer 22 is output as hard copy by printer means 29, or is output as digital data to the reading/writing means 28. When the discrete pattern is to be output as hard copy, a recording sheet on which the discrete pattern of the invention is recorded is defined as an object including the discrete pattern. For example, the discrete pattern obtained by the computer 22 can be printed on a pattern receiving element, such as paper or a plastic sheet, by the printer means 29, such as an ink-jet printer or an electrophotographic color printer.

Printer means that employs a visible light laser can also be used.

The printer means using the visible light laser emits a laser beam to output the digital data directly to photosensitive film that is used as a discrete pattern receiving element. After the data is developed and fixed to the film, the film can be used as an object, as an optical member, such as a photomask. This photomask can be used for microphotolithography using a photoresist, and the discrete pattern of the invention can be provided for the photosensitive material. Furthermore, in this invention, a photosensitive resin can be used as the pattern receiving element, and the discrete pattern generation system of the invention can emit a visible laser to harden the photosensitive resin layer, thereby directly producing an object that includes a discrete pattern of the invention.

Figure 49:
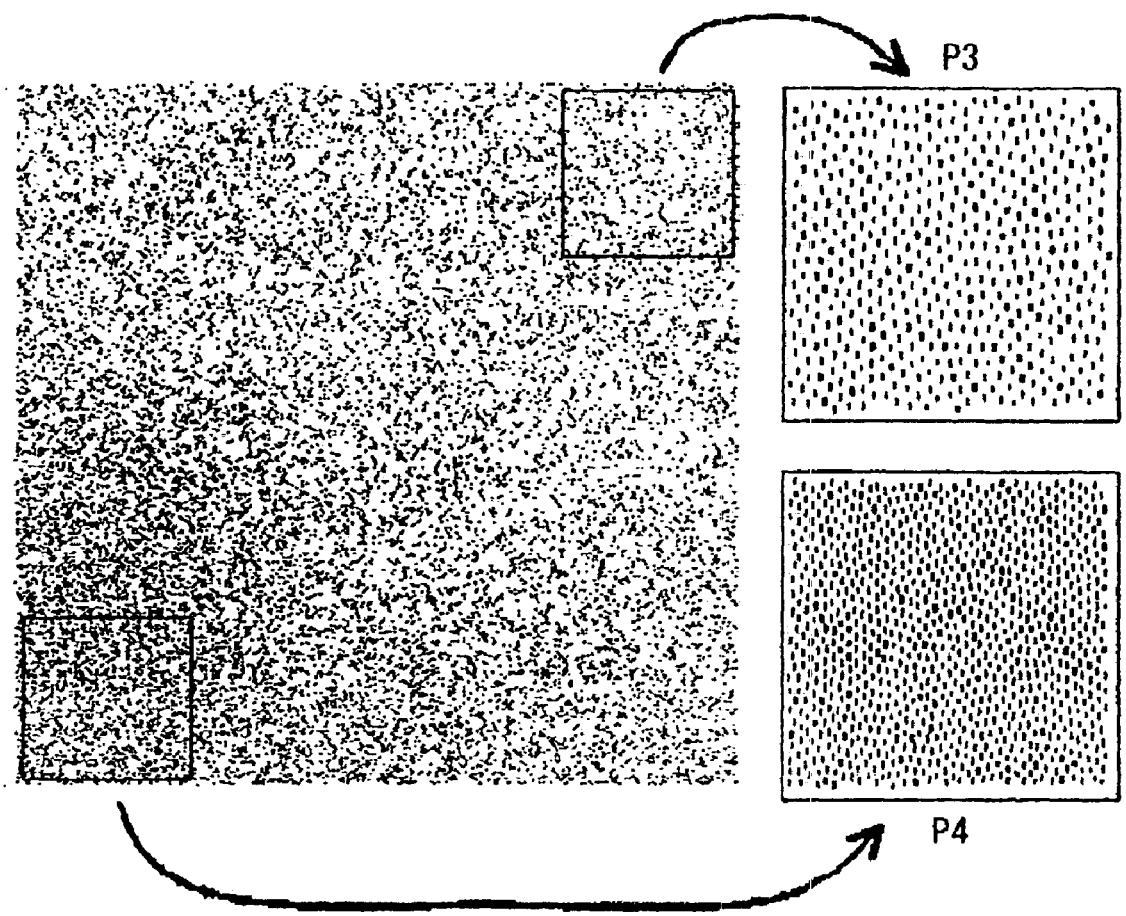
FIG. 49 is a diagram showing an example optical member according to the invention.

FIG. 49 is a plan view of a photomask used as an example optical member and including a discrete pattern of the invention. The photomask is an optical member, the light intensity for which can be modulated by adding a photosensitive material, such as halogen silver, to an optical sheet, which is a compound sheet that is composed of a gelatin sheet or polyethylene terephthalate, or that includes an appropriate optical characteristic. A three-dimensional structure can be produced as a photomask by using an appropriate microlithography method for a photosensitive material, such as a positive photoresist or a negative photoresist.

Figure 50:
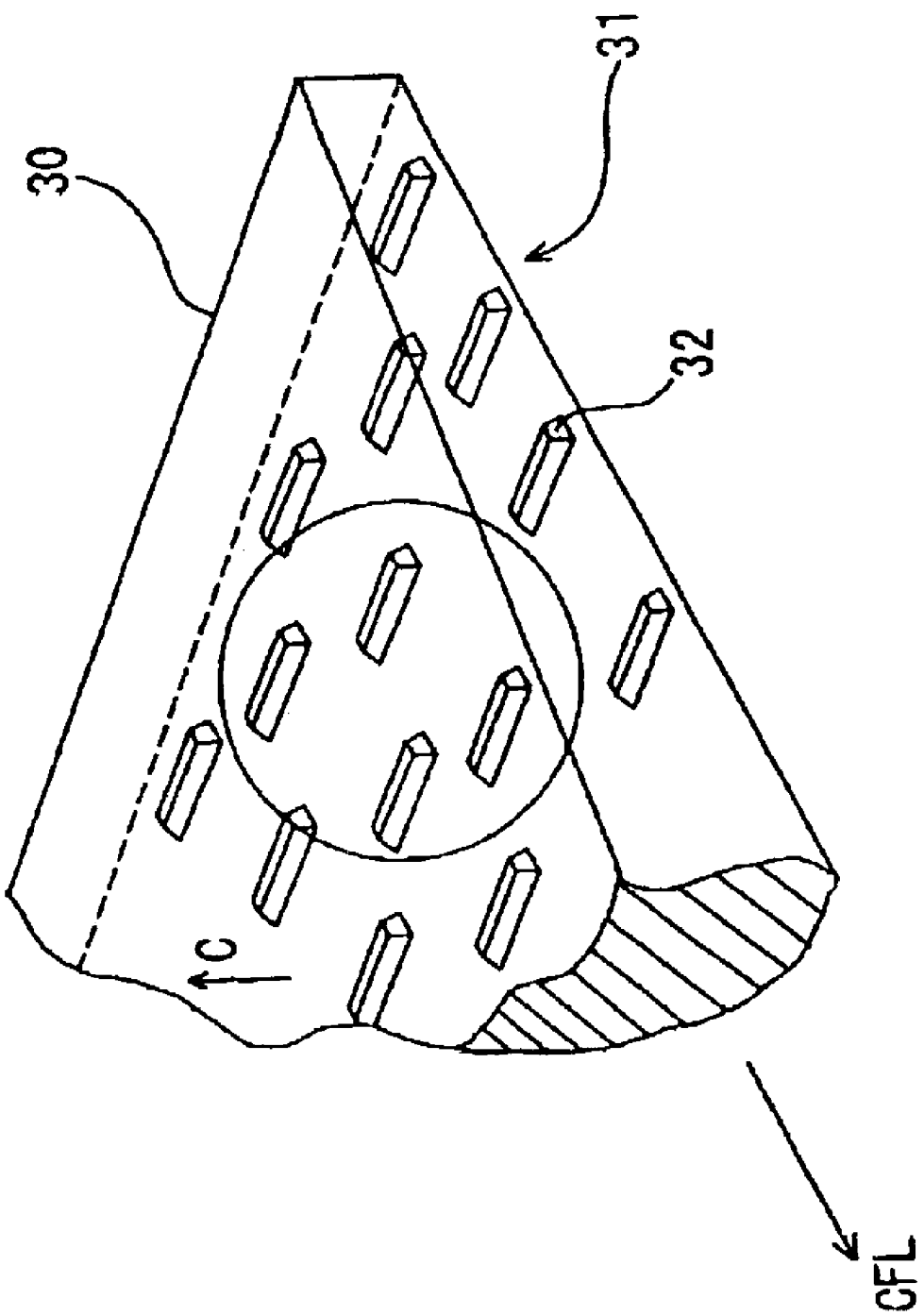
FIG. 50 is a diagram showing another example optical member according to the present invention.

FIG. 50 is a diagram showing a light guide plate 30 whereon a discrete pattern of the invention is formed using the microphotolithography method. Light emitted by a fluorescent tube CFL (not shown) is scattered by the light guide plate 30 in FIG. 50 in the direction indicated by an arrow C. A discrete pattern 31 for scattering light is formed on the side of the light guide plate 30, opposite the locations whereat the light scattered in the direction indicated by the arrow C is discharged. The discrete pattern 31 is formed using the discrete pattern generation method of the invention and microlithography, for which a photomask is employed.

In the example in FIG. 50, the discrete pattern 31 has a quadrangular pyramid shape, and dots 32 are arranged as recessed portions in the light guide plate 30. The shape and the size of a dot used for the invention are not especially limited, and can be selected in accordance with a specific application. For example, at least one two-dimensional or three-dimensional shape can be selected from a group including a polygon, a circle, a square, a rectangle, an ellipse, a circular conic and a polyhedron. Furthermore, of these shapes, multiple can be selected, and the light scattering can be adjusted by changing the location of the pattern relative to the fluorescent tube CFL.

Figure 51:
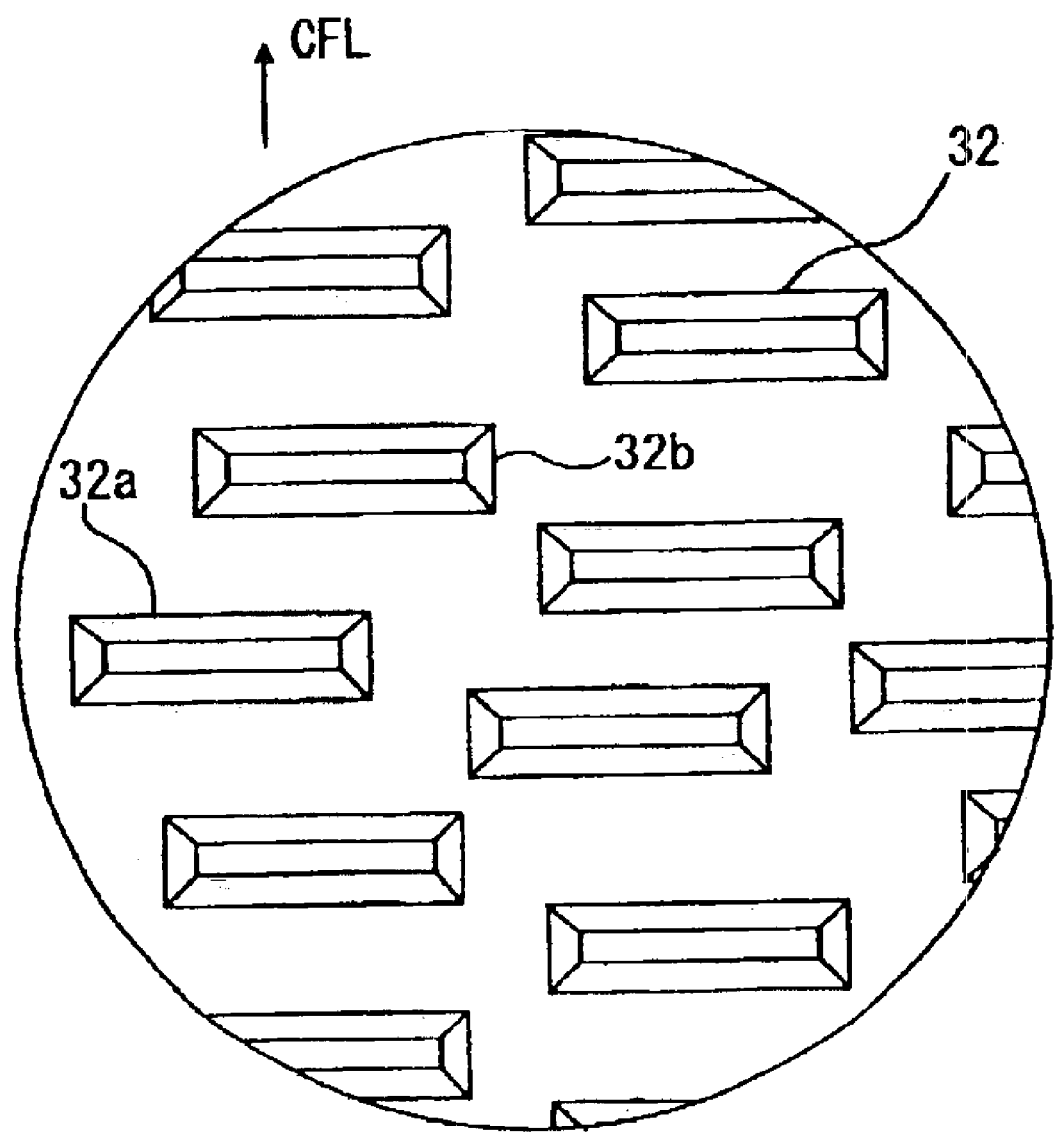
FIG. 51 is a detailed enlarged diagram showing dots of a discrete pattern in FIG. 50.

FIG. 51 is a detailed, enlarged top view of the dots 32 in FIG. 50. Long edges 32a of the dots 32 in FIG. 50 are directed toward the fluorescent tube CFL, and short edges 32b are situated perpendicular to the fluorescent tube CFL. These dots 32 are arranged across the entire surface of the light guide plate 30 to scatter light. Further, in order to improve the light scattering, especially at the four corners of the light guide plate 30, a filling rate distribution for the dots 32 is provided for the entire light guide plate 30 in FIG. 51 using the probabilistic sampling employed for this invention. For example, in this distribution, the filling rate is low in the center, and increases until it is equal to or higher than 50% toward the four corners, specifically, in FIG. 51, to 67%.

FIG. 52A is a more detailed top view of a dot 32 in FIG. 51, and FIG. 52B is a cross-sectional view taken along line D—D in FIG. 52A. In the example in FIG. 52, the dot 32 is given a three-dimensional shape, i.e., a quadrangular pyramid shape, by forming, in the light guide plate 30, a recessed portion, the depth d of which is 8 $\mu$m. Furthermore, in FIG. 52, the long edge lgt of the dot 32 is 100 $\mu$m, and the short edge sht is 30 $\mu$m. The inclination b of the dot 32, which is a quadrangular pyramid, can be set as needed in correlation with the depth d, in order to provide the necessary light scattering.

Figure 53:
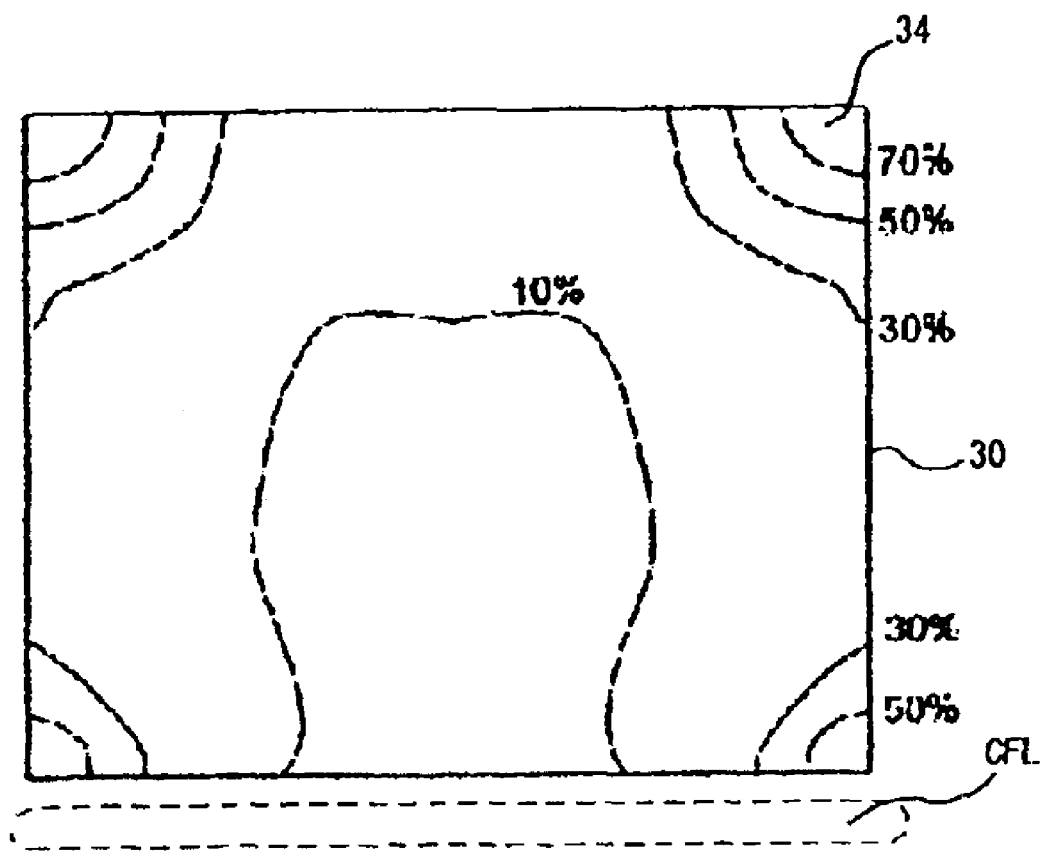
FIG. 53 is a diagram showing a filling rate distribution according to this embodiment of the invention.

FIG. 53 is a diagram showing the contour lines for the filling rate distribution of the dots 32 for the entire light guide plate 30. In FIG. 53, the filling rate in the center of the light guide plate 30 is about 10%, and is increased toward the four corners of the light guide plate 30 to enhance the light scattering effects. Especially at corners 34, far from a fluorescent tube CFL indicated by a broken line, the filling rate exceeds 70%. According to the discrete pattern generation method of the invention, since the LDS method and the repulsive force relaxation method are employed to generate a discrete pattern and the filling rate distribution is generated using the probabilistic sampling, a satisfactory light guide plate wherein the boundary can not be identified visually, can be provided, even by using the above filling rate distribution.

Figure 54:
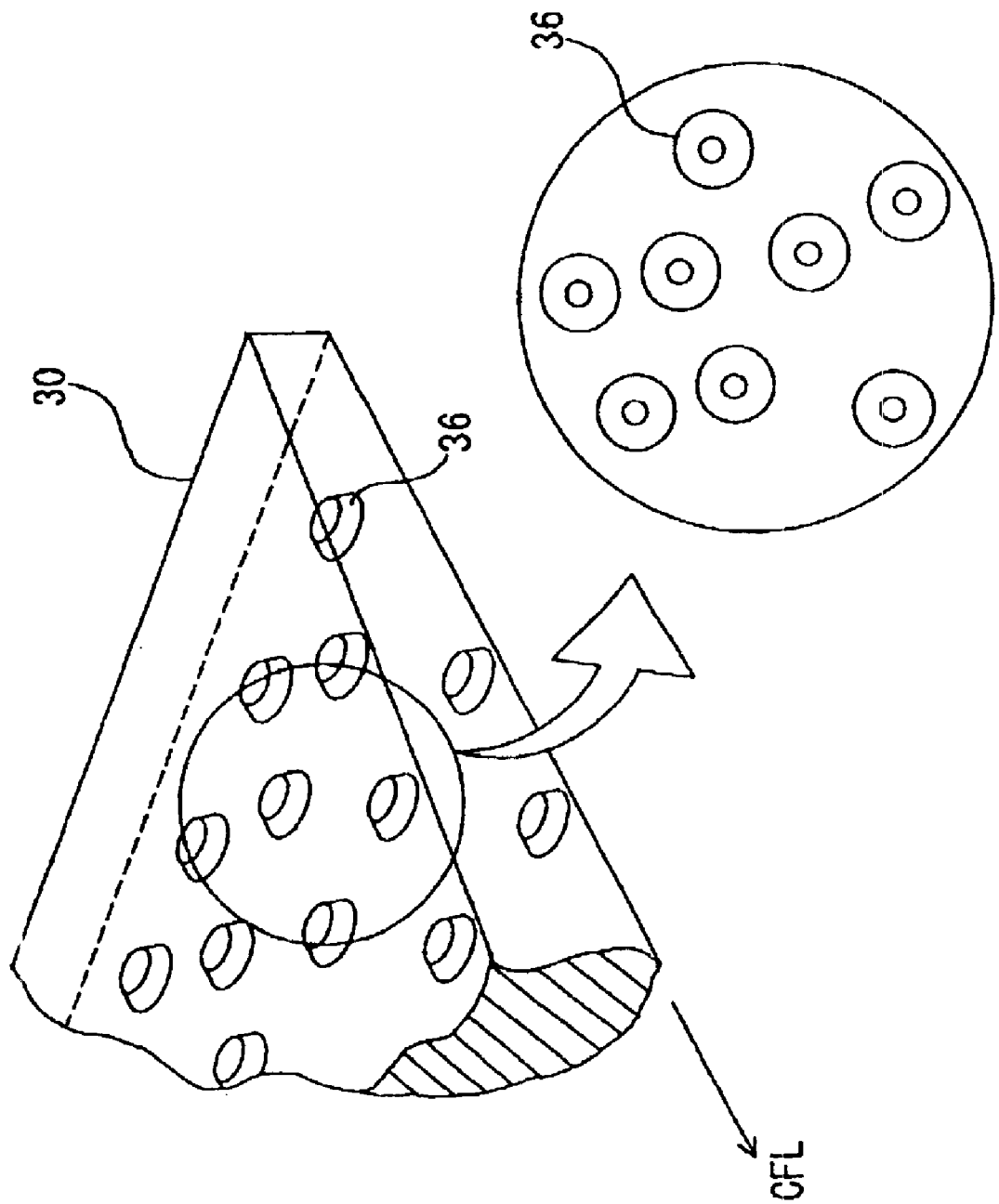
FIG. 54 is a diagram showing another example dot shape for the invention.

FIG. 54 is a diagram showing another example light guide plate 30 that is employed as an optical member for this invention. In FIG. 54, a discrete pattern 31 for this invention is formed of multiple dots 36 on the side of the light guide plate 30 opposite side where light is emitted. In the example in FIG. 54, the dots 36 have a conical shape, a diameter of 100 $\mu$m and a height of 15 $\mu$m. Since each dot has a conical shape, a dot 36 does not exhibit any particular directivity relative to the fluorescent tube CFL.

Figure 55:
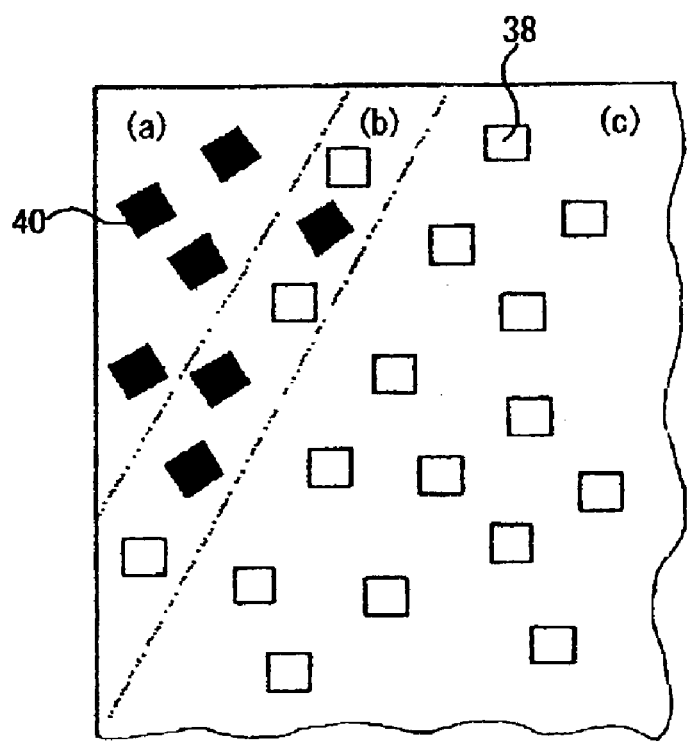
FIG. 55 is a diagram showing another arrangement of dots for this invention.

FIG. 55 is a diagram showing an additional example of a light guide plate 30 for this invention. In FIG. 55, a discrete pattern including dots 38 and 40, which are arranged differently relative to the fluorescent tube CFL, is formed on the light guide plate 30, and is divided into areas (a), (b) and (c). The dots 38 are quadrangular pyramids that are recessed in the light guide plate 30, and have a long edge of 100 $\mu$m and a short edge of 70 $\mu$m, which is perpendicular to the fluorescent tube CFL. The dots 40, which have the same shape as the dots 38, are arranged so they are tilted at their centers relative to the fluorescent tube CFL. The light guide plate 30 in FIG. 55 can be generated when the center coordinates of multiple dots are provided by the discrete pattern generation method of the invention, following which the dots are rotated. According to the structure in the example in FIG. 55, the area (b) wherein dots 38 and 40 coexist is formed so that the light scattering at the corners can be adjusted. In FIG. 55, only the locations of the dots relative to the fluorescent tube CFL need be adjusted to locally change the distribution of light emitted by the light guide plate 30.

Figure 56:
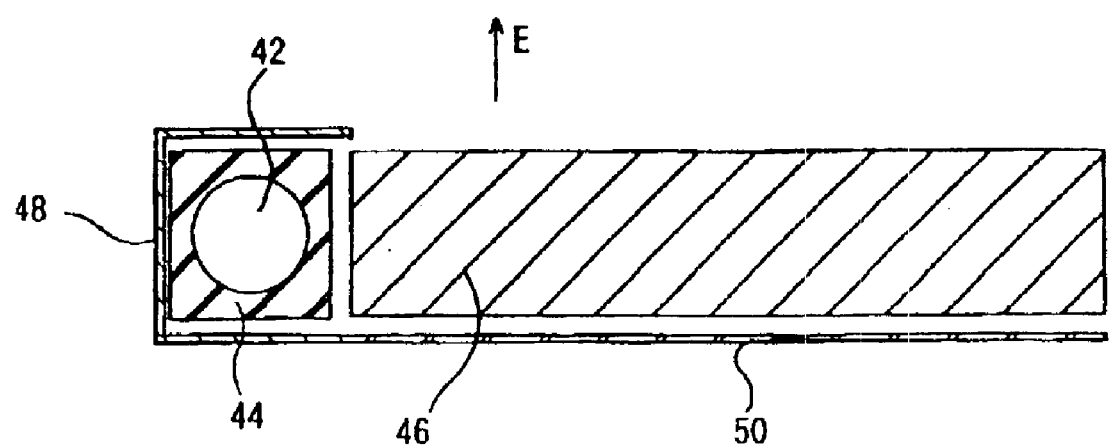
FIG. 56 is a cross-sectional view of a side light device according to the invention.

FIG. 56 is a partial cross-sectional view of a side light device including the light guide plate 30 of this invention. The side light device of this invention can be used, for example, as a backlight unit for a light-transmitting liquid crystal display device. The backlight unit in FIG. 56 further includes optical members, such as a diffusion sheet and a prism sheet; however, these components, which for this invention are not essential, are for convenience sake not shown nor used for the explanation. As is shown in FIG. 56, the side light device of the invention comprises: a light source 42; a lamp socket 44 for holding the light source 42; a light guide plate 46, on which the discrete pattern of the invention is formed; and a reflector 48, for covering the light source 42 and for efficiently guiding light emitted by the light source 42 to the light guide plate 46. The light source 42 can be a fluorescent tube CFL.

A reflection sheet 50, which is formed of a material, such as silver, having high reflectivity, is located under the light guide plate 46 in order to improve the efficiency with which the light from the light source 42 is reflected in the direction indicated by an arrow E. If the reflection sheet 50 used for the side light device in FIG. 56 is closely attached to the light guide plate 46, Newton rings would be formed. Therefore, when this side light device is provided as a backlight unit, a case is provided for preventing the deterioration of the display quality that is caused not only by a moire pattern but also by Newton rings.

Especially recently, to increase the reflection efficiency of the backlight unit in the light-transmitting liquid crystal display device, the reflection sheet 50 is so designed that a metal, such as silver, is attached to a polyethylene terephthalate sheet, for example, by sputtering. If the reflection sheet 50, which has high reflectivity, is closely attached to the light guide plate 46, as is described above, stripes, such as Newton rings, are observed that are deflected by the reflection sheet 50, and the display quality of the light-transmitting liquid crystal display device is considerably degraded. An effective means by which to suppress these interference stripes, is to provide a gap of about 20 $\mu$m between the reflection sheet 50 and the light guide plate 46.

Figure 57:
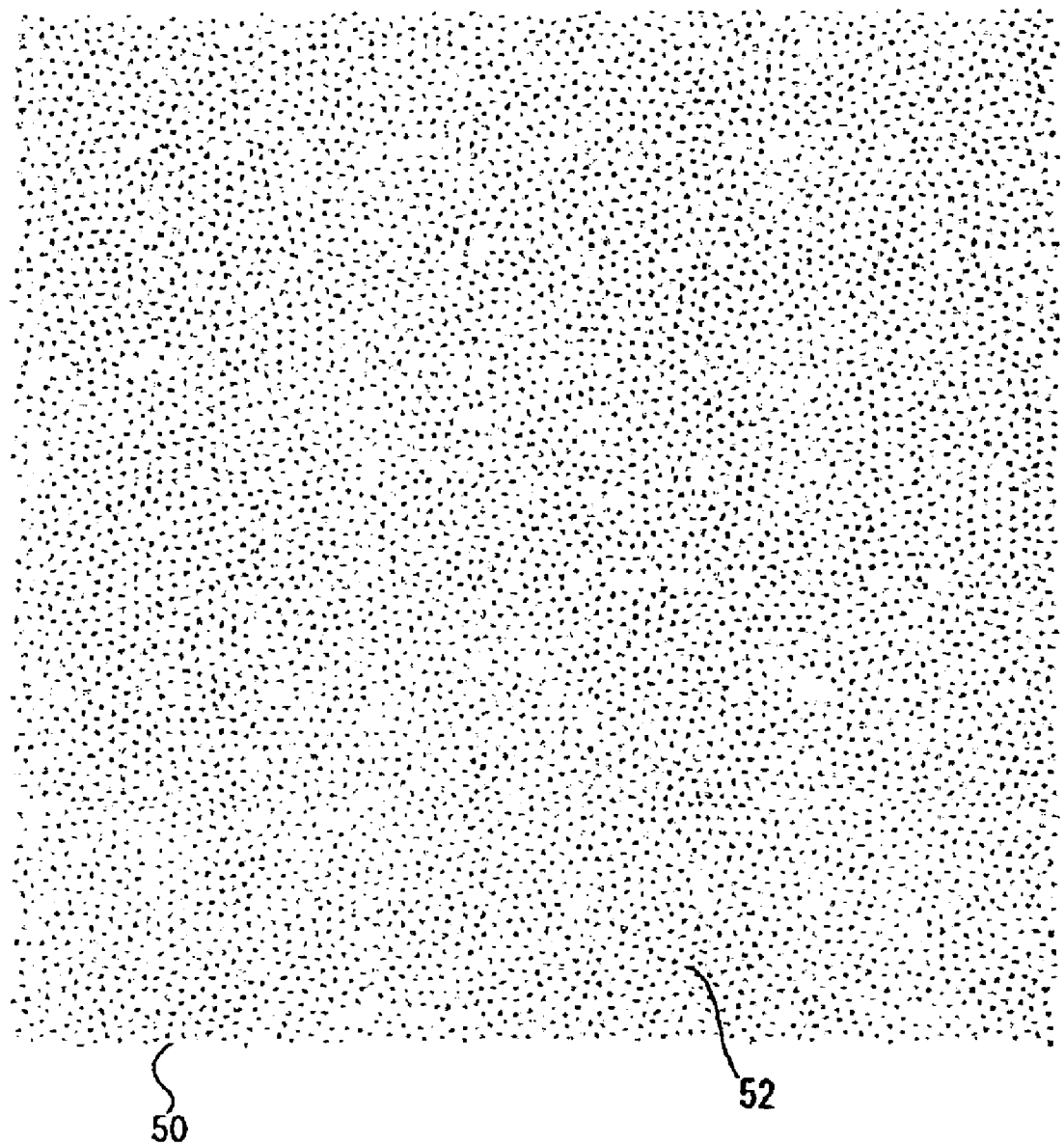
FIG. 57 is a diagram showing a reflection sheet on which a discrete pattern for the invention is formed.

FIG. 57 is a top view of the reflection sheet 50 in FIG. 56. As is shown in FIG. 57, raised and recessed portions, including, for this invention, a discrete pattern of dots 52 are formed on the reflection sheet 50. The dots 52 constituting the discrete pattern formed on the reflection sheet 50 are arranged using screen printing for which UV hardening ink is employed, and a low optical density is set in order to prevent the optical characteristic from being reduced more than is necessary. In the example in FIG. 57, a dot 52 of the discrete pattern has a diameter of approximately 100 μm and a height of 15 μm.

Figure 58:
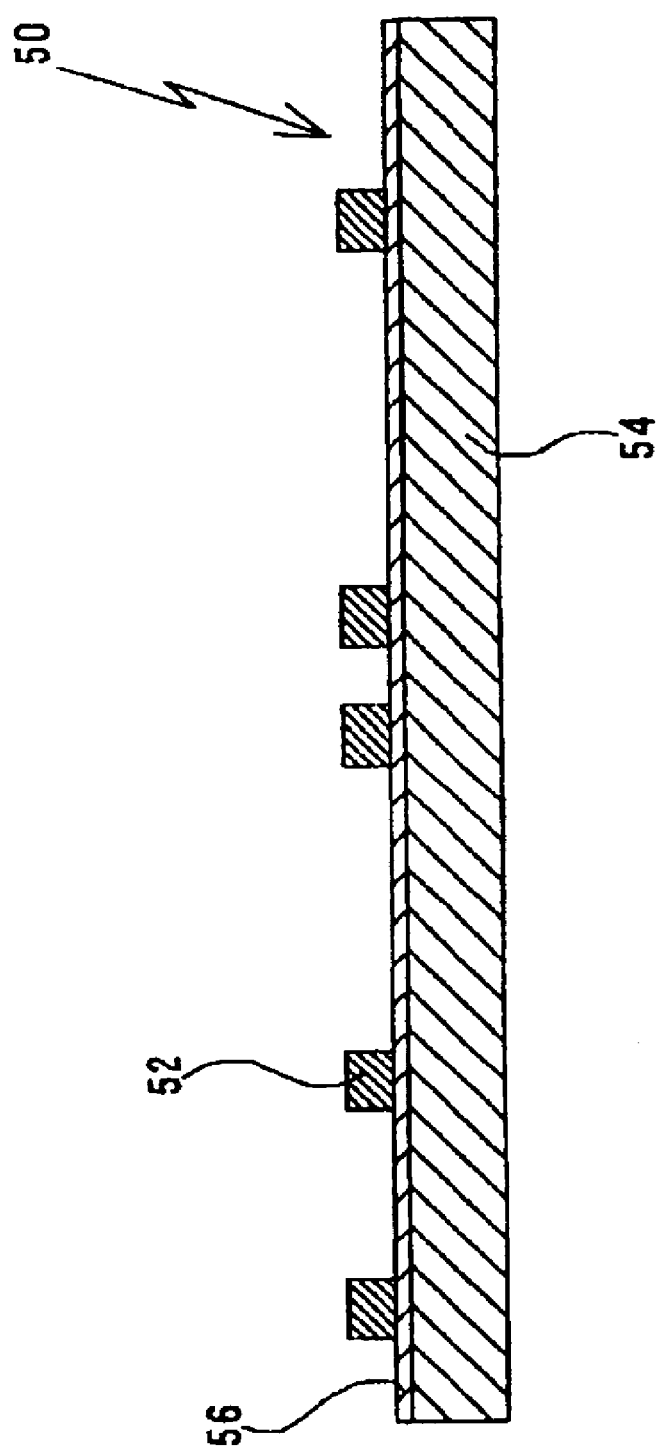
FIG. 58 is an enlarged cross-sectional view of the reflection sheet in FIG. 39.

FIG. 58 is a schematic cross-sectional view of the reflection sheet 50, including the discrete pattern generated by this invention. As is shown in FIG. 58, the reflection sheet 50 is composed of a silver reflection layer 56, which is deposited by sputtering on a base member 54 composed of polyethylene terephthalate, for example, and a discrete pattern that consists of dots 52 that are generated on the reflection layer 56 using the method of the invention. Since a light guide plate (not shown) contacts the reflection sheet 50 through the dots 52, an inappropriate contact or the near approach of the reflection sheet 50 and the light guide plate can be prevented, and the occurrence of strips, such as Newton rings, reduced.

When the filling rate of the dots 52 for the discrete pattern is increased until it is too high, the reflection efficiency is reduced, and it is preferable that the filling rate be equal to or less than about 10%. In the examples in FIGS. 57 and 58, the filling rate is uniformly 2.5% for the entire reflection sheet 50.

Since the discrete pattern generated for this invention fully satisfies the uniformity and the randomness, the overlapping of dots can not be visually identified or is regarded as uneven dots. Further, since the dots are formed of resin deposited by screen printing, there is little chance that the light guide plate, which is composed of an acrylic resin, will be damaged.

Figure 59:
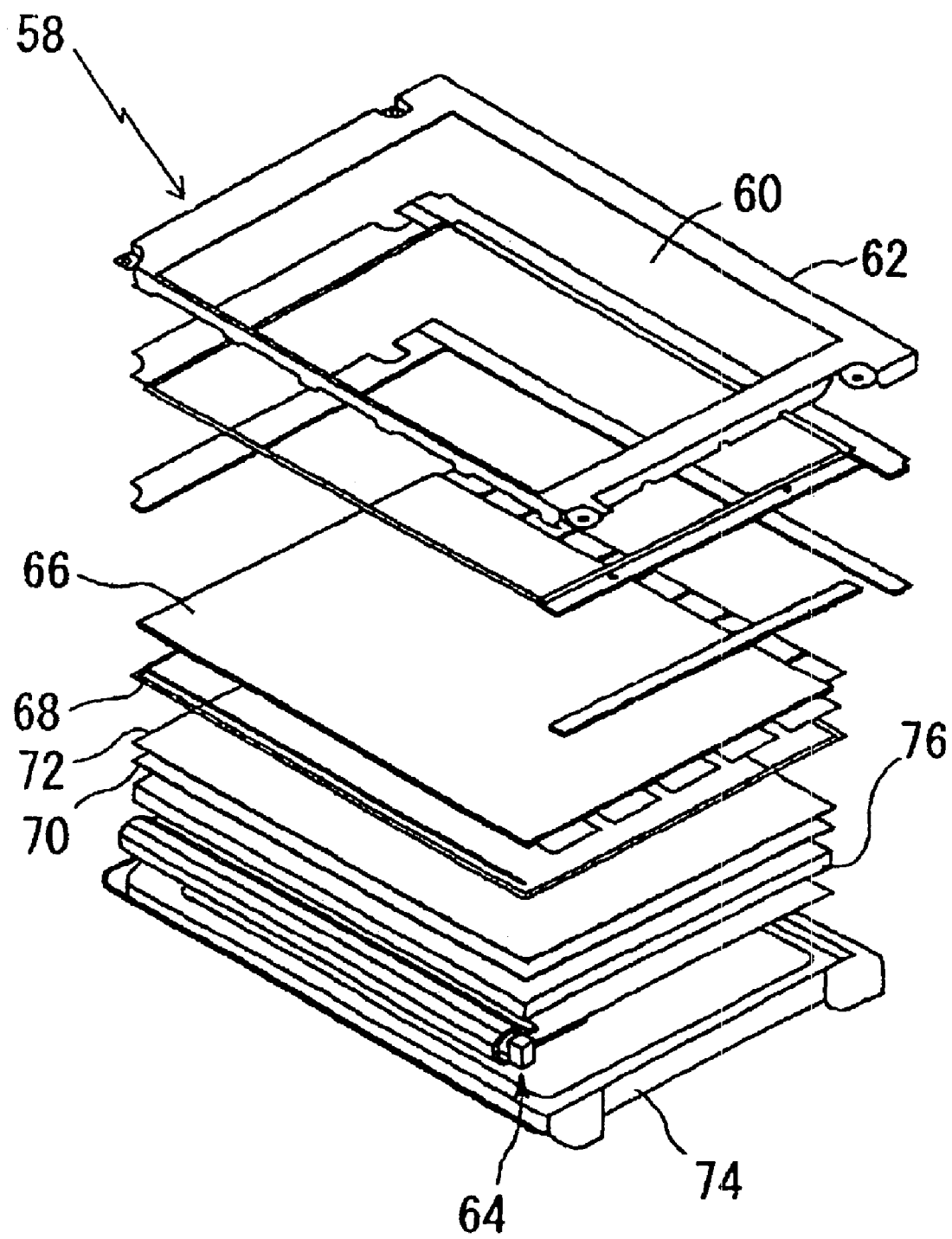
FIG. 59 is an exploded perspective view of a light-transmitting liquid crystal display device according to the invention.

FIG. 59 is an exploded perspective view of a light-transmitting liquid crystal display device employing a light guide plate on which the discrete pattern of the invention is formed. In FIG. 59, a light-transmitting liquid crystal display device 58 comprises: an upper frame 62, for providing a display window 60 for defining an effective screen for the light-transmitting liquid crystal display device 58; a backlight unit 64, using the side light device of the invention; and a liquid crystal display panel 66, a spacer 68, a diffusion sheet 70, and a prism sheet 72, all of which are located between the upper frame 62 and the backlight unit 64.

The backlight unit 64 is mounted on a lower case 74, and together with the upper frame 62 is supported so as to constitute the light-transmitting liquid crystal display device 58. The backlight unit 64 of the light-transmitting liquid crystal display device 58 in FIG. 59 includes a light guide plate 76 generated in accordance with the invention, that can efficiently project, toward the liquid crystal display panel 66, light emitted by the fluorescent tube CFL, and that can provide a satisfactory display, without causing either a luminance change at the four corners or a moire pattern.

Figure 60:
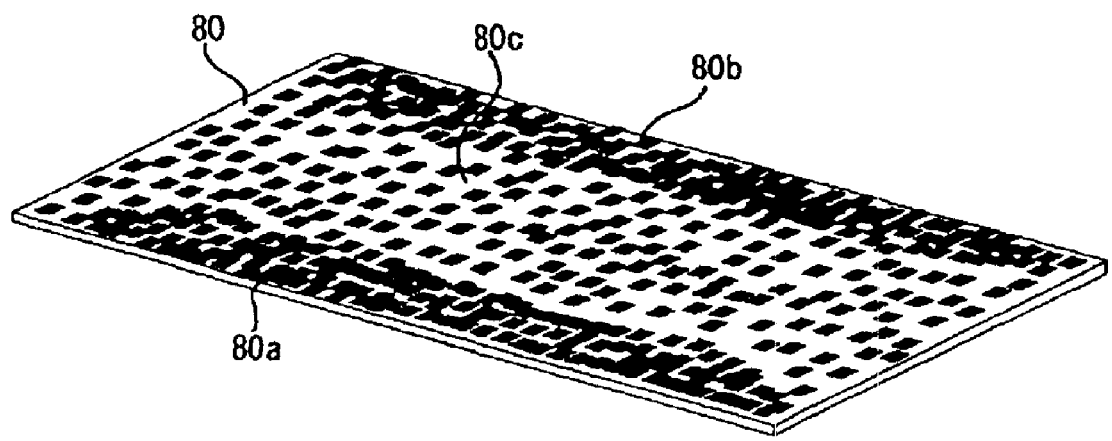
FIG. 60 is a perspective view of a shield sheet wherein a discrete patter is formed according to the present invention.

FIG. 60 shows a shield sheet according to still another embodiment of the present invention. Such shield sheet is employed for a liquid crystal display device to change a transmittivity of a scattering panel for a purpose of improving evenness of a brightness of the liquid crystal display device or other purpose. For example, a structure so-called an edge light type frequently causes a variable-density pattern called "bright line" at an edge of a lamp. This pattern may be mostly erased by locally lowering a transmittivity on the bright line portion. Such effect may be added to the shield sheet by printing white ink resolved by UV curable resin on the scattering panel constituting the liquid crystal display device or a transparent film to form a dot pattern. A specific characteristic of such type of a dot pattern is that a filling factor gradient thereof is large. The filling factor gradient of a stamper pattern of the optical waveguide described in details above in the preferred embodiment is about 0.4% per dot diameter at most. In screening printing however, since gradations need be added to a width of a few millimeters with dots, the required filling factor gradient is few times to ten time as large as the above-described filling factor gradient. Accordingly, the automatic dot generation and deletion according to the present invention may be applied specially effectively.

A shield sheet 80 formed according to the present invention shown in FIG. 60 has a region 80a having a low transmittivity along the end portion of said shield sheet 80 to erase a bright line in the vicinity of a lamp disposed on the near side in parallel with the surface. Further, on the other side of the side whereon the lamp is disposed, brightness is frequently raised in said region because of a light leakage from the end of the optical waveguide and a reflected light. In the vicinity of said region, a region 80b having a low transmittivity is disposed along the end portion to compensate said raised brightness. Since a filling factor distribution gradient is large between said region 80c and said regions 80a and 80b, dots tend to be localized. However, the automatic dot generation and deletion method according to the present invention may be employed to resolve localization of dots and give an excellent discrete pattern.

Figure 61:
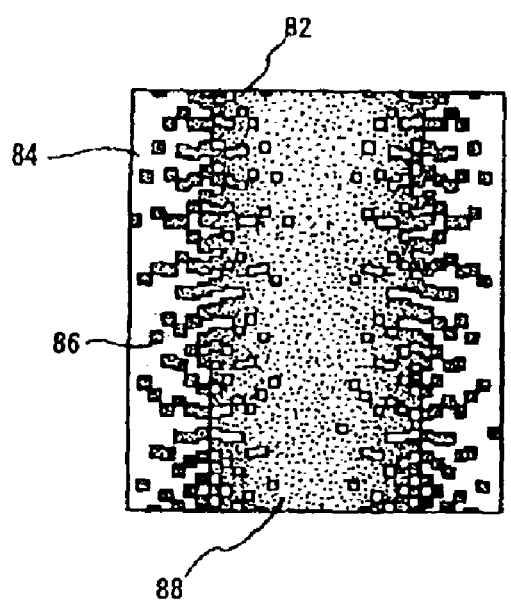
FIG. 61 illustrates a photomask for CCD wherein a discrete pattern is formed according to the present invention.

FIG. 61 shows still another embodiment of a photomask for CCD lens 82 to which the present invention may be applied. The photomask for CCD lens 82 is provided as a photomask which also employs a minute dot pattern as an optical modulation element to control a transmittivity. In FIG. 61, a method to create a photomask for a micro CCD lens by disposing dots randomly and to have a central symmetric distribution when the discrete pattern according to the present invention is applied as a photomask is described. The reason why dots are disposed randomly instead of disposing regularly is because a defect, e.g., coloring or the like, caused by the photomask acting as a diffraction lattice need be prevented.

In the photomask 82 shown in FIG. 61, a discrete pattern 88 according to the present invention comprising dots 86 according to the present invention is formed on an optical transparent support 84. Since a density gradient of dots is imprinted as concaves and convexes of lenses, the filling factor gradient of the discrete pattern shown in FIG. 61 is relatively large and a filling factor gradient per dot is almost equal to that of a screening printing pattern. By employing the discrete pattern according to the present invention as a photomask, a CCD lens may be manufactured in high precision without causing a defect of unevenness in transmitted light which has hitherto been inevitable in prior arts.

Further, a filter for making light for photolithography even is created by employing the discrete pattern according to the present invention. The discrete pattern given by the scaling DLDS method according to the present invention may provide a dot pattern satisfying a restriction related to a principal wavelength at an arbitrary gradation while maintaining a gradation gradient and also may provide a filter having an excellent characteristics without defects such as unevenness in transmitted light (including a false image generated along with block division), coloring and the like.

The discrete pattern of the invention can be used for a member that can provide various optical characteristics either by light scattering, light transmission or light absorption. A specific optical member that can provide the optical characteristic can be a light guide plate, a light scattering plate, a dithering pattern or a lithography photomask pattern.

Further, the discrete pattern of the invention can also be used as a pattern that does not especially require an optical characteristic, such as a pattern for tires or shoe soles to prevent slipping.

Further, the discrete pattern generation method of the invention can be written in an arbitrary programming language, such as C, and the code describing the program of the invention can be stored on a storage medium, such as a floppy disk, a hard disk, a compact disk, a magneto-optical disk, a digital versatile disk (DVD) or a magnetic tape.

As is described above, according to the invention, a method can be provided for the generation of a discrete pattern whereby (1) an arbitrary distribution, ranging from a low filling rate to a high filling rate, equal to or higher than 50%, can be obtained without any deterioration in an optical quality, (2) overlapping of dots or abnormal near approaches between dots is removed, and (3) high uniformity and satisfactory randomness are maintained.

The optical properties of a light guide plate, a light scattering plate or a side light device according to the invention can provide a discrete pattern that can drastically improve the uniformity of light irradiation and of luminance distribution, and an optical member, a light guide plate, a side light device and a light-transmitting liquid crystal display device that can employ the discrete pattern. Further, a method and a program for generating this discrete pattern, a computer-readable storage medium on which a computer-readable program for generating the above discrete pattern is stored, and a discrete pattern generation system are also provided.

Further, according to the present invention, when this method is specially employed for a case wherein a sharp filling factor gradient such that a filling factor change per dot diameter exceeds 1% is required, a discrete pattern having an excellent characteristic according to an arbitrary filling factor distribution may be obtained. The discrete pattern thus generated may be appropriately applied to a shield sheet of a liquid crystal display device and a shield sheet having an even brightness may be created for a liquid crystal display device. Similarly, application of the present invention to the photomask for producing a micro CCD lens enables creation of a CCD lens having a high precision.

Further, according to the present invention, a halftone of a monochrome or color image having a continuous tone may be expressed smoothly by equipment capable of outputting said image after converting a density thereof into a binary value or a multiple value such as a laser beam printer, a facsimile and a printer in addition to a representative ink-jet printer and the like. Specifically, an even and smooth halftone may be expressed without defects such as roughness, unevenness, a regular pattern and the like. In general, the present invention enables provision of a well-scattered and uneven discrete pattern, said discrete pattern according to the present invention enables provision of an optical modulation element having an excellent characteristic, an optical component comprising said optical modulation element and a binarized pattern of a variable-density image.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims:

What is claimed is:

1. A disease pattern, formed by dots discretely arranged in two dimensions, wherein said dots included in a rectangular area having a longitudinal length of Lx and a transverse length of Ly satisfy expression, $$D \leq 0.13 N^{-1.15} \quad (1)$$

such that, N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x,y) is a diagonal line, $$D(L_x, L_y; N) = \int\int_{L_x \times L_y} \left[ \frac{A(x, y)}{N} - \frac{xy}{L_x L_y} \right]^2 \frac{d\,xd\,y}{L_x L_y} \quad (2)$$

and wherein $S_1$ that is obtained by expression $$S_1(r_1, r_2) = \int_{r_1}^{r_2} dr \left| g_1(r; r_1, r_2) - g_{av} \right| \quad (3)$$

is equal to or smaller than 0.7, such that $g_1$ is obtained by dividing the average radial distribution function g(r) of each dot in the area by an integration value of g(r) over a range of from $r_1$ to $r_2$, and $g_{av}$ is the average value of $g_1$ within the range of from $r_1$ to $r_2$; such that, when the dots are arranged in a square lattice to satisfy a given filling rate, $r_1$ and $r_2$ are chosen as one and four times the value of the lattice constant Dr respectively; and the dot filling rate is a value obtained by multiplying the square of the maximum diameter of a dot by the number of dots, and dividing the product by the size of the area, wherein said discrete pattern is disposed so that an average radius distribution function in said predetermined blocks becomes sufficiently smooth.

2. An optical member, on which a discrete pattern is formed by dots discretely arranged in two dimensions, wherein said dots included in a rectangular area having a longitudinal length of Lx and a transverse length of Ly satisfy expression, $$D \leq 0.13 N^{-1.15} \quad (1)$$

such that, N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x,y) is a diagonal line, $$D(L_x, L_y; N) = \int\int_{L_x \times L_y} \left[ \frac{A(x, y)}{N} - \frac{xy}{L_x L_y} \right]^2 \frac{d\,xd\,y}{L_x L_y} \quad (2)$$

and wherein $S_1$ that is obtained by expression $$S_1(r_1, r_2) = \int_{r_1}^{r_2} dr \left| g_1(r; r_1, r_2) - g_{av} \right| \quad (3)$$

is equal to or smaller than 0.7, such that, $g_1$ is obtained by dividing the average radial distribution function g(r) of each dot in the area by an integration value of g(r) over a range of from $r_1$ to $r_2$, and $g_{av}$ is the average value of $g_1$ within the range of from $r_1$ to $r_2$; such that, when the dots are arranged in a square lattice to satisfy a given filling rate, $r_1$ and $r_2$ are chosen as one and four times the value of the lattice constant Dr respectively; and the dot filling rate is a value obtained by multiplying the square of the maximum diameter of a dot by the number of dots, and dividing the product by the size of the area, wherein said discrete pattern is disposed so that an average radius distribution function in said predetermined blocks becomes sufficiently smooth.

3. A light guide plate, used for a light-transmitting liquid crystal display device, on which a discrete pattern is formed by dots discretely arranged in two dimensions, wherein said dots included in a rectangular area having a longitudinal length of Lx and a transverse length of Ly satisfy expression, $$D \leq 0.13 N^{-1.15} \quad (1)$$

such that, N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x,y) is a diagonal line, $$D(L_x, L_y; N) = \int\int_{L_x \times L_y} \left[ \frac{A(x, y)}{N} - \frac{xy}{L_x L_y} \right]^2 \frac{dx dy}{L_x L_y} \quad (2)$$

and wherein $S_1$ that is obtained by expression (3)

$$S_1(r_1, r_2) = \int_{r_1}^{r_2} dr \left| g_1(r; r_1, r_2) - g_{av} \right| \quad (3)$$

is equal to or smaller than 0.7, such that, $g_1$ is obtained by dividing the average radial distribution function g(r) of each dot in the area by an integration value of g(r) over a range of from $r_1$ to $r_2$, and $g_{av}$ is the average value of $g_1$ within the range of from $r_1$ to $r_2$; such that, when the dots are arranged in a square lattice to satisfy a given filling rate, $r_1$ and $r_2$ are chosen as one and four times the value of the lattice constant Dr respectively; and the dot filling rate is a value obtained by multiplying the square of the maximum diameter of a dot by the number of dots, and dividing the product by the size of the area, wherein said discrete pattern is disposed so that an average radius distribution function in said predetermined blocks becomes sufficiently smooth.

4. A side light device comprising:
a light guide plate, on which a discrete pattern is formed by dots discretely arranged in two dimensions, wherein said dots included in a rectangular area having a longitudinal length of Lx and a transverse length of Ly satisfy expression, $$D \leq 0.13 N^{-1.15} \quad (1)$$

such that, N denotes the number of dots included in a predetermined area, and D is obtained by expression (2), wherein A(x,y) defines the number of dots, of a total of N dots, included in a rectangular area for which a line segment extended from reference coordinates (0,0) to an arbitrary coordinate point (x,y) is a diagonal line, $$D(L_x, L_y; N) = \int\int_{L_x \times L_y} \left[ \frac{A(x, y)}{N} - \frac{xy}{L_x L_y} \right]^2 \frac{dx dy}{L_x L_y} \quad (2)$$

and wherein $S_1$ that is obtained by expression $$S_1(r_1, r_2) = \int_{r_1}^{r_2} dr \left| g_1(r; r_1, r_2) - g_{av} \right| \quad (3)$$

is equal to or smaller than 0.7, such that, $g_1$ is obtained by dividing the average radial distribution function g(r) of each dot in the area by an integration value of a(r) over a range of from $r_1$ to $r_2$, and $g_{av}$ is the average value of $g_1$ within the range of from $r_1$ to $r_2$; such that, when the dots are arranged in a square lattice to satisfy a given tilling rate, $r_1$ and $r_2$ are chosen as one and four times the value of the lattice constant Dr respectively; and the dot filling rate is a value obtained by multiplying the square of the maximum diameter of a dot by the number of dots, and dividing the product by the size of the area; said light device further comprising:
  a light source for projecting light onto said light guide plate; and
  a reflector for reflecting said light projected by said light source and transmitting said reflected light to said light guide plate, wherein said discrete pattern is disposed so that an average radius distribution function in said predetermined blocks becomes sufficiently smooth.

5. A discrete pattern generation method in a computer system to generate a discrete pattern formed of discrete dots disposed two-dimensionally comprising the steps of:
  providing a predetermined block;
  providing a filling factor distribution function of said dots;
  providing areas of said dots;
  generating at least two dots according to said filling factor distribution function for said predetermined blocks;
  moving using predetermined functions said generated dots and updating thereof to new coordinate values;
  judging a distance between dots of which said new coordinate values have been obtained;
  generating or deleting new dots with regard to said distance; and
  employing said predetermined functions to update coordinate values of dots including said generated dots.

6. The discrete pattern generation method according to claim 5, wherein said step of generating dots according to a filling factor distribution function comprises a step of generating dots in a boundary region of said block and a step of generating dots inside said boundary region of said block.

7. The discrete pattern generation method according to claim 6, wherein said step of employing predetermined functions to move dots comprises a step of moving dots along said boundary region and a step of moving said dots two-dimensionally inside said boundary region.

8. The discrete pattern generation method according to claim 5, wherein said step of generating dots according to a tilling factor distribution function comprises a step of employing a low-discrepancy sequence method to generate dots.

9. The discrete pattern generation method according to claim 5, wherein said discrete pattern is a binarized pattern of an optical intensity modulation element or a variable-density image of an optical component.

10. A program for making a computer to execute the steps of:

providing a predetermined block;

providing said filing factor distribution function of dots;

providing said area of dots;

generating at least two dots according to said filling factor distribution function for said predetermined blocks;

moving employing predetermined functions said generated dots and updating thereof to new coordinate values;

judging a distance between said dots of which said new coordinate values have been obtained;

generating or deleting new dots with regard to said distance; and employing said predetermined functions to update coordinate values of dots including said generated dots.

11. The program according to claim 10, wherein said step of generating dots according to a filling factor distribution function comprises a step of generating dots in a boundary region of said block and a step of generating dots inside said boundary region of said block.

12. The program according to claim 11, wherein said step of employing predetermined functions to move dots comprises a step of moving dots along said boundary region and a step of moving said dots two-dimensionally inside said boundary region.

13. The program according to claim 10, wherein said step of generating dots according to a filling factor distribution function comprises a step of generating a low-discrepancy sequence method for generation.

14. The program according to claim 10, wherein said discrete pattern is binarized patterns of optical intensity modulation elements or variable-density images of optical components.

15. A computer readable storage medium storing a computer executable program, said program making said computer to execute a generation method for discrete patterns formed of discrete dots disposed two-dimensionally, said storage medium making a computer system to execute the steps of:

providing a predetermined block;

providing a filling factor distribution function of said dots;

providing areas of said dots;

generating at least two dots according to said filling factor distribution function for said predetermined blocks;

moving using predetermined functions said generated dots and updating thereof to new coordinate values;

judging a distance between dots of which said new coordinate values have been obtained;

generating or deleting new dots with regard to said distance; and employing said predetermined functions to update coordinate values of dots including said generated dots.

16. The storage medium according to claim 15, wherein said step of generating dots according to a filling factor distribution function comprises a step of generating dots in a boundary region of said block and a step of generating dots inside said boundary region of said block.

17. The storage medium according to claim 15, wherein said step of employing predetermined functions to move dots comprises a step of moving dots along said boundary region and a step of moving said dots two-dimensionally inside said boundary region.

18. The storage medium according to claim 15, wherein said step of generating dots according to a filling factor distribution function comprises a step of employing a low-discrepancy sequence method to generate dots.

19. The storage medium according to claim 15, wherein said discrete pattern is binarized patterns of light intensity modulation elements of optical components or a variable-density image.

20. A discrete pattern generation system for generating discrete patterns comprising:

an execution means for the method according to claim 5;

a storage means to store position coordinates of dots forming said generated discrete pattern;

a printer means to output position coordinates stored in said storage means; and a pattern acceptance element to which discrete pattern is formed by said printer means.

21. The discrete pattern generation system according to claim 20, wherein said system generates a binarized pattern of an optical intensity modulation element or a variable-density image of an optical component.

22. A binarized pattern generation method for generating a binarized patterns of a variable-density image formed of discrete dots disposed two-dimensionally, said binary pattern generation method making a computer system to execute the steps of:

providing a predetermined block;

determining a number of dots disposed in said predetermined block;

determining said dot position coordinates so that said dots contained in a rectangular block having a lateral size of Lx and a longitudinal size of Ly satisfy formula (1):

$$D \leq 0.13 N^{-1.15} \tag{1}$$

(wherein N in formula (1) denotes a number of dots contained in said block and D is given by formula (2) in the condition in that a number of dots contained in a rectangular region having a diagonal line extending from a reference coordinate (0, 0) to an arbitrary coordinate (x, y) is A(x, y):

$$D(L_x, L_y; N) = \int\int_{L_x \times L_y} \left[ \frac{A(x,y)}{N} - \frac{xy}{L_x L_y} \right]^2 \frac{dxdy}{L_x L_y} \tag{2}$$

and $S_1$ given by formula (3) is equal to or less than 0.7:

$$S_1(r_1, r_2) = \int_{r_1}^{r_2} dr \left| g_1(r; r_1, r_2) - g_{av} \right|, \tag{3}$$

wherein $g_1$ in formula (3) is a value obtained from dividing an average radius distribution function g(r) by an integral value ranging from $r_1$ to $r_2$ and $g_{av}$ is a mean value of $g_1$ ranging from $r_1$ to $r_2$. When dots are disposed in a shape of a tetragonal lattice to satisfy a given filling factor, $r_1$ and $r_2$ are specified to an equal value and a quadruple value of a lattice constant Dr, respectively. A filling factor of dots is the value defined in that a square of a maximum diameter of a dot is multiplied by a number of dots, then thus calculated value is divided by an area of said region);

setting said predetermined position coordinates as initial positions;

changing said dot position coordinates so that dots of which said position coordinates have been determined do not overlap with each other; and employing a plurality of said boundary conditions to adjoin said predetermined blocks to generate a discrete pattern of a predetermined size.

23. The binarized pattern generation method according to claim 22, wherein said step of changing position coordinates comprising the steps of:

calculating repulsion regarding a predetermined dot from another dot existing in the vicinity of said dot;

displacing said predetermined dot according to a magnitude of said repulsion;

a step of calculating repulsion regarding said displaced dot;

and summing up repulsion regarding dots within a predetermined range.

24. The binarized pattern generation method according to claim 22, wherein said step of changing position coordinates employs repulsion which remains steady as against said distance between dots at a wavelength equal to or less than a principal wavelength and decreases according to increase of said distance between dots exceeding a predetermined value.

25. A computer executable program for making a computer system to execute a generation method for binarized patterns of a variable-density image formed of discrete dots disposed two-dimensionally, said program making said computer system execute the steps of:

providing a predetermined block;

determining a number of dots disposed in said predetermined block;

determining said dot position coordinates so that said dots contained in a rectangular block having a lateral size of Lx and a longitudinal size of Ly satisfy formula (1):

$$D \leq 0.13 N^{-1.15} \quad (1)$$

(wherein N in formula (1) denotes a number of dots contained in said block and D is given by formula (2) in the condition that a number of dots contained in a rectangular region having a diagonal line extending from a reference coordinate $(0, 0)$ to an arbitrary coordinate $(x, y)$ is $A(x, y)$:

$$D(L_x, L_y; N) = \int\int_{L_x x L_y} \left[\frac{A(x, y)}{N} - \frac{xy}{L_x L_y}\right]^2 \frac{dxdy}{L_x L_y} \quad (2)$$

and $S_1$ given by formula (3) is equal to or less than 0.7:

$$S_1(r_1, r_2) = \int_{r_1}^{r_2} dr \left| g_1(r; r_1, r_2) - g_{av} \right|, \quad (3)$$

wherein $g_1$ in formula (3) is a value obtained from dividing an average radius distribution function $g(r)$ by an integral value ranging from $r_1$ to $r_2$ and $g_{av}$ is a mean value of $g_1$ ranging from $r_1$ to $r_2$, when dots are disposed in a shape of a tetragonal lattice to satisfy a given filling factor, $r_1$ and $r_2$ are specified to an equal value and a quadruple value of a lattice constant Dr, respectively. A filling factor of dots is the value in the condition that a square of a maximum diameter of a dot is multiplied by a number of dots, then thus calculated value is divided by an area of said region);

setting said predetermined position coordinates as initial positions;

changing said dot position coordinates so that dots of which said position coordinates have been determined do not overlap with each other; and employing a plurality of predetermined boundary conditions to adjoin said predetermined blocks to generate discrete patterns of predetermined sizes.

26. The program according to claim 25, wherein said step of changing position coordinates comprises the steps of:

calculating repulsion regarding a predetermined dot from another dot existing in the vicinity of said dot;

displacing said predetermined dot according to a magnitude of said repulsion;

calculating repulsion regarding said displaced dot; and summing up repulsion regarding dots within a predetermined range.

27. The program according to claim 25, wherein said step of changing position coordinates employs repulsion which remains steady as against said distance between dots at a wavelength equal to or less than a principal wavelength, and which decreases according to increase of said distance between dots exceeding a predetermined value.

28. A computer readable storage medium storing a program for making a computer execute a generating method for binarized patterns of a variable-density image formed of discrete dots disposed two dimensionally, said program making said computer execute the steps of:

providing a predetermined block;

determining a number of dots disposed in said predetermined block;

determining said dot position coordinates so that said dots contained in a rectangular block having a lateral size of Lx and a longitudinal size of Ly satisfy formula (1):

$$D \leq 0.13 N^{-1.15} \quad (1)$$

(wherein N in formula (1) denotes a number of dots contained in said block and D is given by formula (2) in the condition that a number of dots contained in a rectangular region having a diagonal line extending from a reference coordinate $(0, 0)$ to an arbitrary coordinate $(x, y)$ is $A(x, y)$:

$$D(L_x, L_y; N) = \int\int_{L_x x L_y} \left[\frac{A(x, y)}{N} - \frac{xy}{L_x L_y}\right]^2 \frac{dxdy}{L_x L_y} \quad (2)$$

and $S_1$ given by formula (3) is equal to or less than 0.7:

$$S_1(r_1, r_2) = \int_{r_1}^{r_2} dr \left| g_1(r; r_1, r_2) - g_{av} \right|, \quad (3)$$

wherein $g_1$ in formula (3) is a value obtained from dividing an average radius distribution function $g(r)$ by an integral value ranging from $r_1$ to $r_2$ and $g_{av}$ is a mean value of $g_1$ ranging from $r_1$ to $r_2$, when dots are disposed in a shape of a tetragonal lattice to satisfy a given filling factor, $r_1$ and $r_2$ are specified to an equal value and a quadruple value of a lattice constant Dr, respectively. A filling factor of dots is the value defined in that a square of a maximum diameter of a dot is multiplied by a number of dots, then thus calculated value is divided by an area of said region);

setting said predetermined position coordinates as initial positions;

changing said dot position coordinates so that dots of which said position coordinates have been determined do not overlap with each other; and employing a plurality of predetermined boundary conditions to adjoin said predetermined blocks to generate discrete patterns of predetermined sizes.

29. The program according to claim 28, wherein said step of changing said position coordinates comprises:

calculating repulsion regarding a predetermined dot from another dot existing in the vicinity of said dot;

displacing said predetermined dots according to a size of said repulsion;

calculating repulsion regarding said displaced predetermined dots; and summing up said repulsion regarding dots within a predetermined range.

30. The program according to claim 28, wherein said step of changing position coordinates employs repulsion which remains steady as against said distance between dots at a wavelength equal to or less than a principal wavelength, and which decreases according to increase of said distance between dots exceeding a predetermined value.

31. A generation system of binarized patterns including discrete patterns comprising:

an execution means to execute the method according to claim 22;

a storage means to store position coordinates of dots forming said generated binarized patterns;

a printer means to output position coordinates stored in said storage means; and a pattern acceptance element to discrete pattern is formed by said printer means.

* * * * *